(12) United States Patent
Hong et al.

(10) Patent No.: US 10,251,032 B2
(45) Date of Patent: Apr. 2, 2019

(54) ELECTRONIC DEVICE FOR SHARING DATA AND METHOD FOR CONTROLLING THE SAME

(71) Applicant: SAMSUNG ELECTRONICS CO., LTD., Suwon-si (KR)

(72) Inventors: Jung-kih Hong, Seoul (KR); Min-Seok Kim, Suwon-si (KR); Ho-Jun Lee, Osan-si (KR); Su-Jeong Lim, Daegu (KR); Deok-Ho Kim, Seoul (KR); Cheol-Ju Hwang, Yongin-si (KR); Yeul-Tak Sung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/600,872

(22) Filed: Jan. 20, 2015

(65) Prior Publication Data

US 2015/0208217 A1    Jul. 23, 2015

Related U.S. Application Data

(60) Provisional application No. 61/936,713, filed on Feb. 6, 2014, provisional application No. 61/929,234, filed on Jan. 20, 2014.

(30) Foreign Application Priority Data

Feb. 21, 2014 (KR) .................. 10-2014-0020888
Feb. 21, 2014 (KR) .................. 10-2014-0020906
Sep. 19, 2014 (KR) .................. 10-2014-0125168

(51) Int. Cl.
*H04W 4/16* (2009.01)

(52) U.S. Cl.
CPC .................... *H04W 4/16* (2013.01)

(58) Field of Classification Search
CPC combination set(s) only.
See application file for complete search history.

(56) References Cited

U.S. PATENT DOCUMENTS 7,526,252 B2 * 4/2009 Rekimoto ........... H04M 1/2535
                                                    455/41.2
8,347,216 B2 * 1/2013 Shin .................... H04L 12/1822
                                                    455/422.1

(Continued)

FOREIGN PATENT DOCUMENTS

CN       103141075 A      6/2013
KR    1020120111859 A    10/2012

(Continued)

OTHER PUBLICATIONS

Communication dated Aug. 2, 2017, from the European Patent Office in counterpart European Application No. 15737634.4.

(Continued)

*Primary Examiner* — Kwasi Karikari
(74) *Attorney, Agent, or Firm* — Sughrue Mion, PLLC

(57) ABSTRACT

A method for sharing data in a transmitting-side electronic device communicating with a receiving-side electronic device is provided. The method includes connecting a voice call with the receiving-side electronic device; obtaining a sharing object to be shared with the receiving-side electronic device; and transmitting data corresponding to the sharing object to the receiving-side electronic device through a data session formed based on information related to the voice call.

16 Claims, 74 Drawing Sheets

(56) References Cited

U.S. PATENT DOCUMENTS

| | | | | |
|---|---|---|---|---|
| 8,620,213 B2* | 12/2013 | Mallinson | ............... | A63F 13/06 455/41.1 |
| 8,730,974 B2* | 5/2014 | Karaoguz | ........... | H04L 12/2803 370/328 |
| 8,855,281 B2* | 10/2014 | Kho | ..................... | H04L 65/403 379/142.04 |
| 2004/0235520 A1* | 11/2004 | Cadiz | .................. | H04M 1/2473 455/557 |
| 2007/0165599 A1* | 7/2007 | Skog | ................... | H04M 7/0024 370/352 |
| 2008/0014968 A1* | 1/2008 | Yoon | .................... | H04W 68/00 455/456.5 |
| 2008/0181201 A1 | 7/2008 | Park et al. | | |
| 2011/0044438 A1 | 2/2011 | Wang et al. | | |
| 2011/0045816 A1 | 2/2011 | Wang et al. | | |
| 2011/0312303 A1* | 12/2011 | Brush | ...................... | H04M 3/38 455/414.1 |
| 2012/0040644 A1* | 2/2012 | Naik | ................. | H04M 1/72522 455/412.1 |
| 2012/0066722 A1* | 3/2012 | Cheung | ............... | H04M 1/7253 725/62 |
| 2013/0040617 A1* | 2/2013 | Lee | ...................... | H04M 1/663 455/414.1 |
| 2013/0173715 A1* | 7/2013 | Song | ....................... | H04L 65/60 709/205 |
| 2013/0191475 A1* | 7/2013 | Partovi | ................. | H04L 51/046 709/206 |
| 2013/0203353 A1* | 8/2013 | Kim | ................... | H04M 1/0285 455/41.2 |
| 2013/0304587 A1 | 11/2013 | Ralston | | |
| 2014/0003599 A1 | 1/2014 | Kim et al. | | |
| 2014/0018053 A1 | 1/2014 | Cho et al. | | |
| 2014/0059644 A1* | 2/2014 | Shin | ........................ | H04L 63/08 726/2 |
| 2014/0108568 A1 | 4/2014 | Lee | | |

FOREIGN PATENT DOCUMENTS

| | | |
|---|---|---|
| KR | 10-2013-0033503 A | 4/2013 |
| KR | 10-2014-0042188 A | 4/2014 |
| WO | 2012021529 A1 | 2/2012 |

OTHER PUBLICATIONS

Communication dated Sep. 26, 2018, from the State Intellectual Property Office of People's Republic of China in counterpart Application No. 201580005217.4.

* cited by examiner

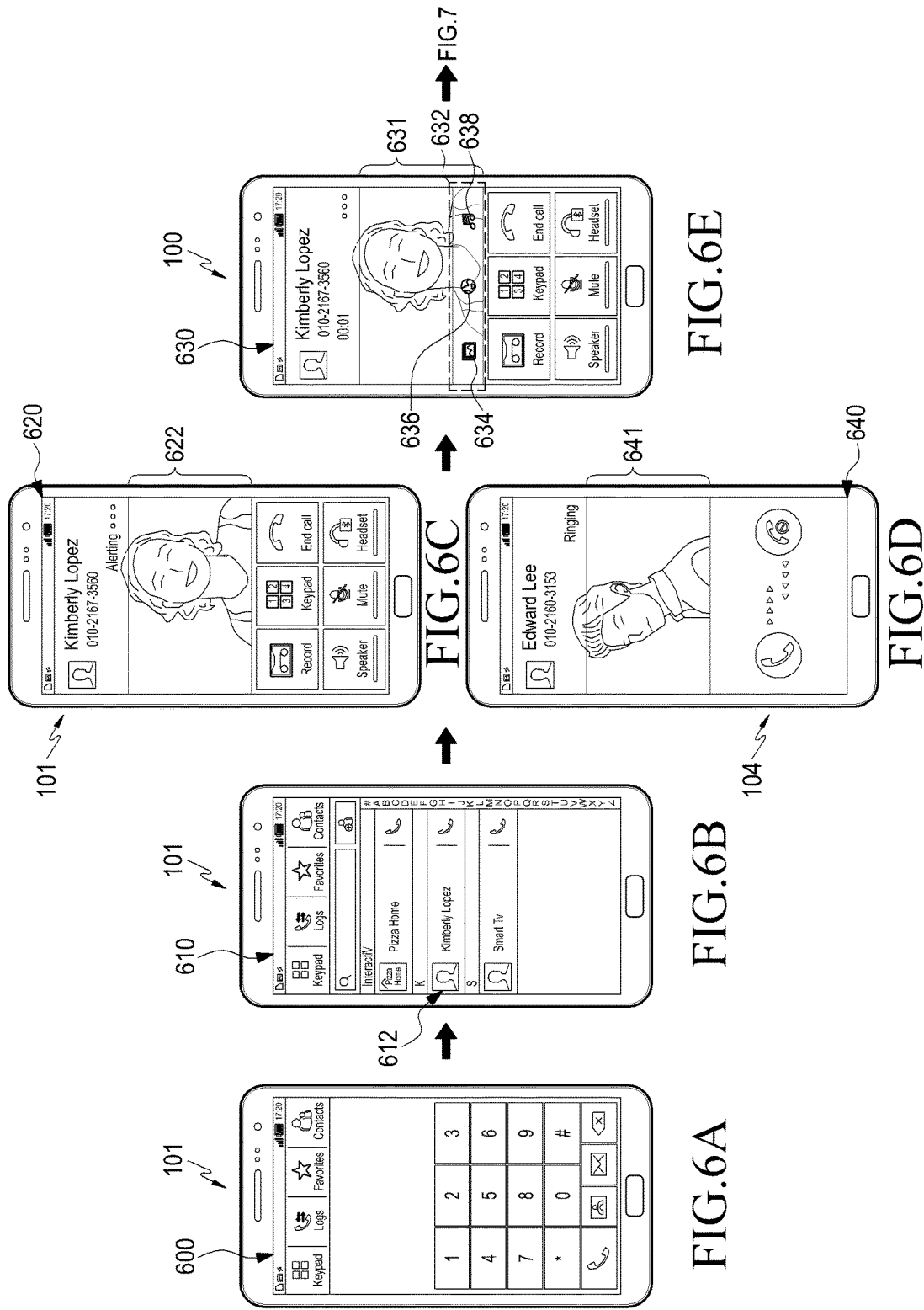

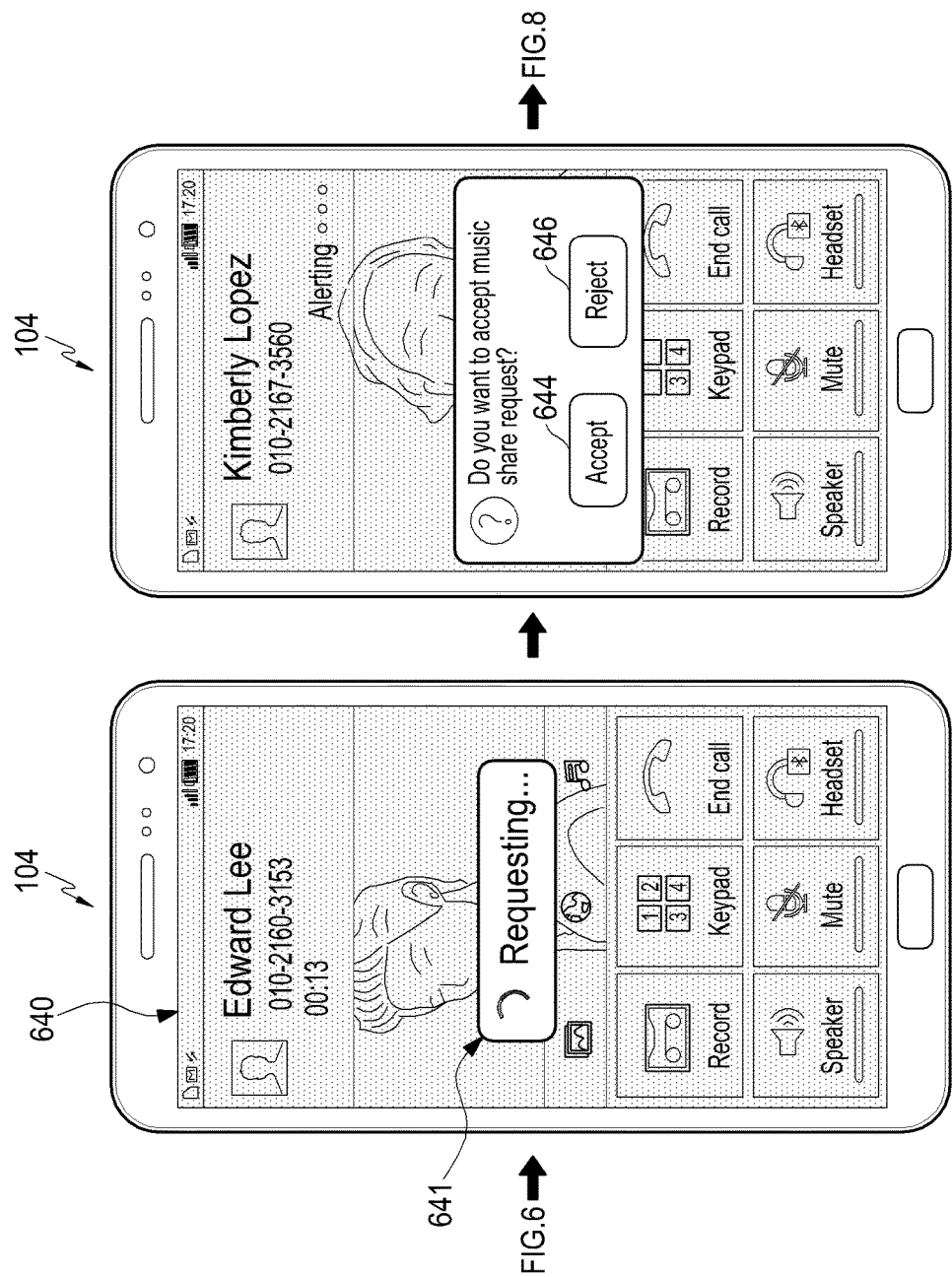

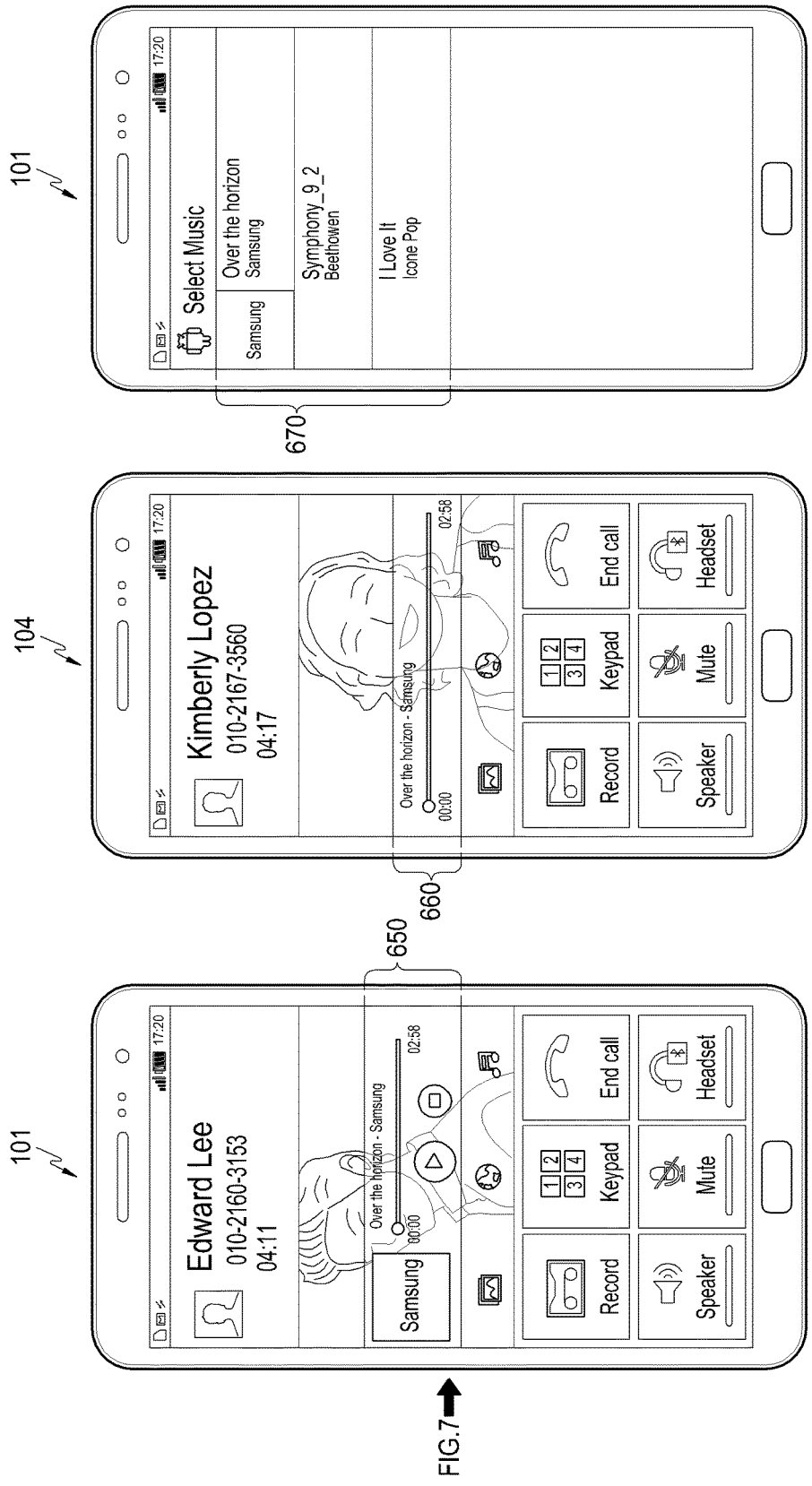

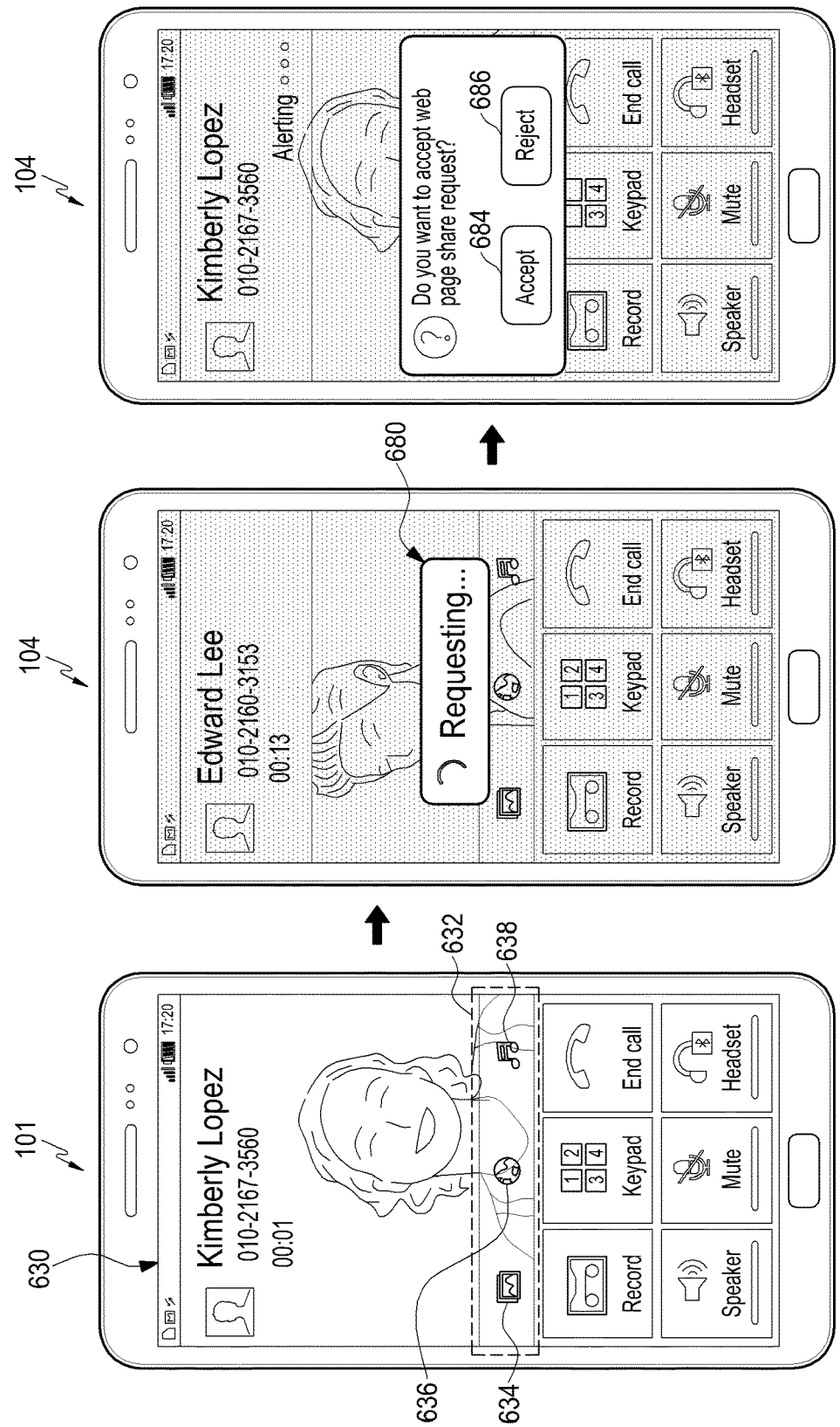

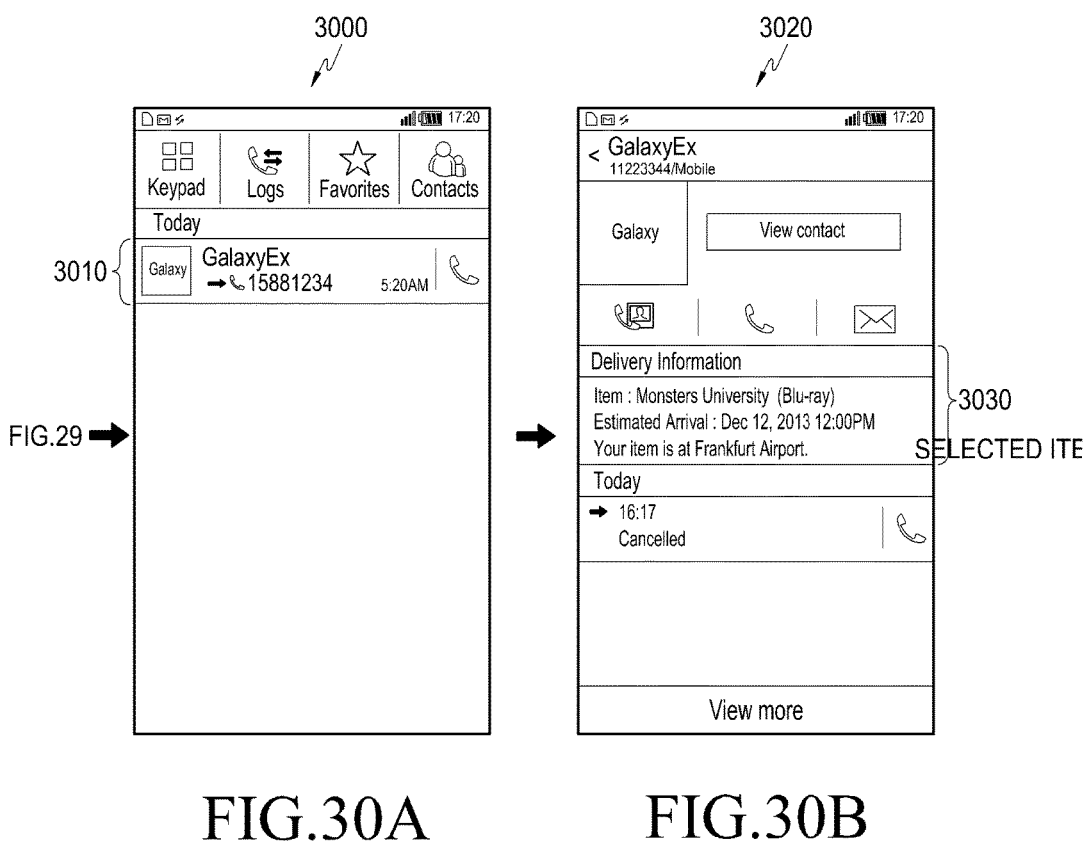

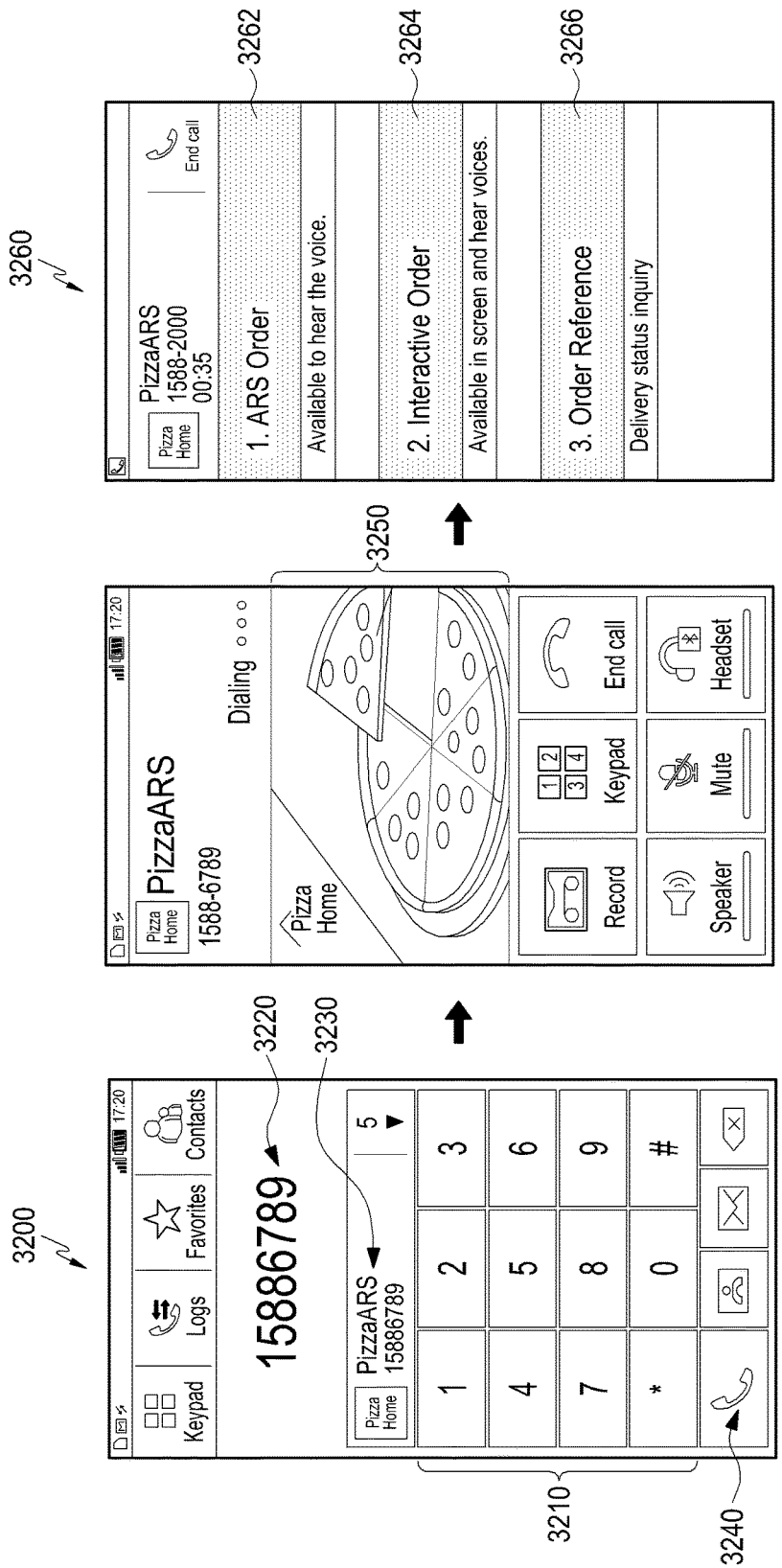

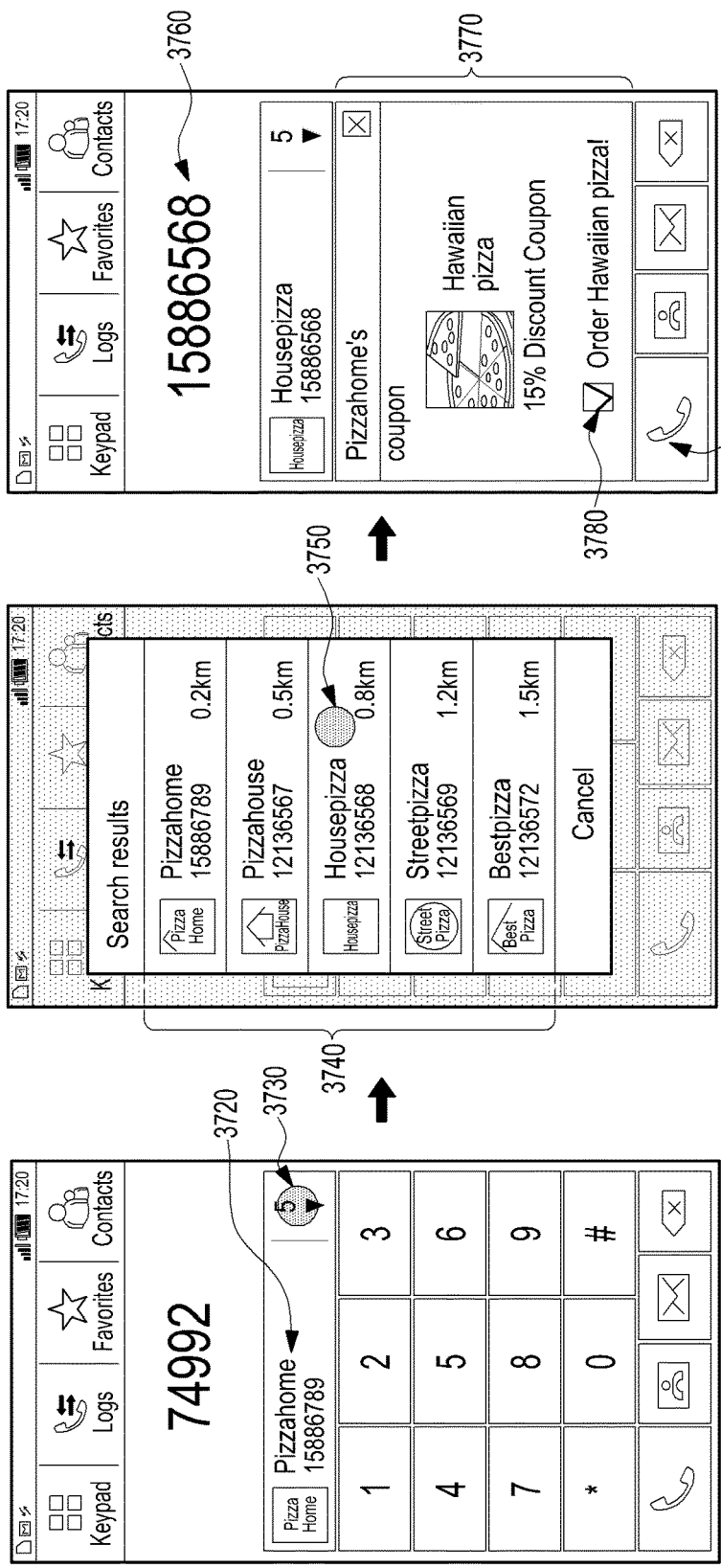

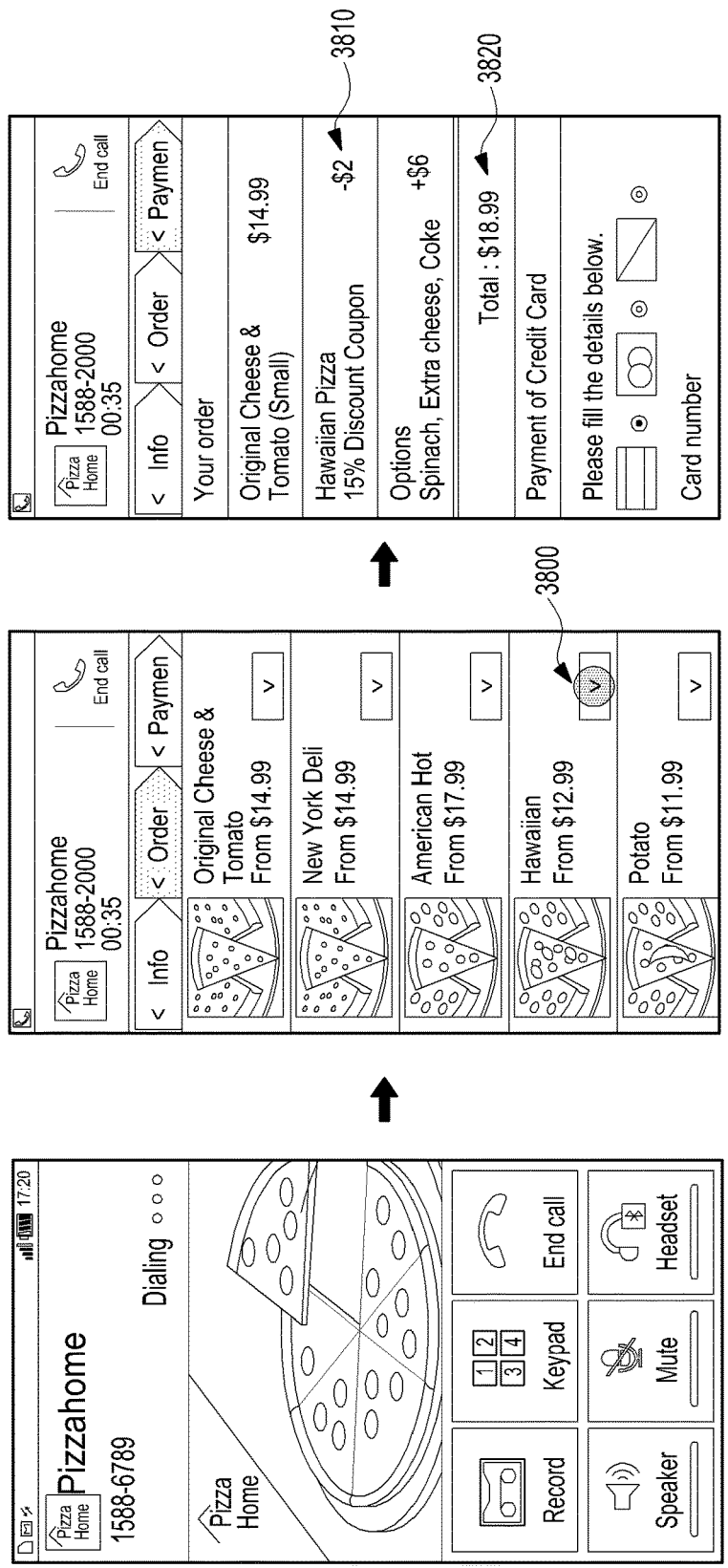

FIG.38 ➡

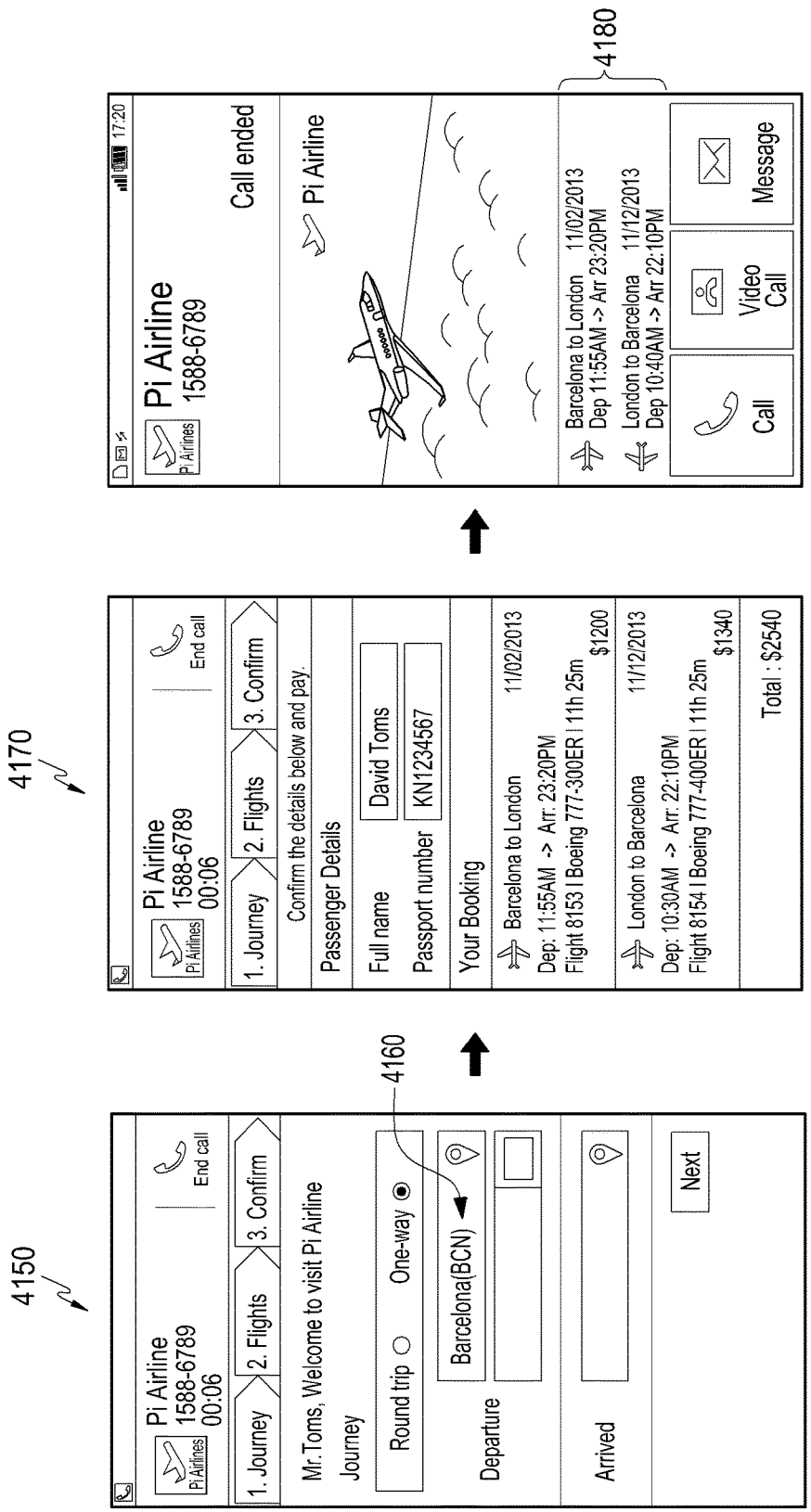

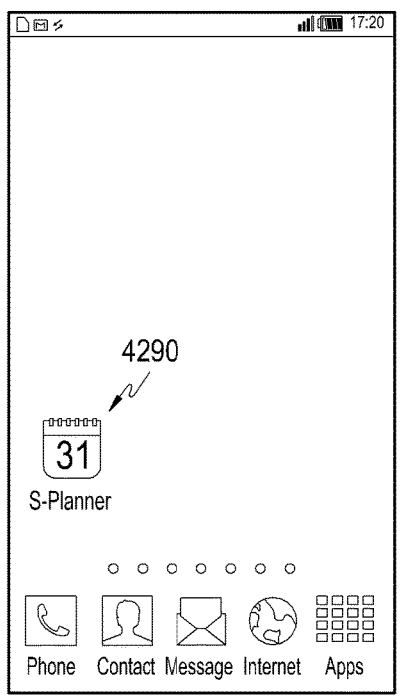
FIG.42A  FIG.42B

ELECTRONIC DEVICE FOR SHARING DATA AND METHOD FOR CONTROLLING THE SAME

CROSS-REFERENCE TO RELATED APPLICATION(S)

This application claims priority under 35 U.S.C. § 119(a) of U.S. Patent Application No. 61/929,234 filed in the United States Patent and Trademark Office on Jan. 20, 2014, U.S. Patent Application No. 61/936,713 filed in the United States Patent and Trademark Office on Feb. 6, 2014, Korean Patent Application No. 10-2014-0020906 filed in the Korean Intellectual Property Office on Feb. 21, 2014, Korean Patent Application No. 10-2014-0020888 filed in the Korean Intellectual Property Office on Feb. 21, 2014, and Korean Patent Application No. 10-2014-0125168 filed in the Korean Intellectual Property Office on Sep. 19, 2014, the entire disclosures of all of which are incorporated herein by reference in their entireties.

TECHNICAL FIELD

Methods and apparatuses consistent with the exemplary embodiments relate to an electronic device and a control method of the electronic device, and more particularly, to an electronic device and a control method for efficiently sharing data.

BACKGROUND

Technological advances related to electronic devices, and control methods thereof, have developed rapidly. In particular, the electronic devices may provide voice call functions. In other words, the voice call function may be provided between a transmitting-side electronic device and a receiving-side electronic device.

The electronic device may not provide additional functions in combination with the voice call.

Specifically, to perform additional tasks during the voice call, the electronic device would have to run a separate application. This would be very inconvenient to users.

SUMMARY

An aspect of the exemplary embodiments addresses at least the above-mentioned problems and/or disadvantages and provides at least the advantages described below. Accordingly, an aspect of an exemplary embodiment of the present disclosure provides an electronic device for sharing data corresponding to a sharing object with a receiving-side electronic device during a voice call connection, and a method for controlling the same.

In accordance with an aspect of the exemplary embodiments, there is provided a method for sharing data in a transmitting-side electronic device communicating with a receiving-side electronic device. The method includes connecting a voice call with the receiving-side electronic device; obtaining a sharing object to be shared with the receiving-side electronic device; and transmitting data corresponding to the sharing object to the receiving-side electronic device through a data session formed based on information related to the voice call.

In accordance with another aspect of the exemplary embodiments, there is provided a method for sharing data in a receiving-side electronic device communicating with a transmitting-side electronic device. The method includes connecting a voice call with the transmitting-side electronic device; and receiving data corresponding to a sharing object to be shared with the transmitting-side electronic device from the transmitting-side electronic device through a data session formed based on information related to the voice call.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIGS. 6A-6E, 7A, 7B, 8A-8C, 9A-9C, 10A, 10B, 11A, 11B, 12A, and 12B illustrate execution screens of data sharing electronic devices according to an exemplary embodiment;

FIGS. 27A, 27B, 28A-28C, 29A, 29B, 30A, and 30B illustrate execution screens of an electronic device having a function of sharing content in voice communication according to an exemplary embodiment;

FIGS. 32A-32C, 33A, 33B, 34, 35A, and 35B illustrate execution screens of electronic devices having a function of sharing content in voice communication according to another exemplary embodiment;

FIGS. 37A-37C, 38A-38C, 39A, 39B, 40A-40C, 41A-41C, 42A, and 42B illustrate execution screens of an electronic device having a function of sharing content in voice communication according to further another exemplary embodiment;

Throughout the drawings, like reference numerals will be understood to refer to like parts, components, and structures.

DETAILED DESCRIPTION OF EXEMPLARY EMBODIMENTS

Figure 1:
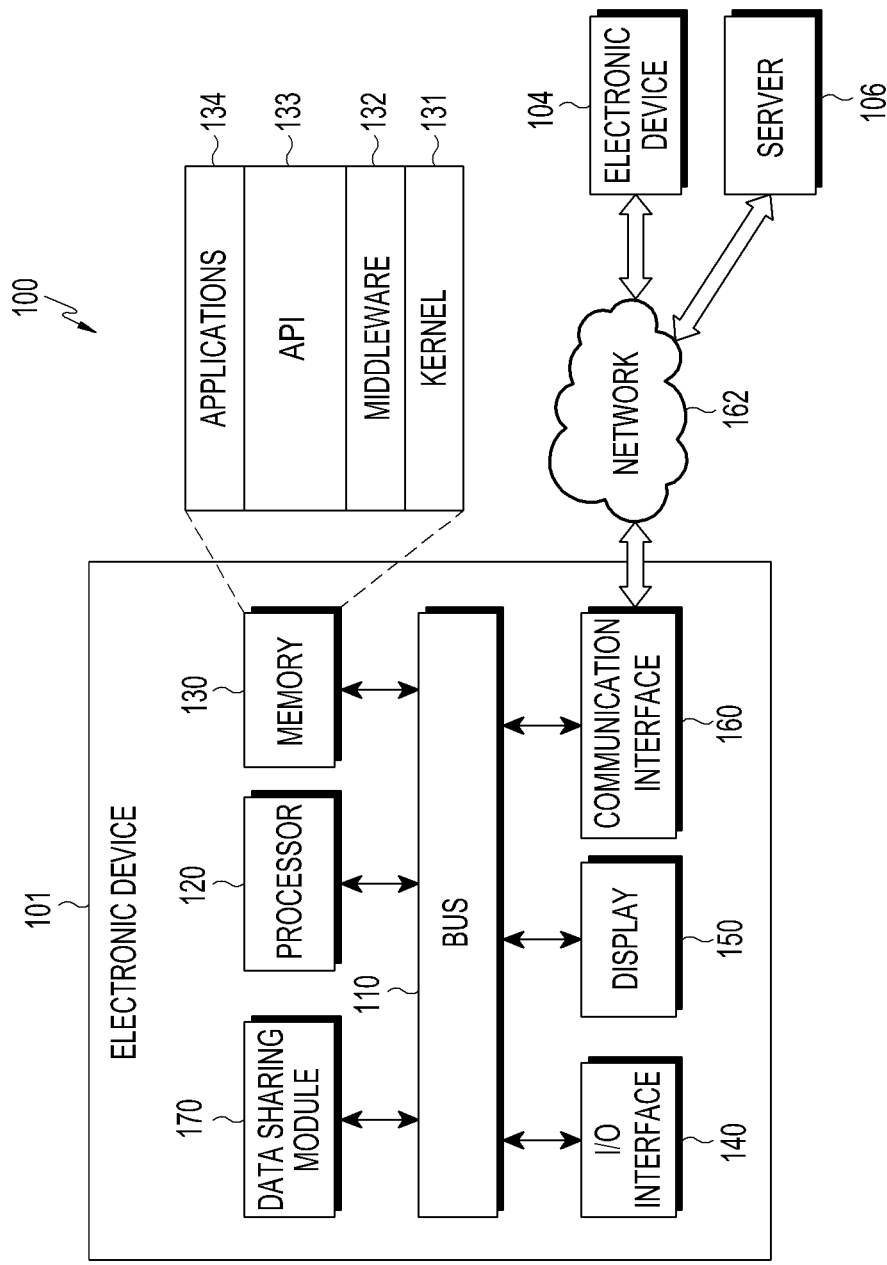
FIG. 1 illustrates a network environment including an electronic device according to various exemplary embodiments.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to various exemplary embodiments of the present disclosure may be a device equipped with a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, and a wearable device (e.g., a Head Mounted Device (HMD) (such as electronic eyeglasses), electronic apparel, electronic bracelet, electronic necklace, electronic appcessory, electronic tattoo, or smart watch). However, the electronic device is not limited thereto.

In certain exemplary embodiments, the electronic device may be a smart home appliance equipped with a communication function. The smart home appliance may include at least one of, for example, a Television (TV), a Digital Video Disk (DVD) player, an audio player, a refrigerator, an air conditioner, a vacuum cleaner, an oven, a microwave oven, a washer, an air purifier, a set-top box, a TV box (e.g., Samsung HomeSync™, an Apple TV™, or a Google TV™), a game console, an electronic dictionary, an electronic key, a camcorder and an electronic photo frame.

In certain exemplary embodiments, the electronic device may include at least one of various medical devices (e.g., Magnetic Resonance Angiography (MRA), Magnetic Resonance Imaging (MRI), Computed Tomography (CT), a medical camcorder, a medical ultrasonic device, or the like), a navigation device, a Global Positioning System (GPS) receiver, an Event Data Recorder (EDR), a Flight Data Recorder (FDR), an automotive infotainment device, a marine electronic device (e.g., a marine navigation device, a gyro compass, or the like), a avionics, a security device, a car head unit, an industrial or household robot, an Automatic Teller's Machine (ATM) for banks, and a Point Of Sales (POS) for shops.

In certain exemplary embodiments, the electronic device may include at least one of a part of the furniture or building/structure equipped with a communication function, an electronic board, an electronic signature receiving device, a projector, and various metering devices (e.g., a water meter, an electricity meter, a gas meter, a radio wave meter, or the like). The electronic device according to various exemplary embodiments of the present disclosure may be one of the above-described various devices, or a combination thereof. In addition, the electronic device according to various exemplary embodiments of the present disclosure may be a flexible device. It will be apparent to those of ordinary skill in the art that the electronic device according to various exemplary embodiments of the present disclosure is not limited to the above-described devices.

The electronic device according to various exemplary embodiments of the present disclosure will be described below with reference to the accompanying drawings. The term 'user' as used herein may refer to a person using the electronic device, or a device (e.g., an intelligent electronic device) using the electronic device.

FIG. 1 illustrates a network environment 100 including an electronic device 101 according to various exemplary embodiments of the present disclosure. Referring to FIG. 1, the electronic device 101 may include a bus 110, a processor 120, a memory 130, an Input/Output (I/O) interface 140, a display 150, a communication interface 160, and a data sharing module 170.

The bus 110 may be a circuit that connects the above-described components to each other, and sends communication signals (e.g., control messages) between the components.

The processor 120 may, for example, receive a command from the other components (e.g., the memory 130, the I/O interface 140, the display 150, the communication interface 160, the data sharing module 170, or the like) through the bus 110, decrypt the received command, and execute an operation or data processing based on the decrypted command.

The memory 130 may store the command or data, which is received from the processor 120 or the other components (e.g., the I/O interface 140, the display 150, the communication interface 160, the data sharing module 170, or the like), or generated by the processor 120 or the other components. The memory 130 may include programming modules such as, for example, a kernel 131, a middleware 132, an Application Programming Interface (API) 133, or an application(s) 134. Each of the programming modules may be configured by one of software, firmware and hardware, or a combination thereof.

The kernel 131 may control or manage the system resources (e.g., the bus 110, the processor 120, the memory 130, or the like) used to execute the operation or function implemented in the other programming modules (e.g., the middleware 132, the API 133 or the application 134). The kernel 131 may provide an interface through which the middleware 132, the API 133 or the application 134 can access the individual components of the electronic device 101, and control or manage the components.

The middleware 132 may play an intermediary role so that the API 133 or the application 134 may communicate with the kernel 131 to exchange data with each other. With respect to the word requests received from the application 134, the middleware 132 may, for example, perform control (e.g., scheduling or load balancing) for a work request, using a method such as assigning the priority for using the system resources (e.g., the bus 110, the processor 120, the memory 130, or the like) of the electronic device 101, to at least one of the application(s) 134.

The API 133 may include, for example, at least one interface or function (e.g., command) for file control, window control image processing or character control, as an interface through which the application 134 controls the function provided from the kernel 131 or the middleware 132.

In various exemplary embodiments, the application 134 may include a Short Message Service (SMS)/Multimedia Messaging Service (MMS) application, an e-mail application, a calendar application, an alarm application, a healthcare application (e.g., an application for measuring the amount of exercise or the blood glucose), or an environmental information application (e.g., an application for providing the pressure, humidity or temperature information). Additionally or alternatively, the application 134 may be an application related to information exchange between the electronic device 101 and an external electronic device (e.g., an electronic device 104). The information exchange-related application may include, for example, a notification relay application for relaying specific information to the external electronic device, or a device management application for managing the external electronic device.

For example, the notification relay application may include a function of relaying the notification information generated in other applications (e.g., the SMS/MMS application, the e-mail application, the healthcare application, the environmental information application, or the like) of the electronic device 101, to the external electronic device (e.g., the electronic device 104). Additionally or alternatively, the notification relay application may, for example, receive notification information from the external electronic device (e.g., the electronic device 104) and provide the received notification information to the user. The device management application may, for example, manage a function (e.g., a function of turning on/off the external electronic device itself (or some components thereof) or adjusting the brightness (or resolution) of a display thereof) of at least a part of the external electronic device (e.g., the electronic device 104) communicating with the electronic device 101, or may manage (e.g., install, delete or update) the application operating in the external electronic device or the service (e.g., a call service or a message service) provided from the external electronic device 104.

In various exemplary embodiments, the application 134 may include an application that is specified according to the properties (e.g., the type of an electronic device) of the external electronic device (e.g., the electronic device 104). For example, if the external electronic device is an MP3 player, the application 134 may include an application related to music playback. Similarly, if the external electronic device is a mobile medical device, the application 134 may include an application related to healthcare. In one exemplary embodiment, the application 134 may include at least one of an application specified in the electronic device 101, and an application received from the external electronic device (e.g., a server 106 or the electronic device 104).

The I/O interface 140 may, for example, send the command or data that is received from the user through an I/O device (e.g., a sensor, a keyboard or a touch screen), to the processor 120, the memory 130, the communication interface 160 or the data sharing module 170 through the bus 110. For example, the I/O interface 140 may provide the data for a user's touch input on the touch screen, to the processor 120. The I/O interface 140 may, for example, output the command or data that is received from the processor 120, the memory 130, the communication interface 160 or the data sharing module 170 through the bus 110, to the outside through the I/O device (e.g., a speaker or a display). For example, the I/O interface 140 may output the voice data that is processed by the processor 120, to the user through the speaker.

The display 150 may display a variety of information (e.g., multimedia data, text data, or the like) for the user, and may be formed as a touch screen to provide a user input interface by use of a pen or the fingers of a user.

The communication interface 160 may communicatively connect the electronic device 101 and the external electronic devices (e.g., the electronic device 104 or the server 106). For example, the communication interface 160 may be connected to a network 162 through wired/wireless communication, to communicate with the external electronic device. The wireless communication may include at least one of, for example, Wireless Fidelity (WiFi), Bluetooth (BT), Near Field Communication (NFC), GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), or the like). The wired communication may include at least one of, for example, Universal Serial Bus (USB), High Definition Multimedia Interface (HDMI), Recommended Standard 232 (RS-232), and Plain Old Telephone Service (POTS).

In one exemplary embodiment, the network 162 may be a telecommunications network. The telecommunications network may include at least one of a computer network, the Internet, Internet of Things (IoT), and a telephone network. In one exemplary embodiment, a protocol (e.g., a transport layer protocol, a data link layer protocol or a physical layer protocol) for communication between the electronic device 101 and the external electronic device 104 may be supported by at least one of the application 134, the API 133, the middleware 132, the kernel 131 or the communication interface 160.

Figure 2:
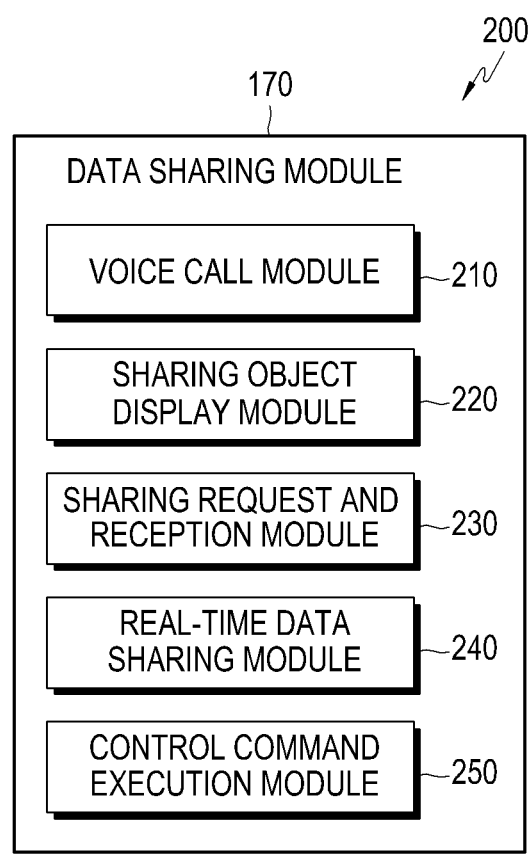
FIG. 2 is a schematic block diagram of a data sharing module included in a data sharing electronic device according to an exemplary embodiment.

FIG. 2 is a schematic block diagram of a data sharing module included in a data sharing electronic device according to an exemplary embodiment of the present disclosure.

Referring to FIG. 2, the data sharing module 170 may include a voice call module 210, a sharing object display module 220, a sharing request and reception module 230, a real-time data sharing module 240, and a control command execution module 250.

The data sharing module 170 may be incorporated into the processor 120. The processor 120 may collectively control the data sharing module 170.

The voice call module 210 may connect a voice call, with a receiving-side electronic device. The sharing object display module 220 may display a sharing object on a display. The sharing request and reception module 230 may detect a selection of the sharing object, and if the sharing object is selected, the sharing request and reception module 230 may request sharing of data corresponding to the sharing object from the receiving-side electronic device, and receive a sharing acceptance for the data from the receiving-side electronic device. The real-time data sharing module 240 transmits the requested data to the receiving-side electronic device in real time to share the requested data in real time. The control command execution module 250 may execute the control command related to the shared data in the same way as the receiving-side electronic device. Although the shared data may include, for example, music, photos, video, texts, web content and elements, the shared data is not limited thereto in the exemplary embodiments of the present disclosure.

Figure 3:
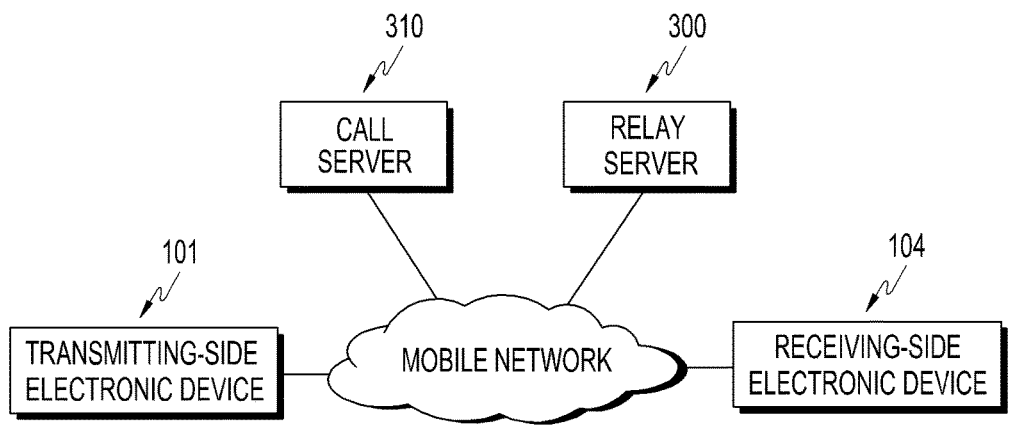
FIG. 3 illustrates data sharing electronic devices being connected to a mobile network according to an exemplary embodiment.

FIG. 3 illustrates data sharing electronic devices connected to a mobile network according to an exemplary embodiment of the present disclosure. Referring to FIG. 3, a transmitting-side electronic device 101, a receiving-side electronic device 104, a relay server 300, and a call server 310 may be connected to a mobile network to perform communication with each other.

Figure 4:
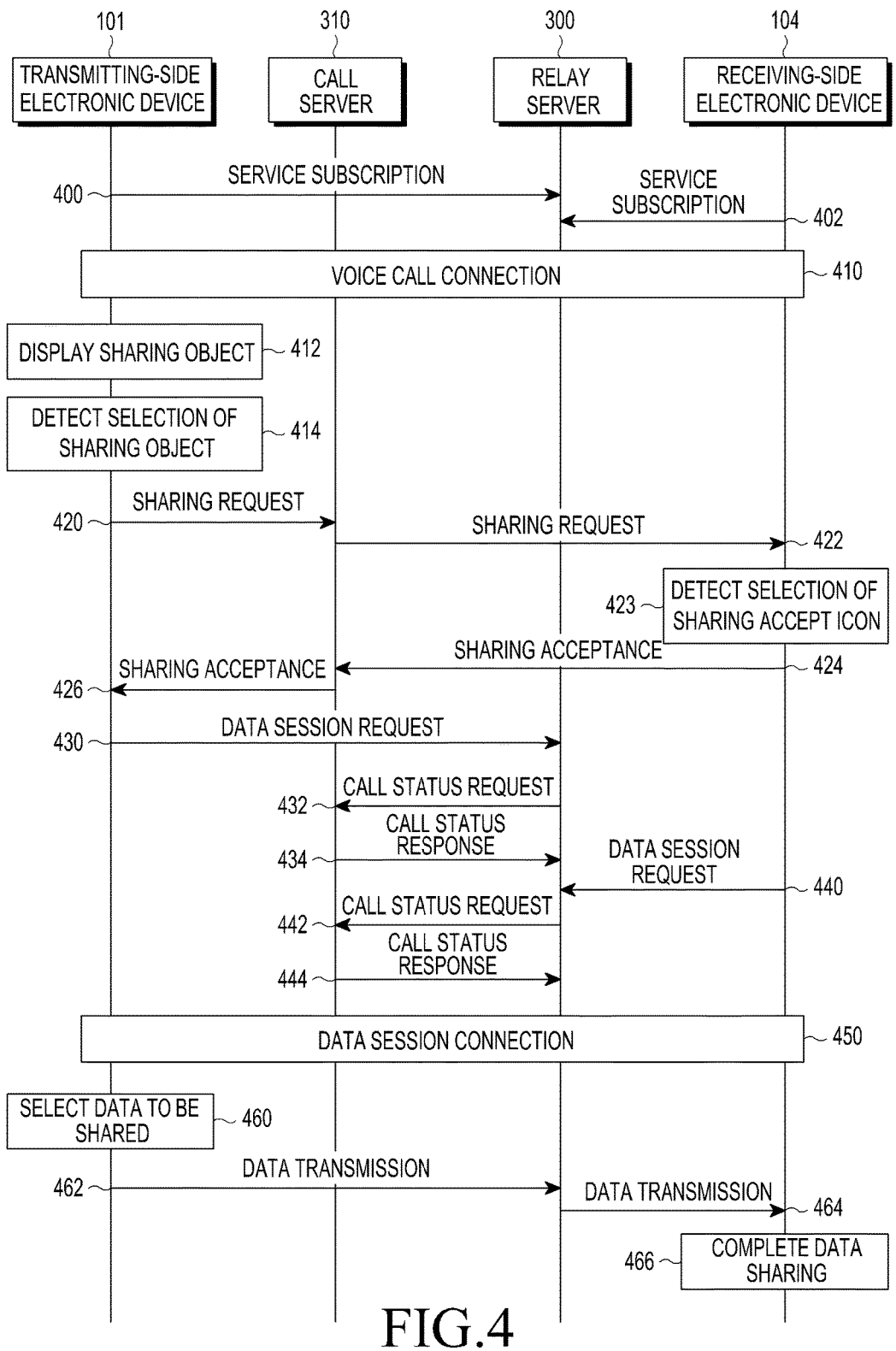
FIGS. 4 and 5 are flowcharts for a control method of data sharing electronic devices according to an exemplary embodiment.
Figure 5:
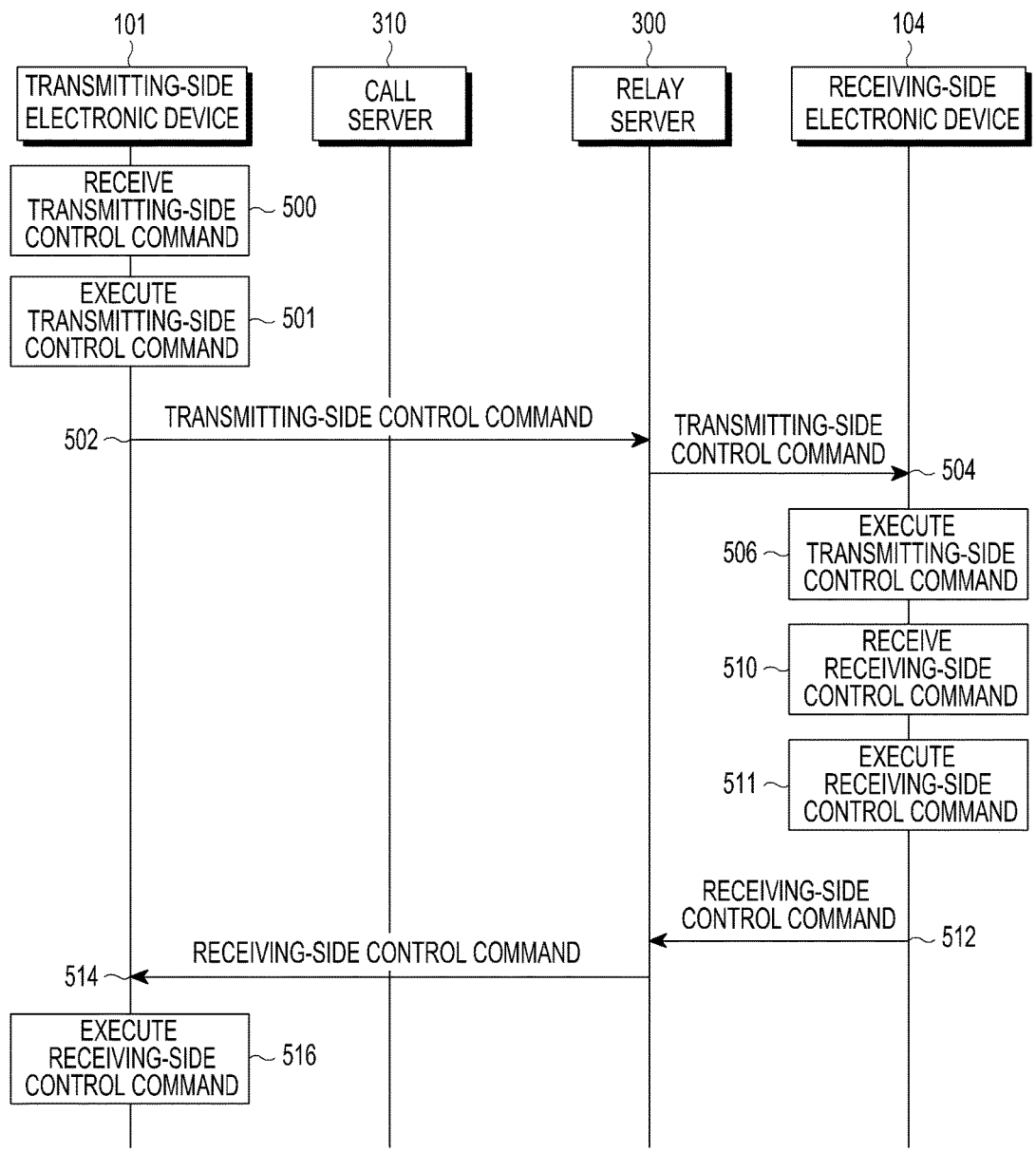

FIGS. 4 and 5 are flowcharts for a control method of data sharing between electronic devices according to an exemplary embodiment of the present disclosure. FIGS. 6 to 12 illustrate execution screens of data sharing electronic devices according to an exemplary embodiment of the present disclosure.

Referring to FIGS. 4 and 5, a transmitting-side electronic device 101 and a receiving-side electronic device 104 may subscribe to a sharing service in a relay server 300 in operations 400 and 402. A processor 120 of the transmitting-side electronic device 101 may send a subscription request for the sharing service to the relay server 300. In response to the subscription request for the sharing service from the transmitting-side electronic device 101, the relay server 300 may send a subscription acceptance response message for the sharing service to the transmitting-side electronic device 101 in operation 400. In addition, the receiving-side electronic device 104 may also send a subscription request message for the sharing service to the relay server 300 in the same way as the transmitting-side electronic device 101 in operation 402.

The processor 120 of the transmitting-side electronic device 101 may send an identifier for identifying the transmitting-side electronic device 101 to the relay server 300. Therefore, the relay server 300 may identify the transmitting-side electronic device 101 based on the received identifier. A processor of the receiving-side electronic device 104 may also store an identifier for identifying the receiving-side electronic device 104 in the relay server 300. Therefore, the relay server 300 may identify the receiving-side electronic device 104 based on the received identifier. In addition, the relay server 300 may receive the pre-registered counterpart SNS information and profile information (images, alias and the like), which can be provided on a screen (or a voice call dialing screen) of a phone application or a screen of a contact application (or a contact list phonebook), from the counterpart electronic device, and provide the received information.

Next, the transmitting-side electronic device 101 may connect a voice call with the receiving-side electronic device 104 in operation 410. The transmitting-side electronic device 101 may connect a voice call with the receiving-side electronic device 104 over a mobile network. In this case, the transmitting-side electronic device 101 may connect a voice call with the receiving-side electronic device 104 through a call server 310. For example, the processor 120 of the transmitting-side electronic device 101 may send a request for connecting a voice call with the receiving-side electronic device 104, to the call server 310. In response to the connection request, the call server 310 may send an acceptance request for the voice call connection to the receiving-side electronic device 104. In response to the acceptance request, the call server 310 may connect the voice call between the transmitting-side electronic device 101 and the receiving-side electronic device 104.

For example, the transmitting-side electronic device 101 may run a phone application and send a request for a voice call connection with the receiving-side electronic device 104 to the call server 310. Referring to FIGS. 6A to 6E, as shown in FIG. 6A, the processor 120 of the transmitting-side electronic device 101 may run a phone application 600 and display the phone application 600 on the display 150. As shown in FIG. 6B, the processor 120 of the transmitting-side electronic device 101 may run a contact application which stores a list of contacts of a user of the transmitting-side electronic device, and receive an input for a selection of a contact corresponding to a user of the receiving-side electronic device 104. In addition, the processor 120 of the transmitting-side electronic device 101 may receive a call connection command. For example, in FIG. 6B, the processor 120 of the transmitting-side electronic device 101 may receive an input for a selection of a contact corresponding to the receiving-side electronic device 104, such as 'Kimberly Lopez' 612. As shown in FIG. 6C, the processor 120 of the transmitting-side electronic device 101 may send a request for a voice call connection with the receiving-side electronic device 104 corresponding to 'Kimberly Lopez' 612, to the call server 310. In this case, as shown in FIG. 6C, the processor 120 of the transmitting-side electronic device 101 may display a Call Connecting (or Alerting) image 622 on the display 150. In response to the connection request, the call server 310 may send an acceptance request for the voice call connection to the receiving-side electronic device 104. As shown in FIG. 6D, the processor of the receiving-side electronic device 104 may display a Call Receiving (or Ringing) image 641 on its display. The receiving-side electronic device 104 may send its acceptance for the voice call connection to the call server 310. In response to the acceptance request, the call server 310 may connect the voice call between the transmitting-side electronic device 101 and the receiving-side electronic device 104. As shown in FIG. 6E, the processor 120 of the transmitting-side electronic device 101 may display a Phone Conversation image 631 on the display 150.

Next, in operation 412, the transmitting-side electronic device 101 may display a sharing object on the display 150. In other words, the processor 120 of the transmitting-side electronic device 101 may display a sharing object on the display 150. For example, the sharing object may be an icon symbolizing the type of the data corresponding to the sharing object. In addition, the data may be, for example, audio streaming, an Internet Uniform Resource Locator (URL), an image, an event or coordinates.

For example, as shown in FIG. 6E, the processor 120 may display sharing objects 634 to 638 on the display 150. The sharing objects may be formed as one or more icons 634 to 638 in a bar-shaped area 632. The sharing objects may be displayed on a Phone Conversation screen 630. The sharing objects may be transparently formed on the Phone Conversation image 631 displayed on the Phone Conversation screen 630. Alternatively, the sharing objects may be displayed at the bottom of the Phone Conversation image 631.

At least one of the icons may symbolize the type of the data. For example, among the icons shown in FIG. 6E, the Image icon 634 may symbolize an image, such as email, in the data, the Internet icon 636 may symbolize an Internet URL in the data, and the Audio icon 638 may symbolize audio streaming in the data.

As described below, if the Image icon 634 is selected, data concerning the image may be shared between the transmitting-side electronic device 101 and the receiving-side electronic device 104. If the Internet icon 636 is selected, data concerning the Internet URL may be shared between the transmitting-side electronic device 101 and the receiving-side electronic device 104. If the Audio icon 638 is selected, data concerning the audio streaming may be shared between the transmitting-side electronic device 101 and the receiving-side electronic device 104.

Next, in operation 414, the transmitting-side electronic device 101 may detect a selection of the sharing object. The processor 120 of the transmitting-side electronic device 101 may detect a selection of the sharing object. For example, the processor 120 may detect a touch on the icon corresponding to the sharing object. If the touch on the icon is detected, the processor 120 may detect a selection of the sharing object corresponding to the icon.

For example, in FIG. 6E, the processor 120 may detect a touch on the Audio icon 638. If a touch on the Audio icon 638 is detected, the processor 120 may detect a selection of the sharing object corresponding to the Audio icon 638.

Next, if the sharing object 634 is selected, the transmitting-side electronic device 101 may send a request for sharing of data corresponding to the sharing object, to the receiving-side electronic device 104. In this case, the processor 120 of the transmitting-side electronic device 101 may send the request for sharing of data to the call server 310 in operation 420. The call server 310 may send the sharing request to the receiving-side electronic device 104 in operation 422.

If the sharing object such as the icon 634 is selected, the processor 120 of the transmitting-side electronic device 101 may send a request for sharing of data corresponding to the sharing object to the receiving-side electronic device 104.

For example, if the sharing object such as the Audio icon 638 is selected in FIG. 6E, the processor 120 of the transmitting-side electronic device 101 may send a request for sharing of data such as audio streaming corresponding to the sharing object to the receiving-side electronic device 104.

Next, in operations 424 and 426, the transmitting-side electronic device 101 may receive a sharing acceptance for the data from the receiving-side electronic device 104 through the call server 310. In this case, the receiving-side electronic device 104 may send a sharing acceptance message for the data to the call server 310, and the call server 310 may send or forward the sharing acceptance message to the transmitting-side electronic device 101.

For example, the receiving-side electronic device 104 may perform sharing acceptance for the data in response to a detection of a touch on an Accept icon displayed on its display. For example, when sending a request for sharing of the data to the receiving-side electronic device 104, the transmitting-side electronic device 101 may display a notification 641 indicating that the transmitting-side electronic device 101 is requesting sharing of the data, as shown in FIG. 7A. As shown in FIG. 7B, the receiving-side electronic device 104 may display an Accept icon 644 and a Reject icon 646 on its display. In this case, in response to a detection of a touch on the Accept icon 644, the processor of the receiving-side electronic device 104 may perform sharing acceptance for the data. The processor of the receiving-side electronic device 104 may send the sharing acceptance to the transmitting-side electronic device 101.

Next, in operation 450, for the transmitting-side electronic device 101, its data session may be connected to the receiving-side electronic device 104. For example, in operation 430, the transmitting-side electronic device 101 may send a request for the data session to the relay server 300. In response to the data session request, the relay server 300 may send a request for confirmation of the call status of the transmitting-side electronic device 101 to the call server 310 in operation 432. In response to the request, if the transmitting-side electronic device 101 is communicating with the receiving-side electronic device 104, the call server 310 may send a response for the call status to the relay server 300 in operation 434. In operation 440, the receiving-side electronic device 104 may send a request for the data session to the relay server 300. In response to the data session request, the relay server 300 may send a request for confirmation of the call status of the receiving-side electronic device 104 to the call server 310 in operation 442. In response to the request, if the receiving-side electronic device 104 is communicating with the transmitting-side electronic device 101, the call server 310 may send a response for the call status to the relay server 300 in operation 444. In operation 450, if the call status of the receiving-side electronic device 104 with the transmitting-side electronic device 101 is confirmed, the relay server 300 may connect a data session between the transmitting-side electronic device 101 and the receiving-side electronic device 104 through the call server 310.

Although the data session connection process is performed after the sharing request and sharing acceptance processes (operations 420 to 426) in FIG. 4, various exemplary embodiments of the present disclosure will not be limited to the order assumed in FIG. 4.

Next, the transmitting-side electronic device 101 may transmit the data in real time to the receiving-side electronic device 104 to share the data in real time. For example, in operation 460, the processor 120 of the transmitting-side electronic device 101 may receive an input for a selection of data to be shared. The processor 120 of the transmitting-side electronic device 101 may transmit the selected data to the receiving-side electronic device 104. In this case, the processor 120 of the transmitting-side electronic device 101 may transmit the selected data to the relay server 300 in operation 462, and the relay server 300 may transmit the data to the receiving-side electronic device 104 in operation 464. In operation 466, the processor of the receiving-side electronic device 104 may store the received data in its memory, completing the data sharing.

For example, referring to FIGS. 8A-8C, the data may be audio streaming. In this case, as shown in FIG. 8A, the transmitting-side electronic device 101 may transmit the data such as the audio streaming (e.g., an audio file named 'Over the Horizon') to the receiving-side electronic device 104 in real time. The transmitting-side electronic device 101 may display a control window 650 for controlling the audio streaming. In the control window 650 may be displayed an icon for playing the audio streaming, an icon for stopping the audio streaming, or a bar indicating the playing time. As shown in FIG. 8B, the receiving-side electronic device 104 may receive the data such as the streaming audio, and play the received data. The receiving-side electronic device 104 may display a window 660 indicating reception of the data on a Phone Conversation screen. In the window 660, indicating reception of the data, may be displayed the name of the streaming audio or the bar indicating the playing time. As shown in FIG. 8C, the processor 120 of the transmitting-side electronic device 101 may receive an input for a selection of data to be shared. For example, the processor 120 of the transmitting-side electronic device 101 may display a menu on which one of a plurality of audio streaming 670 can be selected by the user.

As another example, the data may be an image or video. In this case, the transmitting-side electronic device 101 may transmit the image or video file itself, transmit decoded data of the image or video in a streaming manner, or capture a playback screen of the image or video and transmit the captured playback screen. One of these transmission methods may be selected based on a user's input, or selected in the relay server 300.

Next, the transmitting-side electronic device 101 may execute the control command related to the shared data in the same way as the receiving-side electronic device 104. For example, in operation 500, the transmitting-side electronic device 101 may receive an input for a transmitting-side control command by detecting a selection of a control command icon included in a control window. In operation 501, the transmitting-side electronic device 101 may execute the transmitting-side control command. The transmitting-side electronic device 101 may send the transmitting-side control command to the receiving-side electronic device 104. In this case, the transmitting-side electronic device 101 may send the transmitting-side control command to the receiving-side electronic device 104 through the relay server 300 in operations 502 and 504. In operation 506, the receiving-side electronic device 104 may execute the transmitting-side control command. On the contrary, the receiving-side electronic device 104 may receive an input for a receiving-side control command by detecting a selection of a control command icon included in a control window in operation 510. In operation 511, the receiving-side electronic device 104 may execute the receiving-side control command. The receiving-side electronic device 104 may send the receiving-side control command to the transmitting-side electronic device 101. In this case, the receiving-side electronic device 104 may send the receiving-side control command to the transmitting-side electronic device 101 through the relay server 300 in operations 512 and 514. In operation 516, the transmitting-side electronic device 101 may execute the receiving-side control command.

Referring to FIGS. 9A to 11B, a description will be made of an example of a process in which the transmitting-side electronic device 101 and the receiving-side electronic device 104 execute a control command for the shared data in the same way. Referring to FIG. 9A, if the sharing object such as the Internet icon 636 is selected, the processor 120 of the transmitting-side electronic device 101 may send a request for sharing of data such as the Internet URL corresponding to the sharing object, to the receiving-side electronic device 104. If the transmitting-side electronic device 101 sends the request for sharing of data to the receiving-side electronic device 104, the receiving-side electronic device 104 may display a notification 680 indicating that the transmitting-side electronic device 101 is requesting sharing of the data, as shown in FIG. 9B. As shown in FIG. 9C, the receiving-side electronic device 104 may display an Accept icon 684 and a Reject icon 686 on its display. In response to a detection of a touch on the Accept icon 684, the processor of the receiving-side electronic device 104 may perform sharing acceptance for the data. The processor of the receiving-side electronic device 104 may send the sharing acceptance to the transmitting-side electronic device 101. The transmitting-side electronic device 101 may transmit the data such as the Internet URL to the receiving-side electronic device 104. As shown in FIG. 11A, the receiving-side electronic device 104 may receive the data such as the Internet URL, and access the Internet URL (See 690).

Figures 10A, 10B:
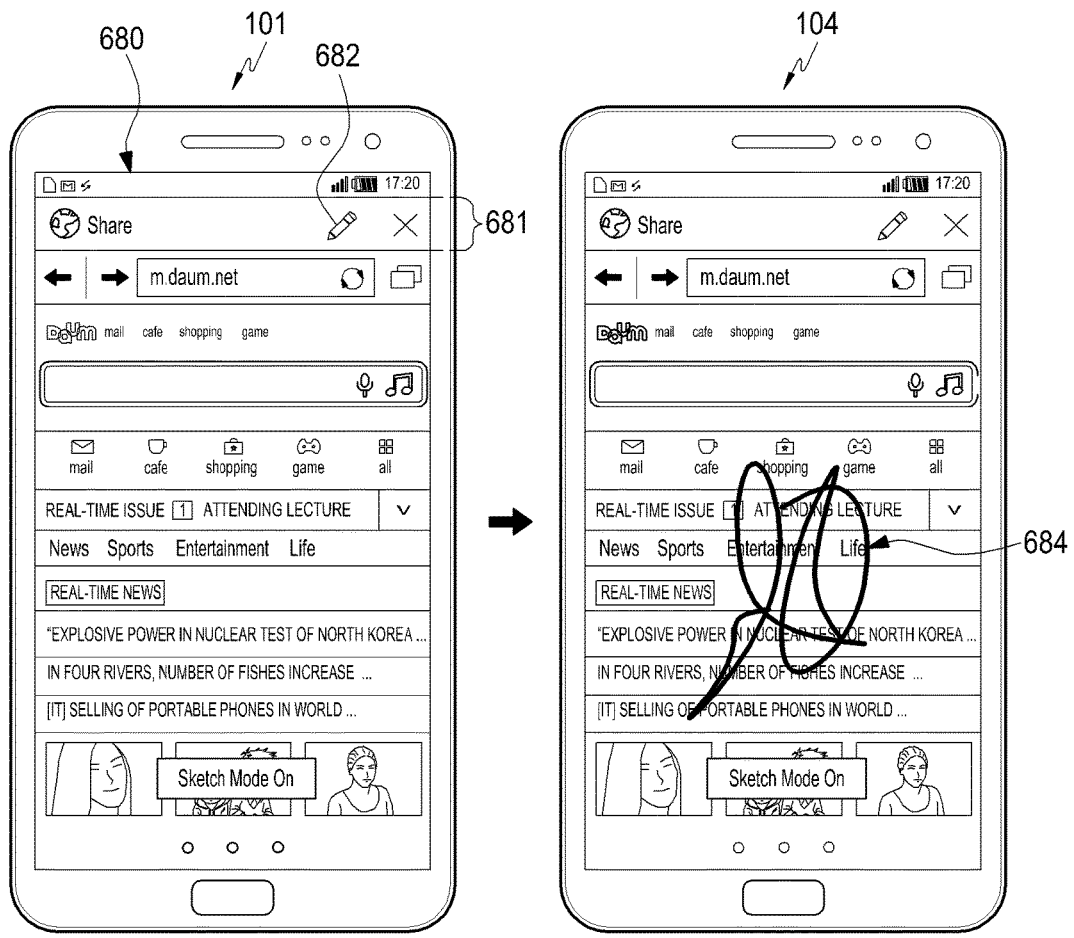

In this case, the transmitting-side electronic device 101 may receive an input for a transmitting-side control command by detecting a selection of a control command icon included in a control window in operation 500. For example, the control command may be a Note command. As shown in FIG. 10A, the transmitting-side electronic device 101 may display a control window such as a Note window 681 on the display 150. The Note window 681 may include a control command icon such as an Enter Notes icon 682. The transmitting-side electronic device 101 may receive an input for a transmitting-side control command such as a note input command by detecting a selection of the Enter Notes icon 682 included in the Note window 681. The transmitting-side electronic device 101 may execute the transmitting-side control command in operation 501. For example, as shown in FIG. 10B, the transmitting-side electronic device 101 may execute the transmitting-side control command such as the note input command, and display a note 684. The transmitting-side electronic device 101 may send the transmitting-side control command such as the note input command to the receiving-side electronic device 104. The receiving-side electronic device 104 may execute the transmitting-side control command. The note input command may be a command to capture a screen of the note and transmit the captured screen, or a command to transmit only the change data (e.g., a change in note input coordinates) corresponding to the note. The note input command may be set by the user or the processor.

Figures 11A, 11B:
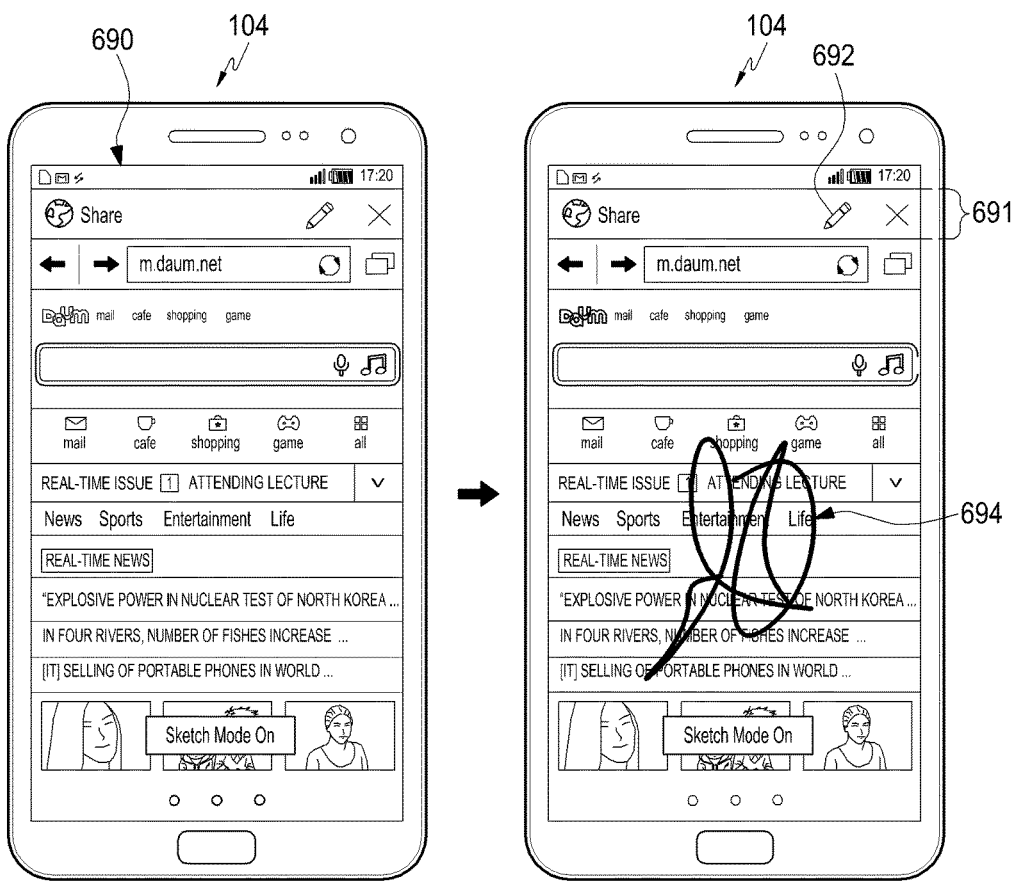

As shown in FIG. 11B, the receiving-side electronic device 104 may execute the transmitting-side control command such as the note input command, and display a note 694. In addition, the receiving-side electronic device 104 may also receive an input for a receiving-side control command such as a note input command by detecting a selection of an Enter Notes icon 692 included in a Note window 691. Similarly, the receiving-side electronic device 104 may also send the receiving-side control command such as the note input command to the transmitting-side electronic device 101. The transmitting-side electronic device 101 may execute the receiving-side control command.

Figures 12A, 12B:
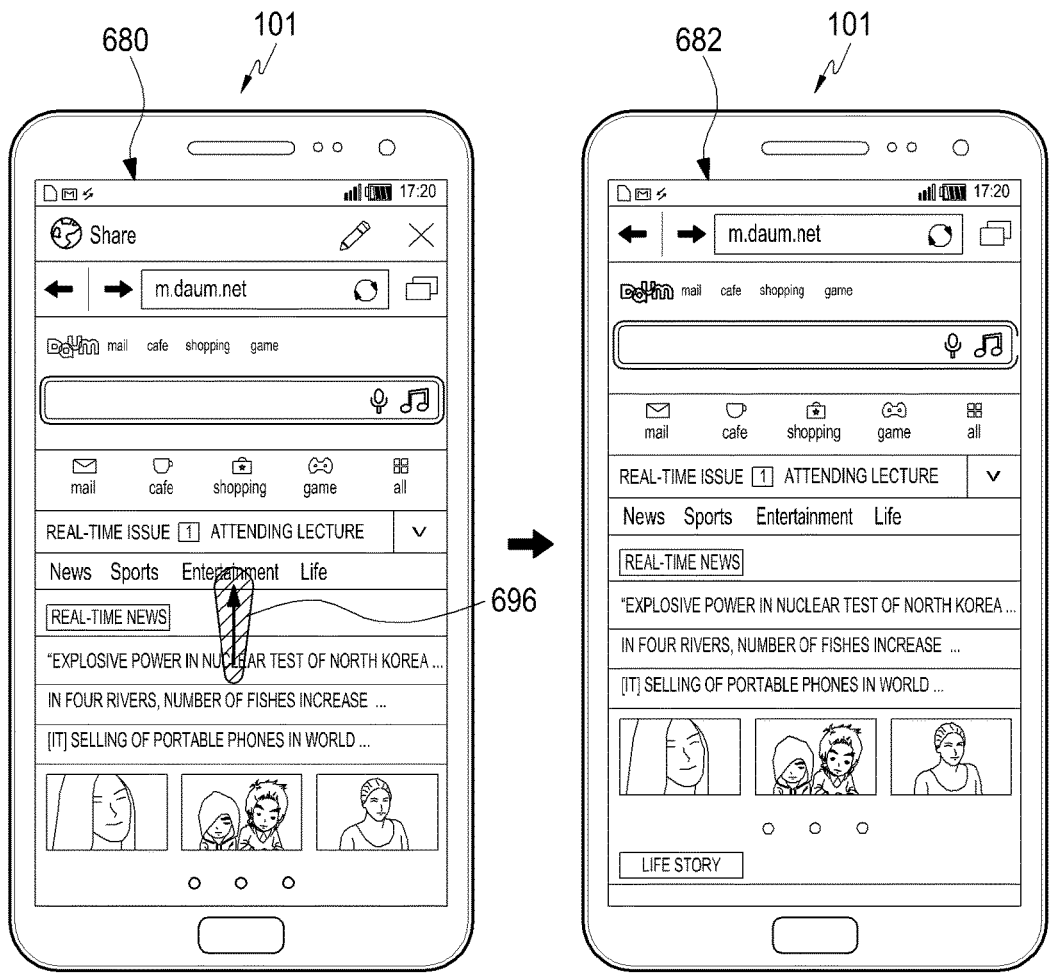

Referring to FIGS. 12A and 12B, as another example, the transmitting-side control command may be a screen control command for controlling the Internet screen. The screen control command may be, for example, a navigation command (Go Back, Go Forward, View Back and the like) or a scroll command. As shown in FIG. 12A, the transmitting-side control command may be, for example, a scroll-down command 696 among the screen commands. Therefore, if the transmitting-side control command such as the scroll-down command is executed, the Internet screen may be scrolled down as shown in FIG. 12B. In this case, the transmitting-side electronic device 101 may send the transmitting-side control command such as the scroll-down command to the receiving-side electronic device 104. The receiving-side electronic device 104 may execute the transmitting-side control command such as the scroll-down command, to scroll down the Internet screen in the same way as in FIG. 12B.

Therefore, in accordance with an exemplary embodiment of the present disclosure, the transmitting-side electronic device can share the data corresponding to the sharing object with the receiving-side electronic device during the voice call connection. In particular, in accordance with an exemplary embodiment of the present disclosure, the sharing object for the data sharing can be displayed on the Phone Conversation screen. In accordance with an exemplary embodiment of the present disclosure, since the data can be shared during the voice call connection, a separate connection process or execution of an application is not required. In accordance with an exemplary embodiment of the present disclosure, the transmitting-side electronic device may share data with the receiving-side electronic device with less data transmission, compared with the high-data traffic scheme such as a video call. In addition, in accordance with an exemplary embodiment of the present disclosure, the transmitting-side electronic device and the receiving-side electronic device may share a control command.

Figure 13:
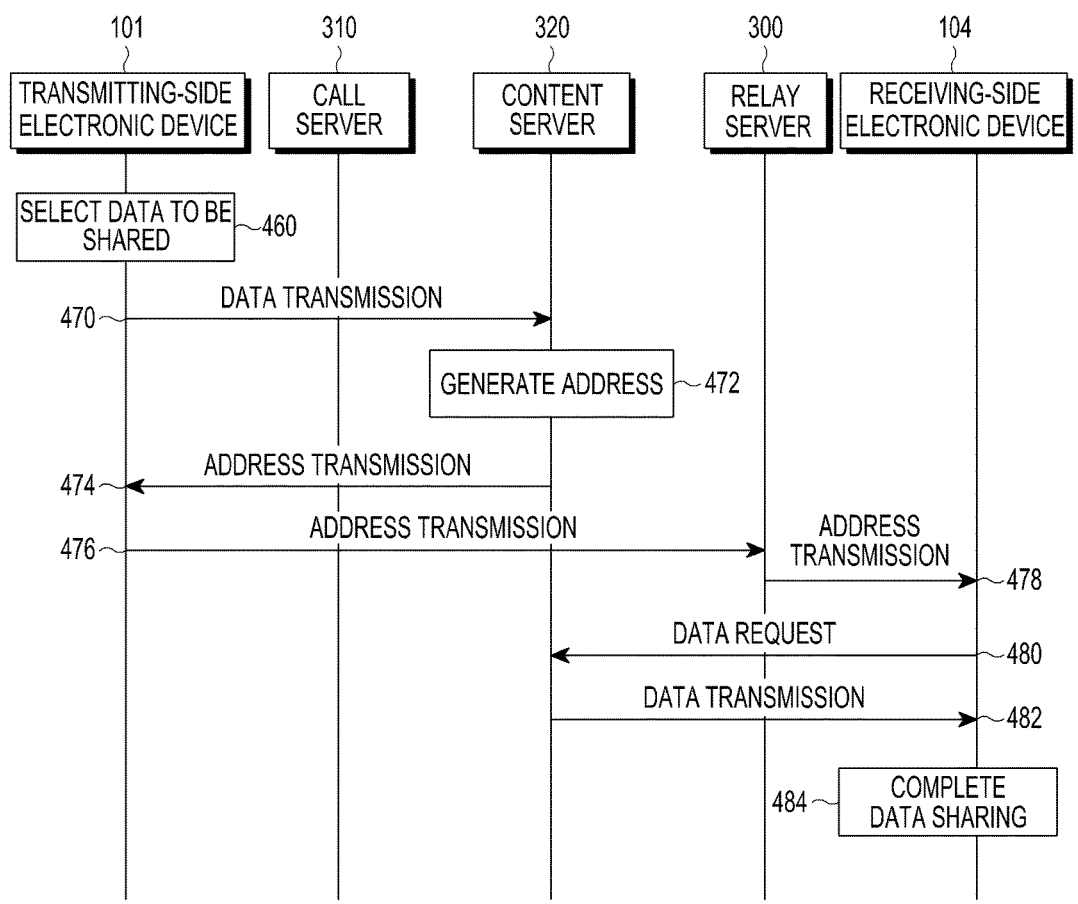
FIG. 13 is a flowchart for a control method of data sharing electronic devices according to another exemplary embodiment.

FIG. 13 is a flowchart for a control method of data sharing electronic devices according to another exemplary embodiment of the present disclosure. FIGS. 14A to 15C illustrate execution screens of data sharing electronic devices according to another exemplary embodiment of the present disclosure. The flowchart of FIG. 13 is the same as that of FIG. 4 in terms of operations 400 to 450, so a description thereof will be omitted. In accordance with another exemplary embodiment of the present disclosure, the transmitting-side electronic device may transmit the data to the receiving-side electronic device in real time using an address corresponding to the data, which is generated in a content server, thereby sharing the data in real time.

Next, in operation 460, the processor 120 of the transmitting-side electronic device 101 may receive an input for a selection of data to be shared. In operation 470, the processor 120 of the transmitting-side electronic device 101 may transmit the selected data to a content server 320. In operation 472, the content server 320 may generate an address corresponding to the data. In operation 474, the content server 320 may transmit the address to the transmitting-side electronic device 101. The transmitting-side electronic device 101 may transmit the address to the relay server 300 in operation 476, and the relay server 300 may transmit the address to the receiving-side electronic device 104 in operation 478. In operation 480, the receiving-side electronic device 104 may transmit the address to the content server 320 to request the data. In operation 482, the content server 320 may transmit the data corresponding to the address to the receiving-side electronic device 104. In operation 484, the receiving-side electronic device 104 may receive the data, completing the data sharing.

Figures 14A, 14B, 14C:
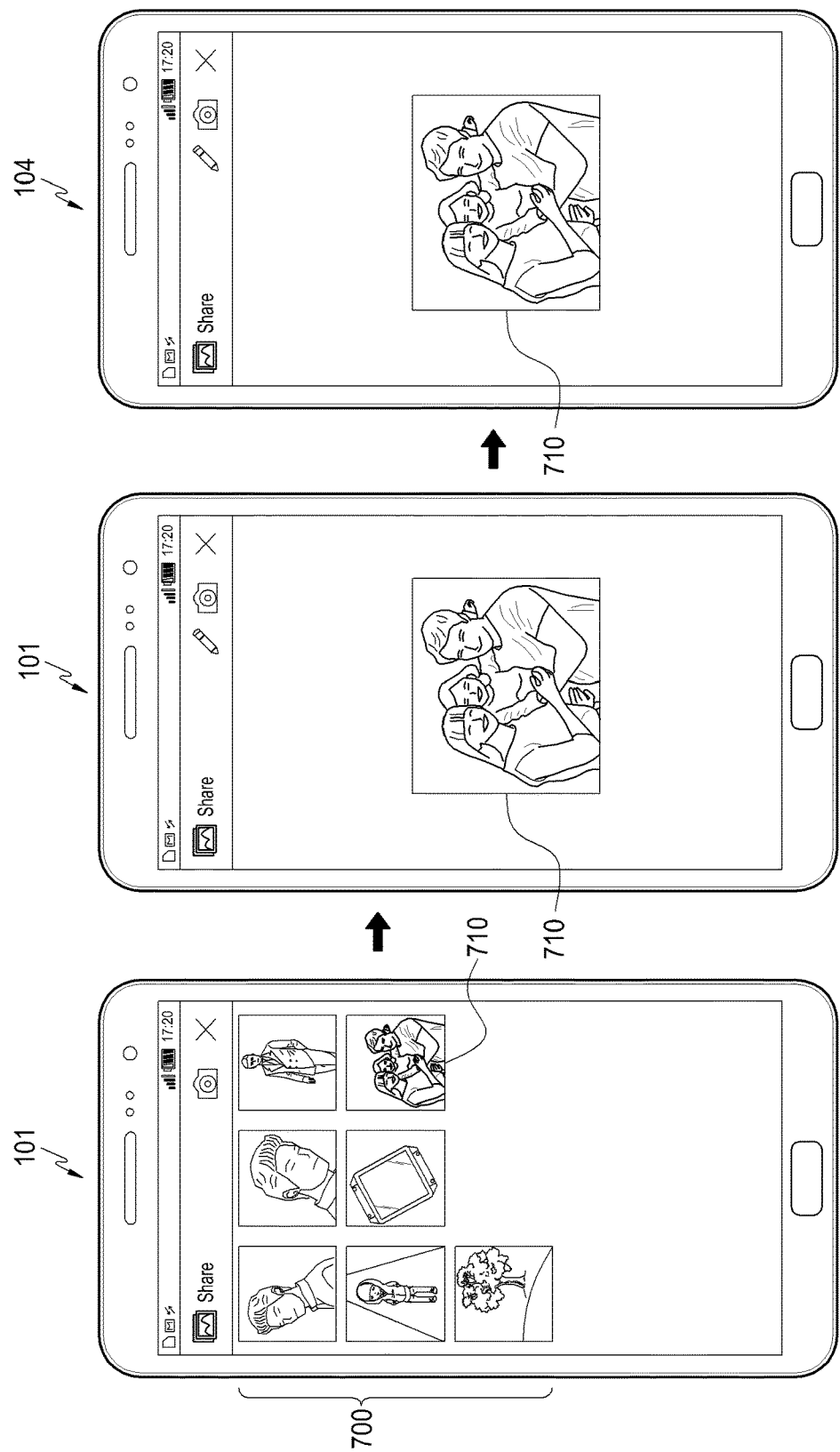
FIGS. 14A-14C and 15A-15C illustrate execution screens of data sharing electronic devices according to another exemplary embodiment.

Reference will now be made to FIGS. 14A to 15C to describe another exemplary embodiment of the present disclosure. Upon detecting a selection of the Image icon 634 corresponding to the sharing object in FIG. 6E, the transmitting-side electronic device 101 may share data corresponding to the image with the receiving-side electronic device 104. In this case, the transmitting-side electronic device 101 may receive an input for a selection of the sharing object. In other words, as shown in FIGS. 14A and 14B, the transmitting-side electronic device 101 may receive an input for a selection of one image 710 from among one or more images 700.

Figures 15A, 15B, 15C:
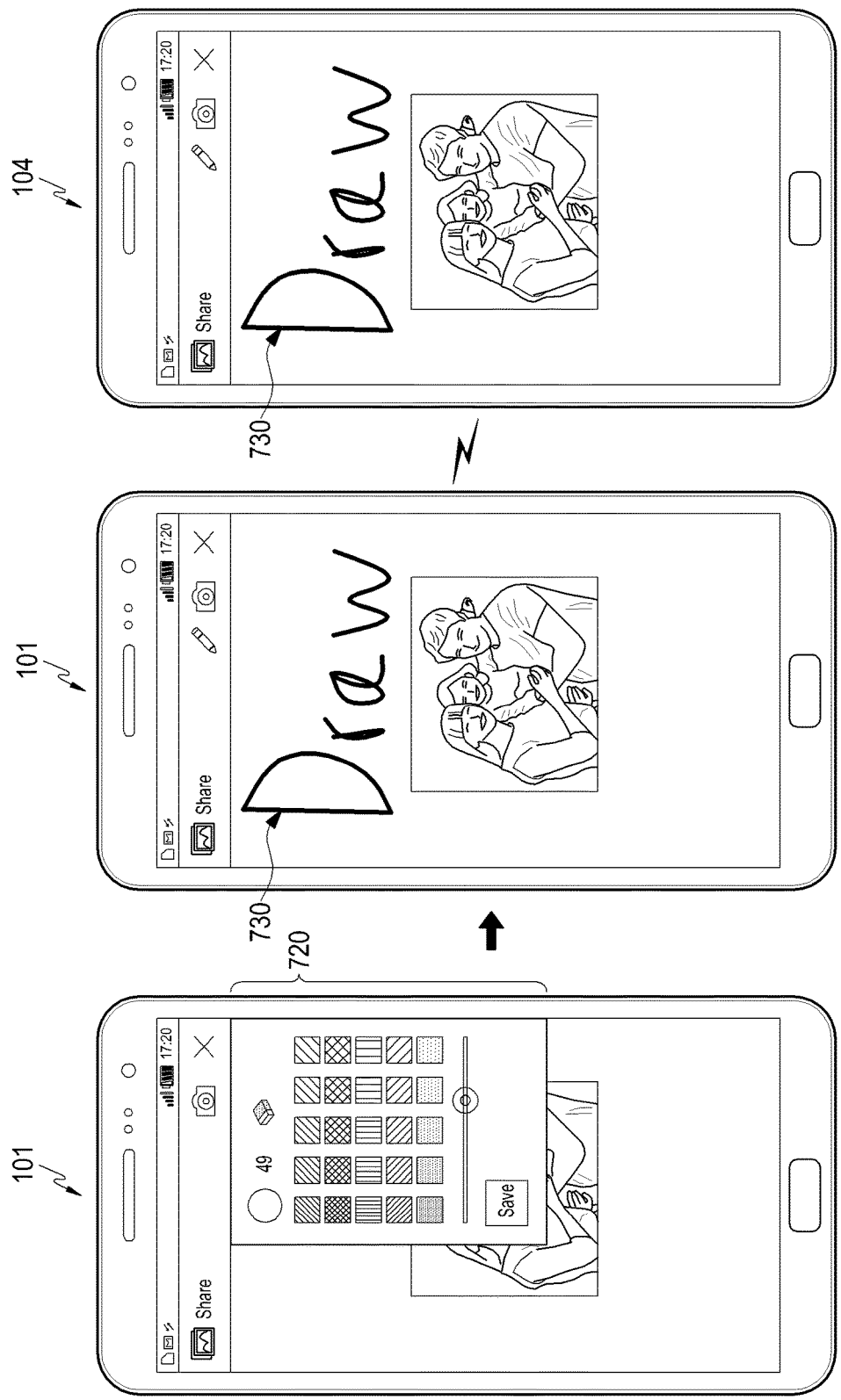

In operation 470, the transmitting-side electronic device 101 may transmit the image 710 to the content server 320. In operation 472, the content server 320 may generate an address corresponding to the image 710. In operation 474, the content server 320 may transmit the address corresponding to the storage location of the image 710 in the content server to the transmitting-side electronic device 101. The transmitting-side electronic device 101 may transmit the address to the relay server 300 in operation 476, and the relay server 300 may transmit the address to the receiving-side electronic device 104 in operation 478. In operation 480, the receiving-side electronic device 104 may transmit the address to the content server 320 to request data, specifically, the image 710. In operation 482, the content server 320 may transmit the image 710 corresponding to the address to the receiving-side electronic device 104. In operation 484, the receiving-side electronic device 104 may receive the image 710, completing the data sharing. As shown in FIG. 14C, the receiving-side electronic device 104 may display the image 710 on its display. In operation 500, the transmitting-side electronic device 101 may receive the control command such as the notes. For example, as shown in FIG. 15A, the transmitting-side electronic device 101 may display a control window such as a note window 720 on the display 150. The note window 720 may include an icon for changing the color or thickness of a pen for making notes on the display screen. The transmitting-side electronic device 101 may receive an input for a transmitting-side control command such as a note input command. For example, the note input command may include a command to change the position, color or thickness of the pen. Therefore, the transmitting-side electronic device 101 may send the note input command to the receiving-side electronic device 104. For example, if the transmitting-side electronic device 101 transmits a note input command 'Draw' to the receiving-side electronic device 104 as shown in FIG. 15B, the note input command may be executed in the same way as shown in FIG. 15C.

Figure 16:
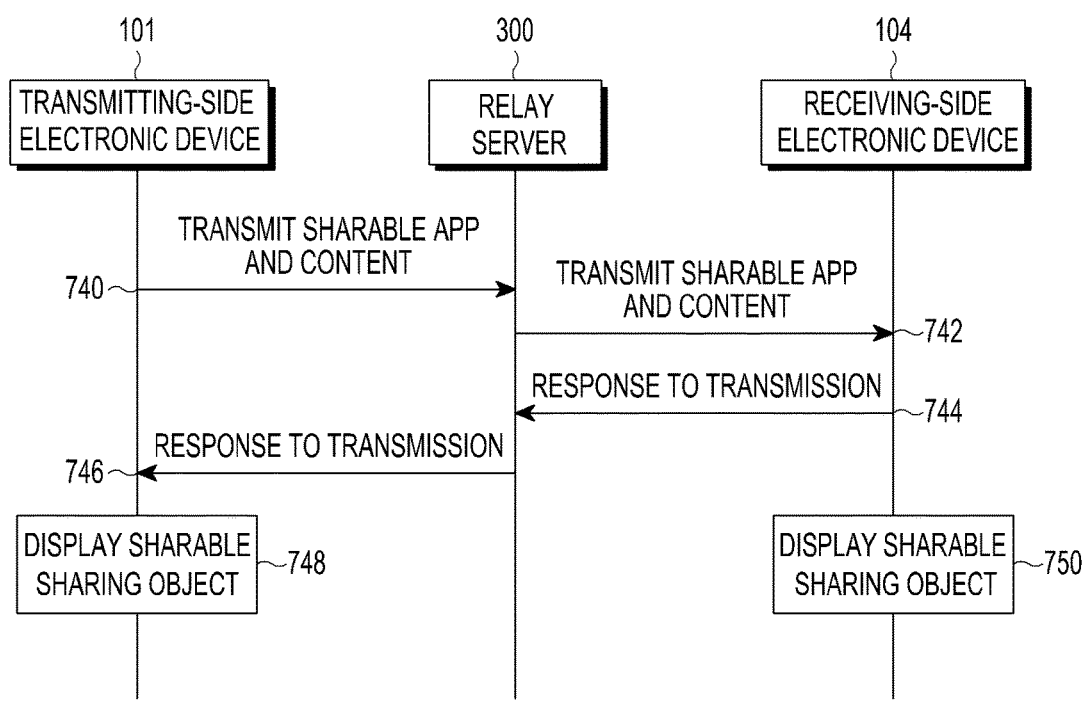
FIG. 16 is a flowchart for a control method of data sharing electronic devices according to another exemplary embodiment.

FIG. 16 is a flowchart for a control method of data sharing electronic devices according to further another exemplary embodiment of the present disclosure. In another exemplary embodiment of the present disclosure illustrated in FIG. 16, among one or more sharing objects, a sharing object that a transmitting-side electronic device can share with a receiving-side electronic device can be displayed on the display. The flowchart shown in FIG. 16 may include the same process as that of FIGS. 4 and 5.

Referring to FIG. 16, in operation 740, the transmitting-side electronic device 101 may transmit information about the sharable application and content to the relay server 300. The information about the sharable application and content may mean information about the application and content that can be shared in the transmitting-side electronic device 101.

For example, among an image application, an Internet application and an audio application, the applications that can be shared in the transmitting-side electronic device 101 may include the image application and the Internet application. In this case, in operation 740, the transmitting-side electronic device 101 may transmit information indicating that only the image of the image application and the URL of the Internet application can be shared, to the relay server 300. Upon receiving the information in operation 742, the receiving-side electronic device 104 may send a response to the transmission to the relays server 300 in operation 744. In this case, the application that can be shared in the receiving-side electronic device 104 may be the image application. Then, in operation 744, the receiving-side electronic device 104 may transmit information indicating that only the image of the image application can be shared, to the relay server 300 as a response to the transmission. Since only the image of the image application can be shared, the transmitting-side electronic device 101 that has received the information may display only the sharing object corresponding to the image application on the display 150. Referring back to FIG. 6E, in this case, the transmitting-side electronic device 101 may display on the display 150 only the Image icon 634 among the Image icon 634, the Internet icon 636 and the Audio icon 638. The receiving-side electronic device 104 may also display only the Image icon 634 on its display.

FIGS. 17A to 22 illustrate execution screens of data sharing electronic devices according to another exemplary embodiment of the present disclosure. In another exemplary embodiment of the present disclosure illustrated in FIGS. 17A to 22, the transmitting-side electronic device 101 may receive a User's Contact image, a Call Connecting image, a Phone Conversation image, a Call Ending image or SNS profile stored in the receiving-side electronic device 104, from an editing server, and display the received image on the display 150.

The receiving-side electronic device 104 may transmit the User's Contact image, the Call Connecting image, the Phone Conversation image, the Call Ending image or the SNS profile to the editing server. The editing server may store in its memory the User's Contact image, the Call Connecting image, the Phone Conversation image, the Call Ending image, or the SNS profile. In response to the user of the receiving-side electronic device 104, the editing server may register the Contact image, the Call Connecting image, the Phone Conversation image, the Call Ending image or the SNS profile.

In response to an operation by the user of the receiving-side electronic device 104, the transmitting-side electronic device 101 may receive the Contact image, the Call Connecting image, the Phone Conversation image, the Call Ending image or the SNS profile from the editing server, and store them in its memory. The transmitting-side electronic device 101 may display the Contact image in the contact application. The transmitting-side electronic device 101 may display the Call Connecting image on a Call Connecting screen of a phone application. The transmitting-side electronic device 101 may display the Phone Conversation image on a Phone Conversation screen of the phone application. The transmitting-side electronic device 101 may display the Call Ending image on a Call Ended screen of the phone application. The transmitting-side electronic device 101 may display the SNS profile on a Dial Input screen of the phone application or a screen of the contact application.

Figure 17A:
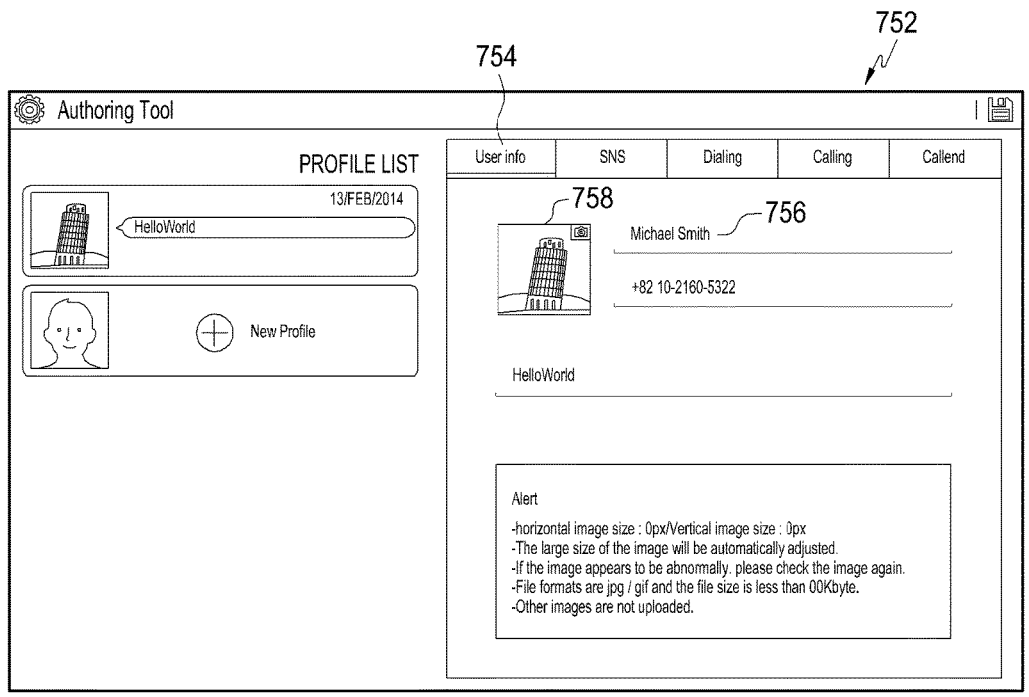
FIGS. 17A, 17B, 18A, 18B, 19A, 19B, 20A, 20B, 21A-21C, and 22 illustrate execution screens of data sharing electronic devices according to another exemplary embodiment.
Figure 17B:
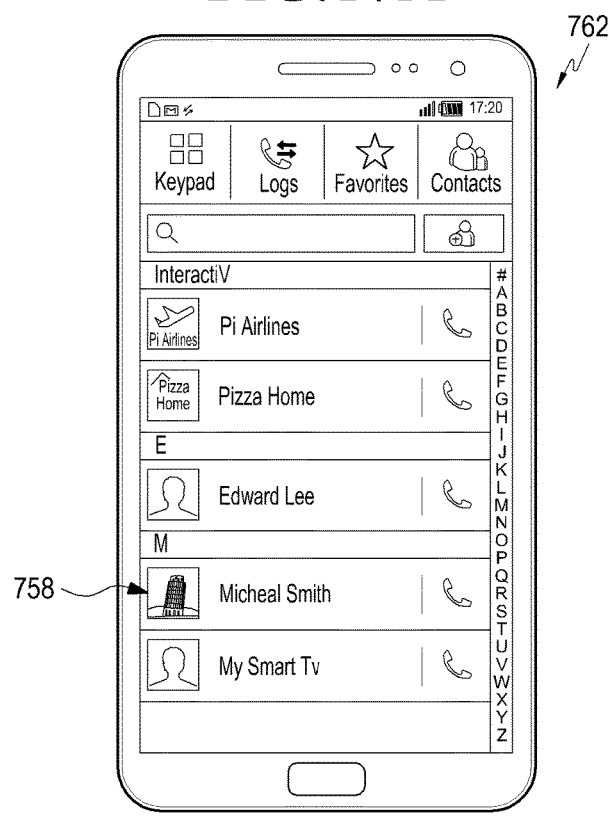

For example, as shown in FIG. 17A, the receiving-side electronic device 104 may transmit a User's Contact image to the editing server to register the image. FIG. 17A illustrates a screen 752 for registration of user information in the editing server. For example, a Contact image 758 may be registered for the user having a name 'Michael Smith' 756 and a phone number '+82 10-2160-5322' of a user information tab 754. In response to an operation by the user of the receiving-side electronic device 104, the transmitting-side electronic device 101 may receive the Contact image 758 from the editing server, and store the received image in its memory. As shown in FIG. 17B, the transmitting-side electronic device 101 may display the Contact image 758 for the user having the name 'Michael Smith' 756 and the phone number '+82 10-2160-5322' in a contact application 762.

Figure 18A:
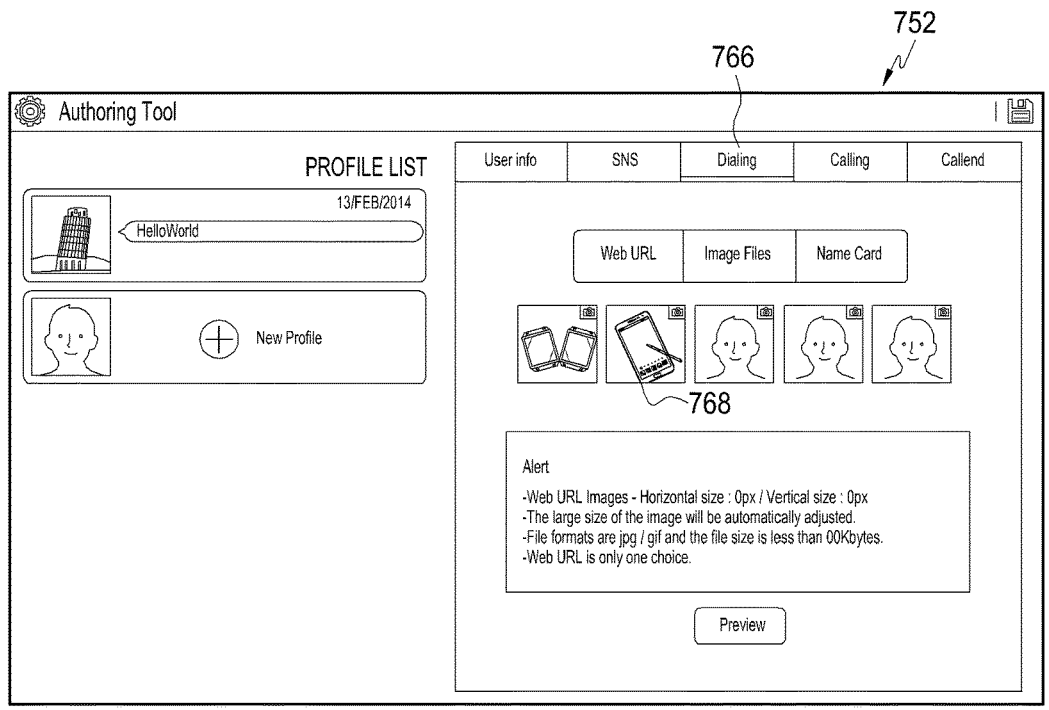
Figure 18B:
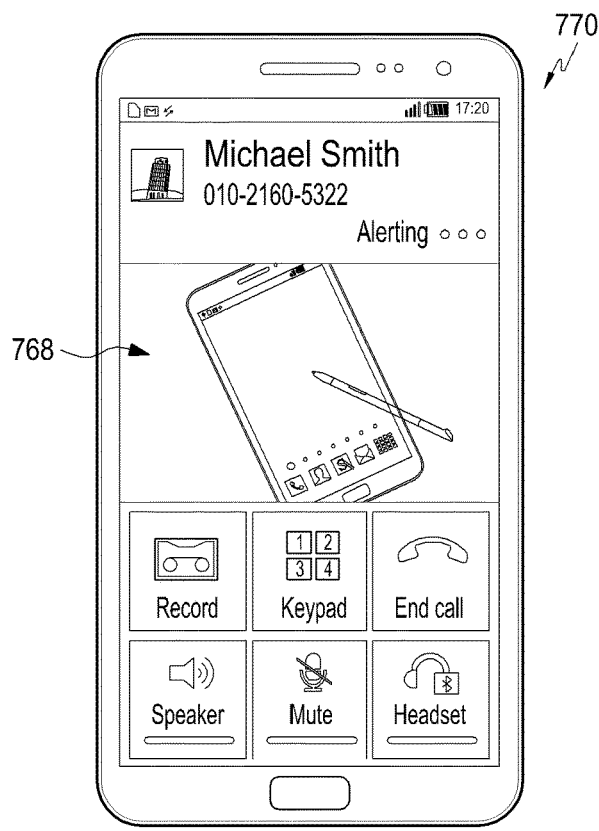

As another example, as shown in FIG. 18A, the receiving-side electronic device 104 may transmit a Call Connecting image of the user of the receiving-side electronic device to the editing server to register the image. FIG. 18A illustrates a screen 752 for registration in the editing server. For example, a Call Connecting image 768 of a Dialing tab 766 may be registered. In response to the user of the receiving-side electronic device 104, the transmitting-side electronic device 101 may receive the Call Connecting image 768 from the editing server, and store the received image in its memory. As shown in FIG. 18B, the transmitting-side electronic device 101 may display the Call Connecting image 768 on the Call Connecting screen 770 of the phone application.

Figure 19A:
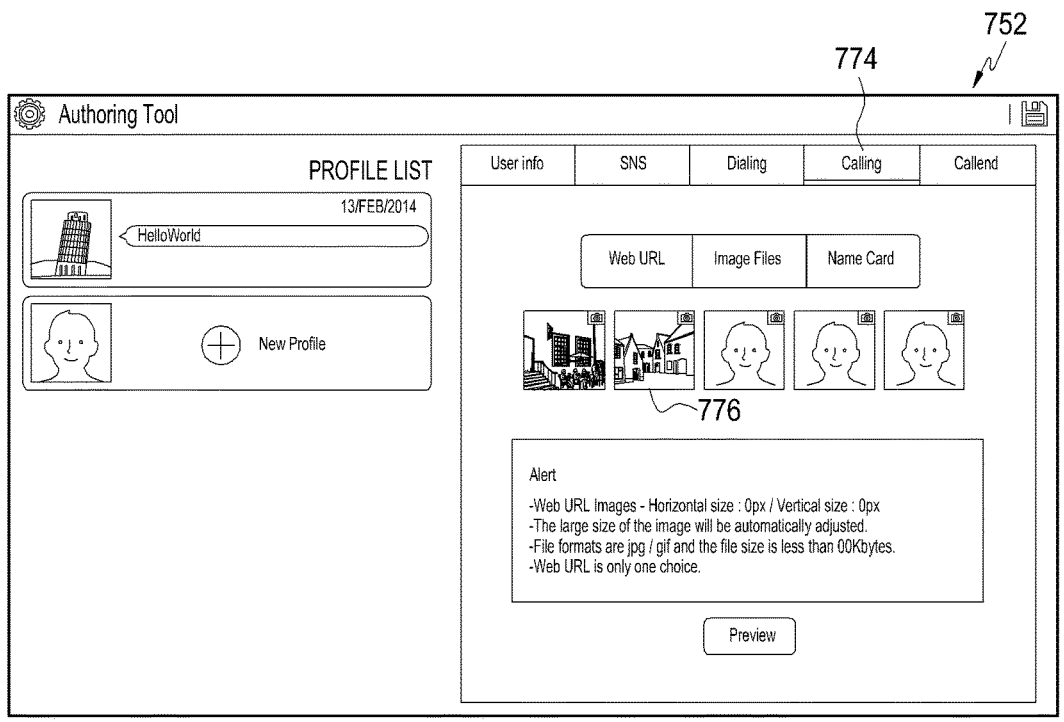
Figure 19B:
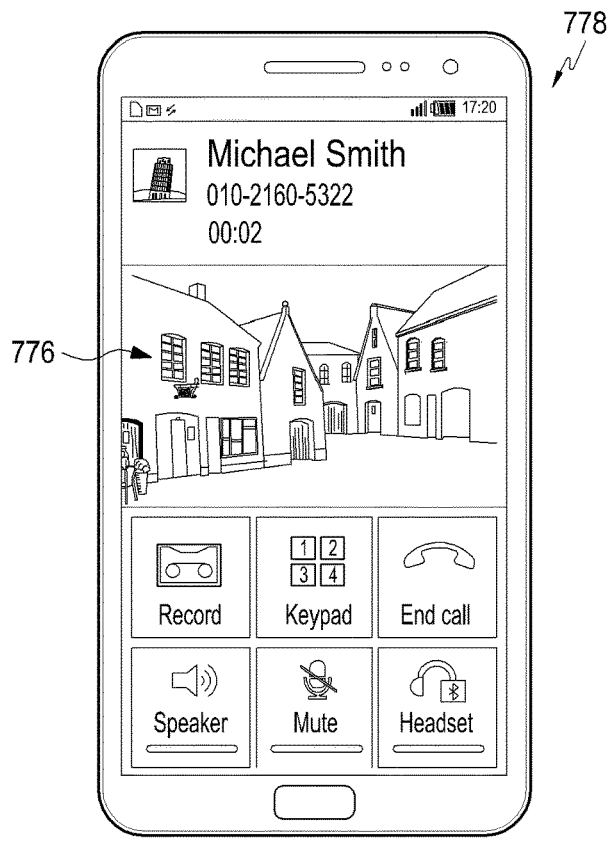

As another example, as shown in FIG. 19A, the receiving-side electronic device 104 may transmit a Phone Conversation image of the user to the editing server to register the image. FIG. 19A illustrates a screen 752 for registration of contact information in the editing server. For example, a Phone Conversation image 776 of a Calling tab 774 may be registered. In response to an operation by the user of the receiving-side electronic device 104, the transmitting-side electronic device 101 may receive the Phone Conversation image 776 from the editing server, and store the received image in its memory. As shown in FIG. 19B, the transmitting-side electronic device 101 may display the Phone Conversation image 776 on a Call Ended screen 778 of the phone application.

Figure 20A:
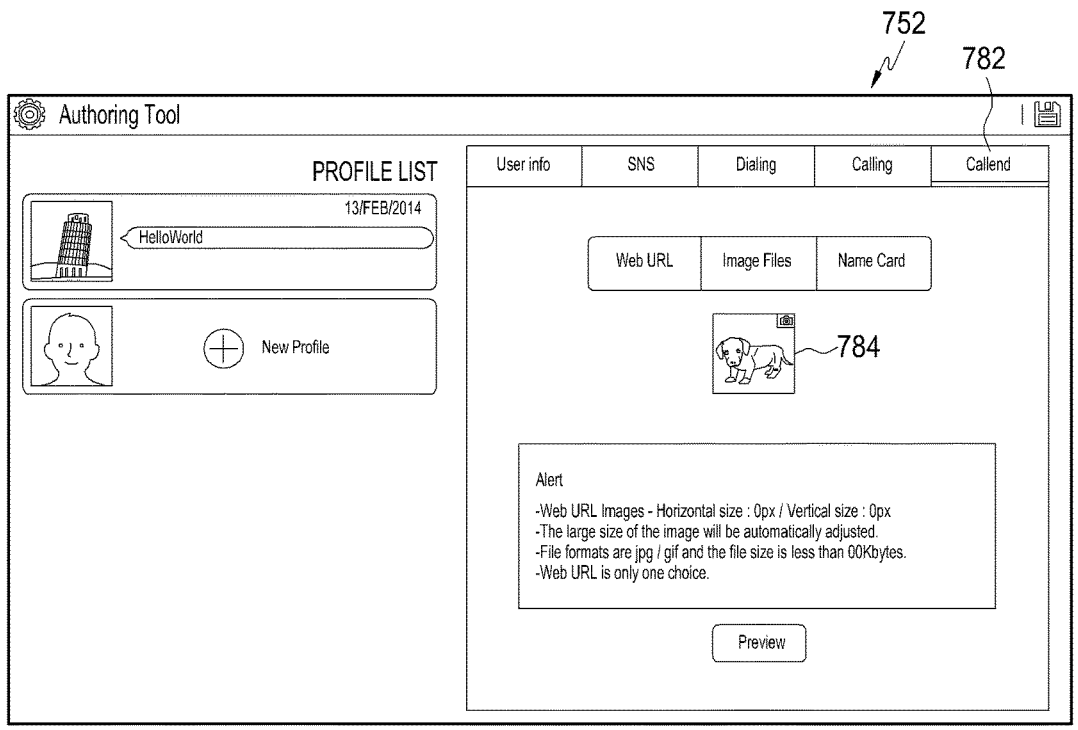
Figure 20B:
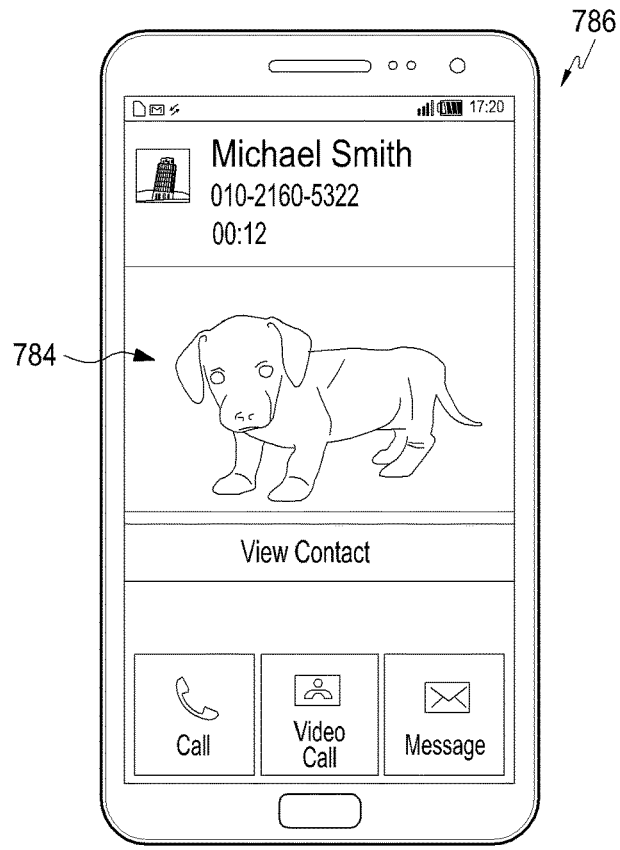

As another example, as shown in FIG. 20A, the receiving-side electronic device 104 may transmit a Call Ending image of the user to the editing server to register the image. FIG. 20A illustrates a screen 752 for registration in the editing server. For example, a Call Ending image 784 of a Call-end tab 782 may be registered. In response to the user of the receiving-side electronic device 104, the transmitting-side electronic device 101 may receive the Call Ending image 784 from the editing server, and store the received image in its memory. As shown in FIG. 20B, the transmitting-side electronic device 101 may display the Call Ending image 784 on a Call Ended screen 786 of the phone application.

Figure 21A:
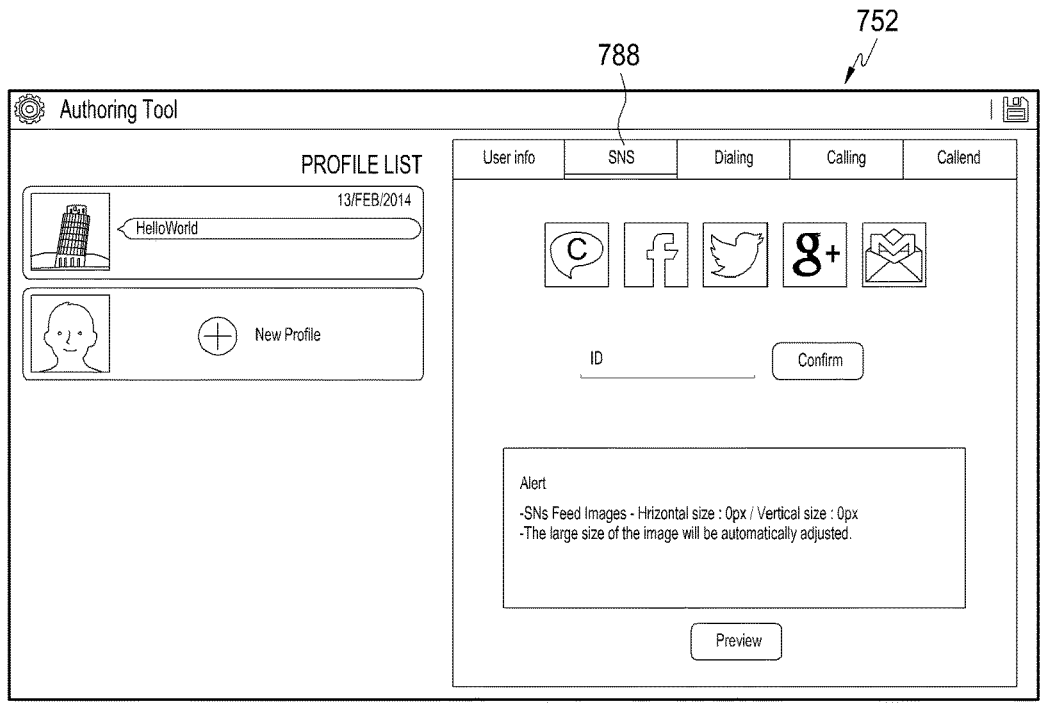
Figures 21B, 21C:

As another example, as shown in FIG. 21A, the receiving-side electronic device 104 may transmit an SNS profile of the user of the receiving-side electronic device to the editing server to register the SNS profile. FIG. 21A illustrates a screen 752 for registration of user information in the editing server. For example, the user may be registered in an SNS tab 788. In response to an operation by the user of the receiving-side electronic device 104, the transmitting-side electronic device 101 may receive the SNS profile from the editing server, and store the received SNS profile in its memory. As shown in FIG. 21B, the transmitting-side electronic device 101 may display an SNS profile 792 on a Dial Input screen 790 of the phone application. As shown in FIG. 21C, the transmitting-side electronic device 101 may display the SNS profile 792 on a screen 794 of the contact application.

Figure 22:
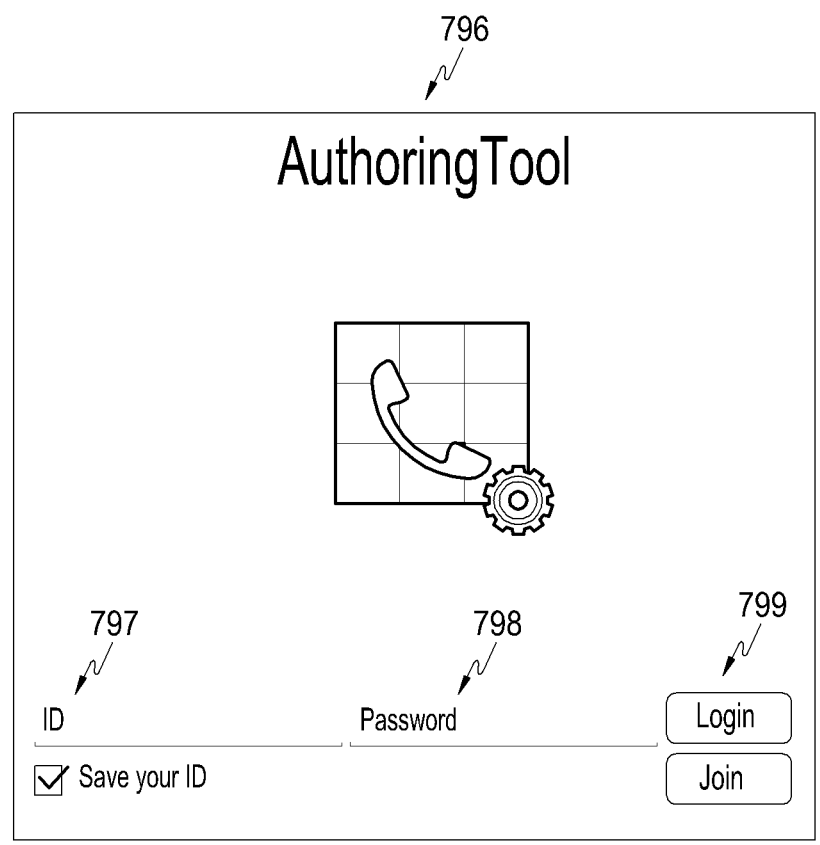

As another example, as shown in FIG. 22, the receiving-side electronic device 104 may enter an authoring tool 796 included in the editing server, to perform user registration. The authoring tool 796 may include an item for inputting an ID 797 and a password 798. Therefore, the editing server may register only the user logged in (799) by receiving the ID 797 and the password 798 in the authoring tool 796, to register a Contact image of the registered user, a Call Connecting image, a Phone Conversation image, a Call Ending image or an SNS profile.

Figure 23:
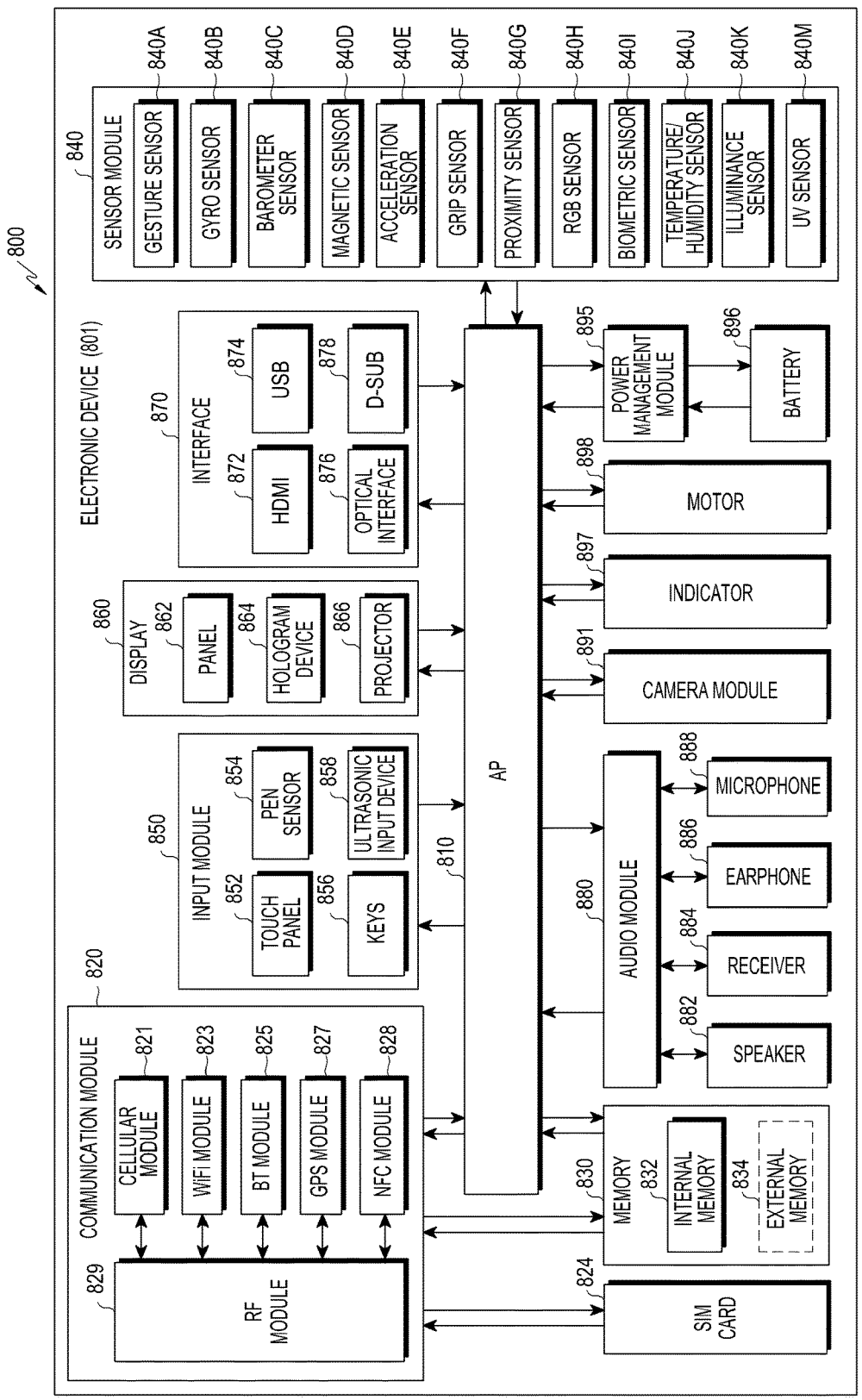
FIG. 23 is a block diagram of an electronic device according to various exemplary embodiments.

FIG. 23 is a block diagram 800 of an electronic device 801 according to various exemplary embodiments of the present disclosure. The electronic device 801 may configure, for example, the entirety or part of the electronic device 101 shown in FIG. 1. Referring to FIG. 23, the electronic device 801 may include at least one Application Processor (AP) 810, a communication module 820, a Subscriber Identification Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may control a plurality of hardware or software components connected to the AP 810 by driving the operating system or application program, and may process and compute a variety of data including multimedia data. The AP 810 may be implemented in, for example, System on Chip (SoC). In one exemplary embodiment, the AP 810 may further include a Graphic Processing Unit (GPU, not shown).

The communication module 820 (e.g., the communication interface 160) may perform data transmission/reception in communication between the electronic device 801 (e.g., the electronic device 101) and other electronic devices (e.g., the electronic device 104 or the server 106) connected thereto over the network. In one exemplary embodiment, the communication module 820 may include a cellular module 821, a WiFi module 823, a BT module 825, a GPS module 827, an NFC module 828, and a Radio Frequency (RF) module 829.

The cellular module 821 may provide voice call, video call, text service, Internet service, or the like over the network (e.g., LTE, LTE-A, CDMA, WCDMA, UMTS, WiBro, GSM, or the like). The cellular module 821 may perform identification and authentication on the electronic devices in the communication network using, for example, a subscriber identification module (e.g., the SIM card 824). In one exemplary embodiment, the cellular module 821 may perform at least some of the functions that the AP 810 can provide. For example, the cellular module 821 may perform at least some of the multimedia control functions.

In one exemplary embodiment, the cellular module 821 may include a Communication Processor (CP). The cellular module 821 may be implemented in, for example, SoC. Although components such as the cellular module 821 (e.g., the CP), the memory 830 or the power management module 895 are shown as components independent of the AP 810 in FIG. 23, the AP 810 may be implemented to include at least some (e.g., the cellular module 821) of the components according to one exemplary embodiment of the present disclosure.

In one exemplary embodiment, the AP 810 or the cellular module 821 (e.g., the CP) may load, on a volatile memory, the command or data received from at least one of a non-volatile memory and other components connected thereto, and process the loaded command or data. The AP 810 or the cellular module 821 may store in a non-volatile memory the data that is received from or generated by at least one of other components.

Each of the WiFi module 823, the BT module 825, the GPS module 827, or the NFC module 828 may include, for example, a processor for processing the data that is transmitted and received therethrough. Although the cellular module 821, the WiFi module 823, the BT module 825, the GPS module 827, or the NFC module 828 are shown as separate components in FIG. 23, at least some (e.g., two or more components) of the cellular module 821, the WiFi module 823, the BT module 825, the GPS module 827 and the NFC module 828 may be incorporated into one Integrated Chip (IC) or IC package according to one exemplary embodiment of the present disclosure. For example, at least some (e.g., a CP corresponding to the cellular module 821 or a WiFi processor corresponding to the WiFi module 823) of the processors corresponding to the cellular module 821, the WiFi module 823, the BT module 825, the GPS module 827 and the NFC module 828 may be implemented in one SoC.

The RF module 829 may transmit and receive data, for example, RF signals. Although not shown, the RF module 829 may include, for example, a transceiver, a Power Amp Module (PAM), a frequency filter, a Low Noise Amplifier (LNA), or the like. The RF module 829 may further include parts (e.g., conductors or conducting wires) for transmitting and receiving electromagnetic waves in the free space in wireless communication. Although the cellular module 821, the WiFi module 823, the BT module 825, the GPS module 827 and the NFC module 828 are shown to share one RF module 829 with each other in FIG. 23, at least one of the cellular module 821, the WiFi module 823, the BT module 825, the GPS module 827 and the NFC module 828 may transmit and receive RF signals through a separate RF module according to one exemplary embodiment of the present disclosure.

The SIM card 824 may be a subscriber identification module, and may be inserted into a slot that is formed in a specific position of the electronic device. The SIM card 824 may include unique identification information (e.g., an Integrated Circuit Card Identifier (ICCID)) or subscriber information (e.g., an International Mobile Subscriber Identity (IMSI)).

The memory 830 (e.g., the memory 130) may include an internal memory 832 and an external memory 834. The internal memory 832 may include at least one of, for example, a volatile memory (e.g., a dynamic RAM (DRAM), a static RAM (SRAM), a synchronous dynamic RAM (SDRAM), or the like) and a non-volatile memory (e.g., an One Time Programmable ROM (OTPROM), a Programmable ROM (PROM), an Erasable And Programmable ROM (EPROM), an Electrically Erasable And Programmable ROM (EEPROM), a mask ROM, a flash ROM, a NAND flash memory, a NOR flash memory, or the like).

In one exemplary embodiment, the internal memory 832 may be a Solid State Drive (SSD). The external memory 834 may further include a flash drive (e.g., Compact Flash (CF), Secure Digital (SD), Micro Secure Digital (Micro-SD), Mini Secure Digital (Mini-SD), and extreme Digital (xD)), or a memory stick. The external memory 834 may be functionally connected to the electronic device 801 through a variety of interfaces. In one exemplary embodiment, the electronic device 801 may further include a storage device (or storage media) such as a hard drive.

The sensor module 840 may measure a physical quantity or detect an operating state of the electronic device 801, and convert the measured or detected information into an electrical signal. The sensor module 840 may include at least one of, for example, a gesture sensor 840A, a gyro sensor 840B, a pressure sensor 840C, a magnetic sensor 840D, an acceleration sensor 840E, a grip sensor 840F, a proximity sensor 840G, a color sensor 840H (e.g., a Red/Green/Blue (RGB) sensor), a bio sensor 840I, a temperature/humidity sensor 840J, an illuminance sensor 840K, and a Ultra Violet (UV) sensor 840M. Additionally or alternatively, the sensor module 840 may include, for example, an electronic noise (E-nose) sensor (not shown), an electromyography (EMG) sensor (not shown), an electroencephalogram (EEG) sensor (not shown), an electrocardiogram (ECG) sensor (not shown), an Infra Red (IR) sensor (not shown), iris sensor (not shown), a fingerprint sensor (not shown), or the like. The sensor module 840 may further include a control circuit for controlling at least one of the sensors belonging thereto.

The input device 850 may include a touch panel 852, a (digital) pen sensor 854, a key 856, or an ultrasonic input device 858. The touch panel 852 may recognize a touch input in at least one of, for example, capacitive, resistive, infrared and ultrasonic ways. The touch panel 852 may further include a control circuit. In the case of the capacitive way, the touch panel 852 may recognize the physical contact or proximity of the user. The touch panel 852 may further include a tactile layer. In this case, the touch panel 852 may provide a tactile feedback to the user.

The (digital) pen sensor 854 may be implemented by using, for example, a method the same as or similar to receiving a user's touch input, or a separate recognition sheet. The key 856 may include, for example, a physical button, an optical key, or a keypad. The ultrasonic input device 858 is a device that can determine data by detecting the sound waves with a microphone (e.g., a microphone 888) in the electronic device 801, through an input tool that generates an ultrasonic signal, and this device enables wireless recognition. In one exemplary embodiment, the electronic device 801 may receive a user input from an external electronic device (e.g., a computer or a server) connected thereto using the communication module 820.

The display 860 (e.g., the display 150) may include a panel 862, a hologram device 864, or a projector 866. The panel 862 may be, for example, a Liquid Crystal Display (LCD) panel, an Active-Matrix Organic Light-Emitting Diode (AM-OLED) panel or the like. The panel 862 may be implemented, for example, in a flexible, transparent or wearable manner. The panel 862 may be configured in one module together with the touch panel 852. The hologram device 864 may show a stereoscopic image in the air using the interference of light. The projector 866 may display an image by projecting the light onto the screen. The screen may be located, for example, inside or outside the electronic device 801. In one exemplary embodiment, the display 860 may further include a control circuit for controlling the panel 862, the hologram device 864 or the projector 866.

The interface 870 may include, for example, an HDMI 872, a USB 874, an optical interface 876, or a D-subminiature (D-sub) 878. The interface 870 may be incorporated, for example, into the communication interface 160 shown in FIG. 1. Additionally or alternatively, the interface 870 may include, for example, a Mobile High-Definition Link (MHL) interface, a Secure Digital (SD) card/Multi-Media Card (MMC) interface, or Infrared Data Association (IrDA) interface.

The audio module 880 may convert sounds and electronic signals in a two-way manner. At least some of the components of the audio module 880 may be incorporated, for example, into the I/O interface 140 shown in FIG. 1. The audio module 880 may process sound information that is input or output through, for example, a speaker 882, a receiver 884, an earphone 886, a microphone 888, or the like.

The camera module 891 is a device that can capture still images and videos. In one exemplary embodiment, the camera module 891 may include one or more image sensors (e.g., a front sensor or a rear sensor), a lens (not shown), an Image Signal Processor (ISP, not shown), or a flash (e.g., an LED or xenon lamp, not shown).

The power management module 895 may manage the power of the electronic device 801. Although not shown, the power management module 895 may include, for example, a Power Management Integrated Circuit (PMIC), a charger Integrated Circuit (IC), or a battery or fuel gauge.

The PMIC may be mounted, for example, in an IC or SoC semiconductor. The charging scheme can be classified into a wired charging scheme and a wireless charging scheme. The charger IC may charge a battery, and may prevent inflow of the over-voltage or over-current from the charger. In one exemplary embodiment, the charger IC may include a charger IC for at least one of the wired charging scheme and the wireless charging scheme. The wireless charging scheme may include, for example, a magnetic resonance scheme, a magnetic induction scheme, an electromagnetic scheme or the like, and may further include additional circuits for wireless charging, e.g., a coil loop, a resonant circuit, a rectifier or the like.

The battery gauge may measure, for example, the level, charging voltage, charging current or temperature of the battery 896. The battery 896 may store or generate electricity, and may supply power to the electronic device 801 using the stored or generated electricity. The battery 896 may include, for example, a rechargeable battery or a solar battery.

The indicator 897 may indicate a specific state (e.g., a boot state, a message state, charging state or the like) of the electronic device 801 or a part thereof (e.g., the AP 810). The motor 898 may convert an electrical signal into mechanical vibrations. Although not shown, the electronic device 801 may include a processing unit (e.g., a GPU) for mobile TV support. The processing unit for mobile TV support may process media data based on the standards such as, for example, Digital Multimedia Broadcasting (DMB), Digital Video Broadcasting (DVB), or Media Flow.

Each of the above-described components of the electronic device according to various exemplary embodiments of the present disclosure may be configured with one or more components or elements, and a name of the component may vary depending on the type of the electronic device. The electronic device according to various exemplary embodiments of the present disclosure may be configured to include at least one of the above-described components, and some of the components may be omitted, or the electronic device may include other additional components. Some of the components of the electronic device according to various exemplary embodiments of the present disclosure may be configured as one entity by being combined, so the entity may perform the same functions of the components as those given before the combination.

Figure 24:
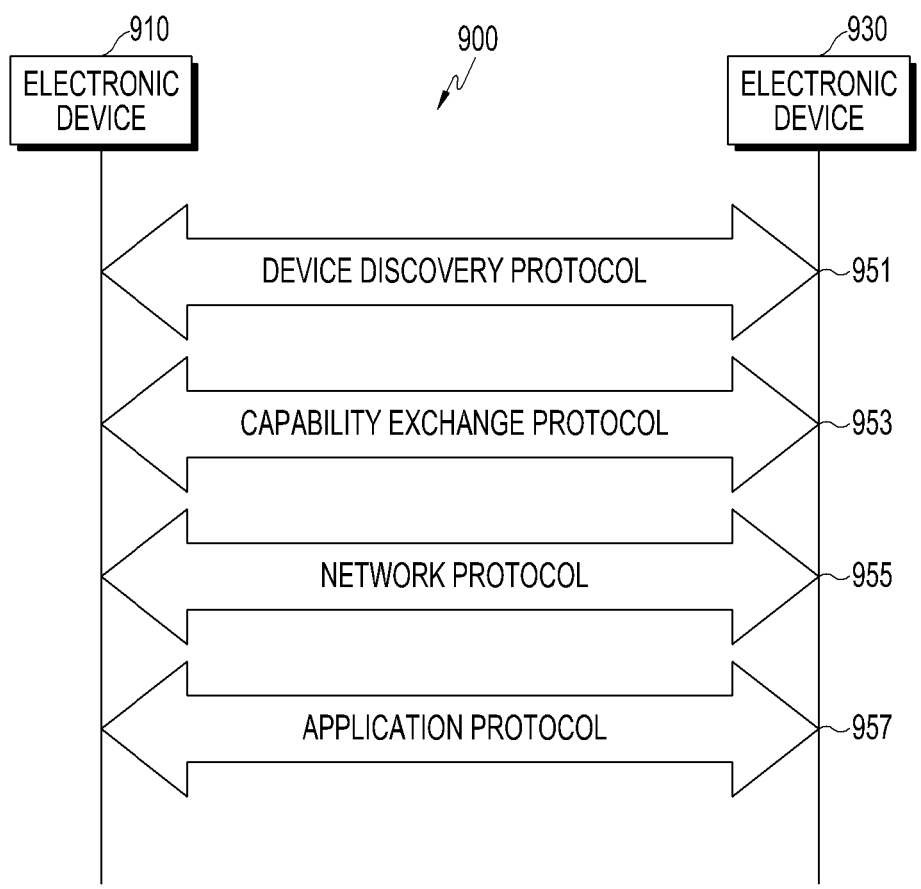
FIG. 24 illustrates a communication protocol between a plurality of electronic devices according to various exemplary embodiments.

FIG. 24 illustrates a communication protocol 900 between a plurality of electronic devices (e.g., an electronic device 910 and an electronic device 930) according to various exemplary embodiments of the present disclosure. Referring to FIG. 24, the communication protocol 900 may include, for example, a device discovery protocol 951, a capability exchange protocol 953, a network protocol 955, and an application protocol 957.

In one exemplary embodiment, the device discovery protocol 951 may be a protocol by which electronic devices (e.g., the electronic device 910 or the electronic device 930) can detect an external electronic device that can communicate with the electronic devices, or connect with the detected external electronic device. For example, the electronic device 910 (e.g., the electronic device 101) may detect the electronic device 930 (e.g., the electronic device 104) as a device that can communicate with the electronic device 910, through a communication method (e.g., WiFi, BT, USB or the like) available in the electronic device 910, using the device discovery protocol 951. The electronic device 910 may obtain and store identification information about the detected electronic device 930 using the device discovery protocol 951, for the communication connection with the electronic device 930. The electronic device 910 may establish a communication connection with the electronic device 930 based on, for example, at least the identification information.

In certain exemplary embodiments, the device discovery protocol 951 may be a protocol for mutual authentication between a plurality of electronic devices. For example, the electronic device 910 may perform authentication between the electronic device 910 and the electronic device 930 based on communication information (e.g., a Media Access Control (MAC) address, a Universally Unique Identifier (UUID), a Subsystem Identification (SSID), and Information Provider (IP) address) for a connection with at least the electronic device 930.

In one exemplary embodiment, the capability exchange protocol 953 may be a protocol for exchanging information related to the function of the service supportable in at least one of the electronic device 910 and the electronic device 930. For example, the electronic device 910 and the electronic device 930 may exchange with each other the information related to the function of the service that is currently provided by each of them, using the capability exchange protocol 953. The exchangeable information may include identification information indicating a specific service among a plurality of services supportable in the electronic device 310 and the electronic device 320. For example, the electronic device 910 may receive identification information for a specific service provided by the electronic device 930, from the electronic device 930 using the capability exchange protocol 953. In this case, based on the received identification information, the electronic device 910 may determine whether the electronic device 910 can support the specific service.

In one exemplary embodiment, the network protocol 955 may be a protocol for controlling a flow of the data that is, for example, transmitted and received to provide linked services, between the electronic devices (e.g., the electronic device 910 and the electronic device 930) that are connected to enable communication. For example, at least one of the electronic device 910 and the electronic device 930 may perform error control or data quality control using the network protocol 955. Additionally or alternatively, the network protocol 955 may determine a transport format of the data that is transmitted and received between the electronic device 910 and the electronic device 930. At least one of the electronic device 910 and the electronic device 930 may manage (e.g., connect or terminate) at least one session for mutual data exchange using the network protocol 955.

In one exemplary embodiment, the application protocol 957 may be a protocol for providing a procedure or information, which is for exchanging data related to the service provided to the external electronic device. For example, the electronic device 910 (e.g., the electronic device 101) may provide a service to the electronic device 930 (e.g., the electronic device 104 or the server 106) using the application protocol 957.

In one exemplary embodiment, the communication protocol 900 may include a standard communication protocol, a communication protocol (e.g., a communication protocol specified by a communication device manufacturer or a network provider itself) specified by an individual or an organization, or a combination thereof.

Figure 25:
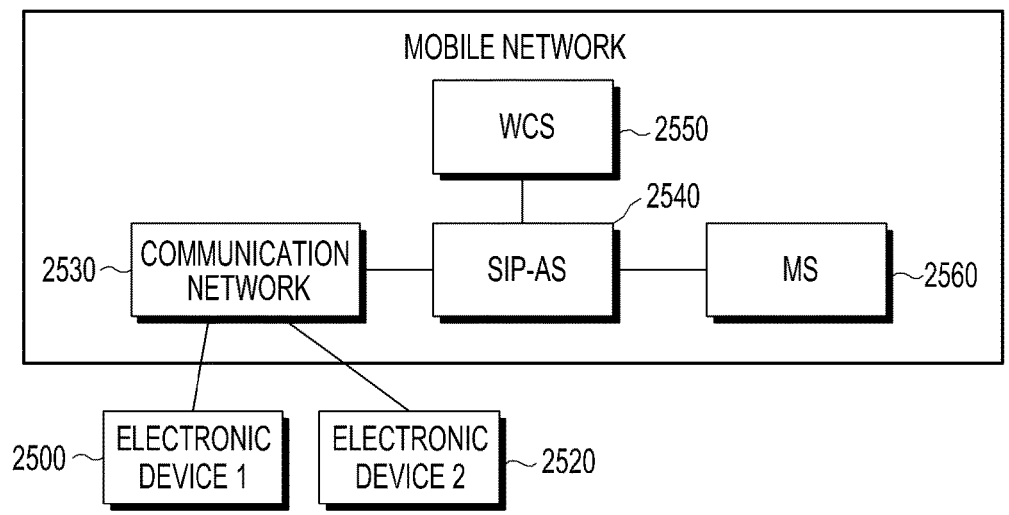
FIG. 25 illustrates devices that are connected in a control method of electronic devices having a function of sharing content in voice communication according to an exemplary embodiment.

FIG. 25 illustrates devices that are connected in a control method of electronic devices having a function of sharing content in voice communication according to an exemplary embodiment of the present disclosure. Referring to FIG. 25, a first electronic device 2500, a second electronic device 2520, an operator communication network 2530, a Session Initiation Protocol-Application Server (SIP-AS) 2540, a Media Server (MS) 2560, or a Web Content Server (WCS) 2550 may be connected to the mobile network.

Figure 26A:
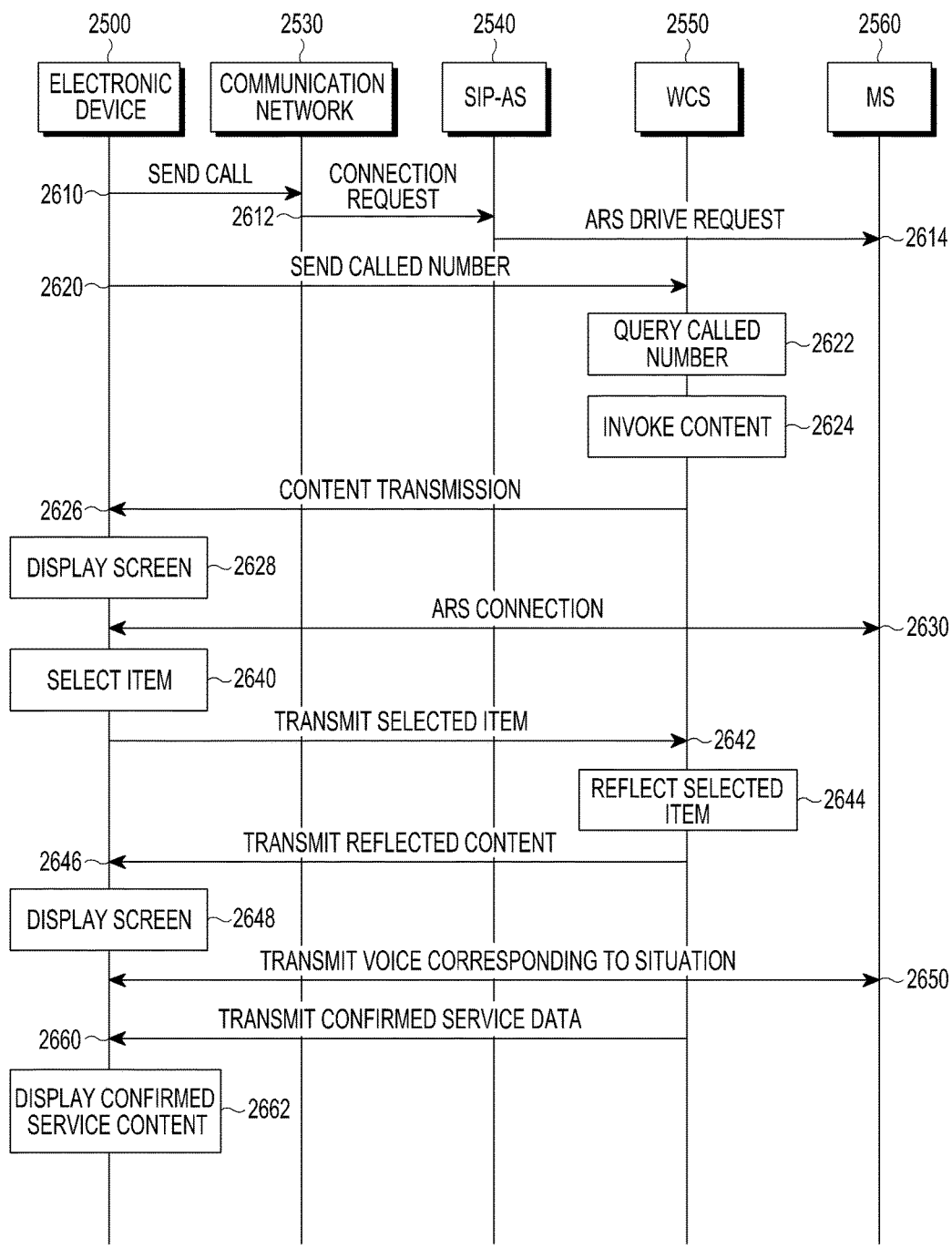
FIGS. 26A and 26B are flowcharts for a control method of an electronic device having a function of sharing content in voice communication according to various exemplary embodiments.
Figure 26B:
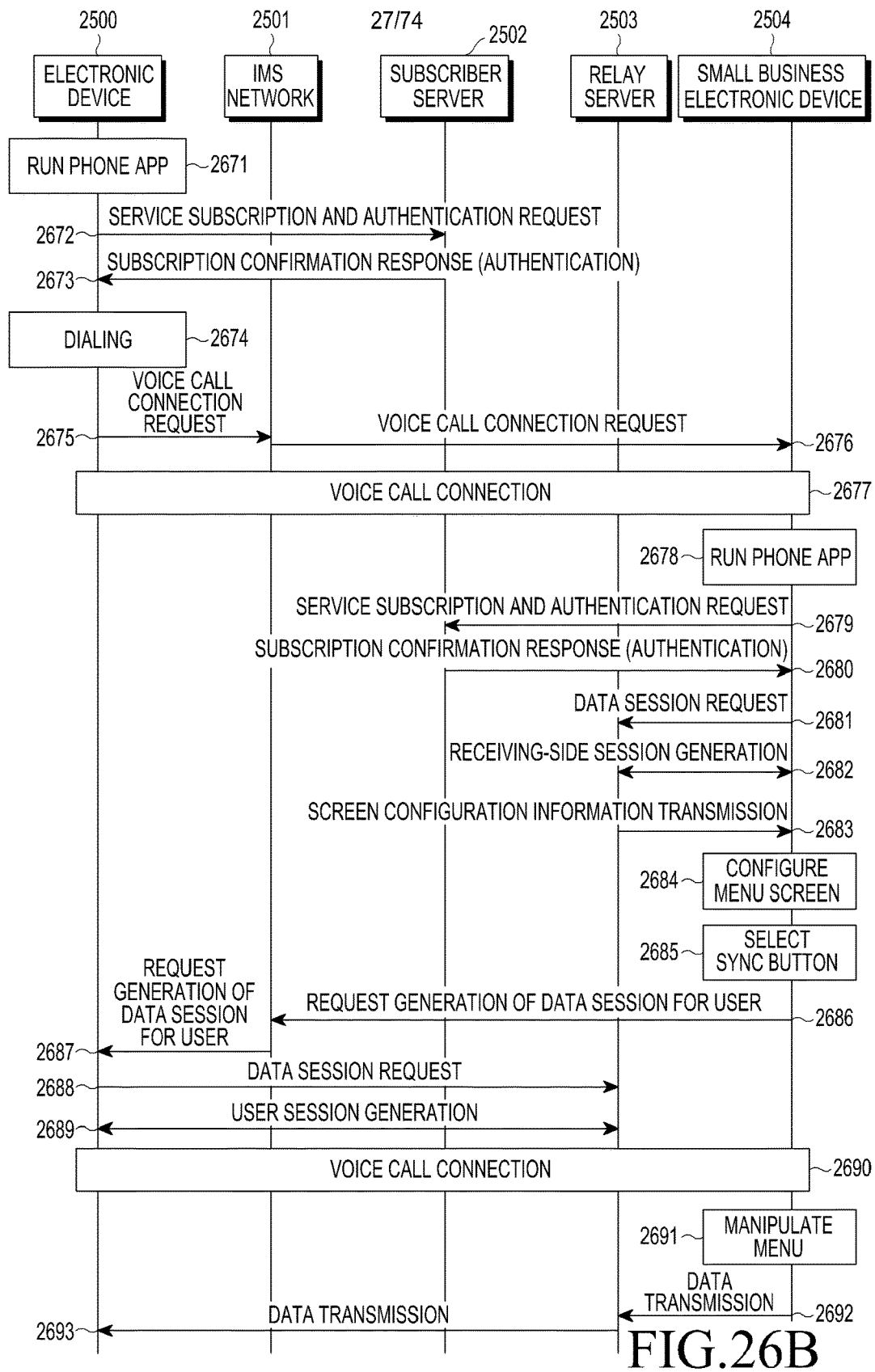

FIGS. 26A and 26B are flowcharts for a control method of an electronic device having a function of sharing content in voice communication according to an exemplary embodiment of the present disclosure. FIGS. 27A to 30B illustrate execution screens of an electronic device having a function of sharing content in voice communication according to an exemplary embodiment of the present disclosure. Reference will be made to FIGS. 27A to 30B to describe an exemplary embodiment of the present disclosure.

Referring to FIGS. 26A and 26B, in operations 2610 to 2614, the electronic device 2500 having a function of sharing content in voice communication according to an exemplary embodiment of the present disclosure may transmit a call over the mobile network. A processor of the electronic device 2500 may request the MS 2560 to drive an Automatic Response System (ARS) system, by sending a call over the mobile network.

More specifically, in operation 2610, the processor may send a call to the operator communication network 2530 over the mobile network. The mobile network may include an Evolved Node B (ENB), a Home Subscriber Server (HSS), and a Call Session Control Function (CSCF). The ENB may mean a communication repeater for enabling a User Equipment (UE) to access a packet network. The HSS may mean a network user information and IP management server for determining unique information of a UE and assigning an IP thereto. The CSCF may mean a connection controller for transmitting information about call origination to a recipient upon receiving a request for call origination from a UE. In other words, the electronic device 2500 may send a call to the operator communication network 2530 including the ENB, HSS and CSCF, using the communication interface.

Figures 27A, 27B:
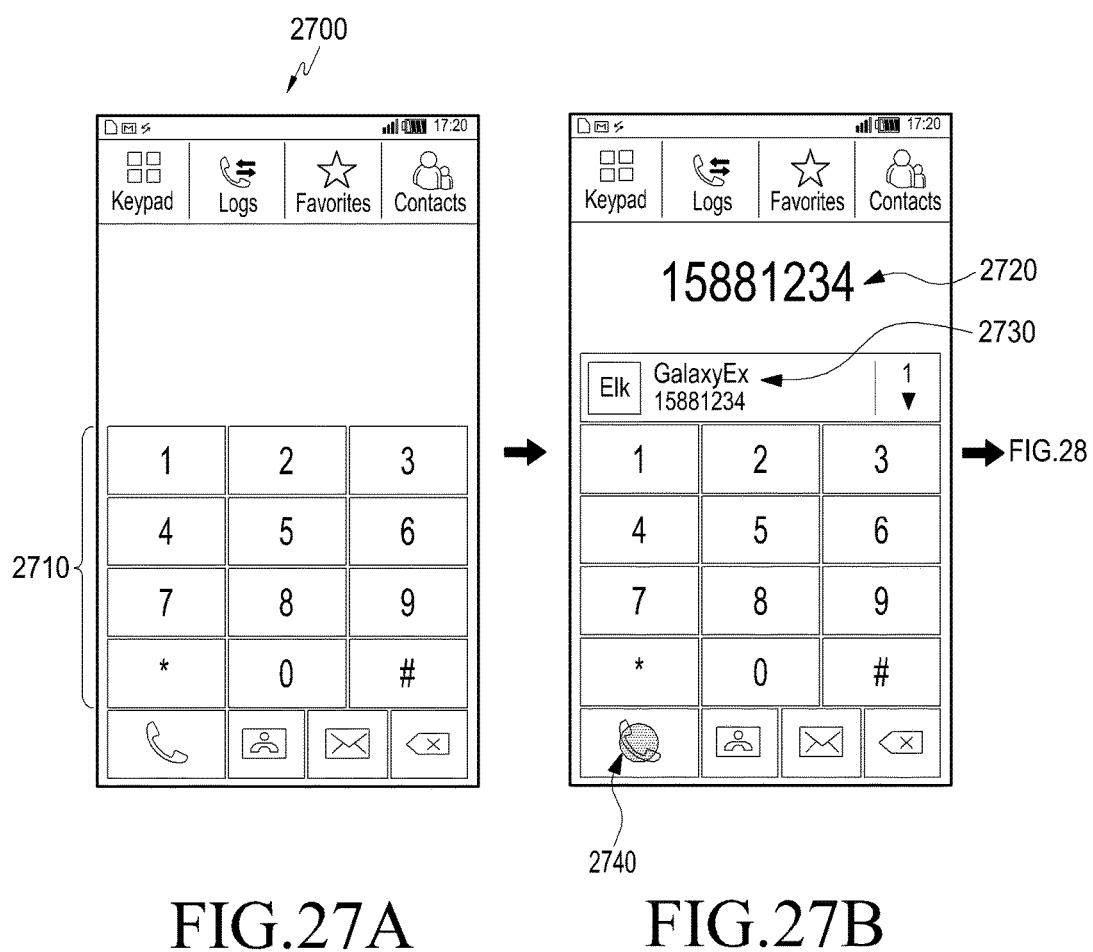

In this case, the processor may send a call by running a phone application. For example, as shown in FIG. 27A, the processor may execute a phone application 2700. The processor may display an execution screen of the phone application 2700 on a display. The phone application 2700 may include dial numbers (or digits) 2710. The display may be formed as a touch screen, but is not limited thereto. The processor may receive an input by detecting a touch on the touch screen. Therefore, the processor may receive an input of a phone number by detecting touches on the dial numbers 2710 on the touch screen. For example, as shown in FIG. 27B, the processor may receive an input of a phone number 2720 such as '15881234'. The processor may extract, from a memory, a name of a contact corresponding to the phone number 2720 such as '15881234', and display the extracted name. The memory may include a database containing a name and a phone number associated with the contact. For example, as shown in FIG. 27B, the processor may display, as 'GalaxyEX' 2730, a name of the contact corresponding to the phone number 2720 such as '15881234'. The processor may send a call by receiving an input for a selection of a Send Call icon 2740.

Next, in operation 2612, the operator communication network 2530 may send an access request to the ARS to the SIP-AS 2540. The SIP-AS 2540 may receive the access request to the ARS from the operator communication network 2530. The SIP-AS 2540 may perform communication with the operator communication network 2530, as the SIP-AS 2540 is connected to the mobile network. The operator communication network 2530 may send an access request to the ARS, including data for the phone number, to the SIP-AS 2540.

Next, in operation 2614, the SIP-AS 2540 may send a request for driving the ARS to the MS 2560. In this case, the MS 2560 may perform communication with the SIP-AS 2540, as the MS 2560 is connected to the mobile network. The SIP-AS 2540 may send a request for driving the ARS to the MS 2560 of the operator corresponding to the received phone number. In other words, the SIP-AS 2540 may store a database regarding the operator corresponding to each of the phone numbers. The SIP-AS 2540 may extract, from the database, information about the MS 2560 of an operator corresponding to the phone number. The SIP-AS 2540 may send a request for driving the ARS to the extracted MS 2560.

For example, as shown in FIG. 27B, the SIP-AS 2540 may extract, from the database, information about the MS 2560 of the operator corresponding to the phone number such as '15881234'. If the operator corresponding to '15881234' is 'GalaxyEX', the SIP-AS 2540 may send a request for driving the ARS to the MS 2560 for 'GalaxyEX'. Thereafter, in operation 2630, the ARS may be connected between the electronic device 2500 and the MS 2560 for 'GalaxyEX'. For example, the operator corresponding to the 'GalaxyEX' may provide the ARS related to a delivery service (or a courier service). The ARS may provide, by voice, contents such as, for example, viewing of information regarding the delivery of goods or providing of details regarding the delivery.

Next, in operation 2620, the electronic device 2500 may transmit a called number (or a called ID) to the WCS 2550. The processor of the electronic device 2500 may transmit the called number to the WCS 2550. The WCS 2550 may be connected to the mobile network to perform communication with the electronic device 2500. Therefore, the WCS 2550 may receive the called number from the electronic device 2500. The called number may mean a phone number that the electronic device 2500 has received from the user. For example, the called number may correspond to the phone number '15881234' in FIG. 27B.

Next, in operation 2622, the WCS 2550 may query the called number. The WCS 2550 may query an operator corresponding to the called number. The WCS 2550 may store in its memory a database regarding an operator corresponding to each of the phone numbers. Therefore, the WCS 2550 may receive, from the database, information on an operator corresponding to the called number received from the electronic device 2500.

For example, as shown in FIG. 27B, if the called number that the WCS 2550 has received from the electronic device 2500 is '15881234', the WCS 2550 may query, as 'GalaxyEX', the operator corresponding to the called number '15881234' from the database.

Figure 28C:
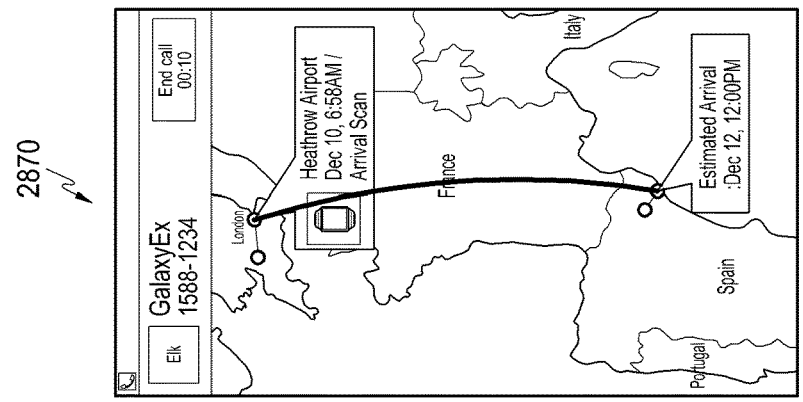
Figure 28B:
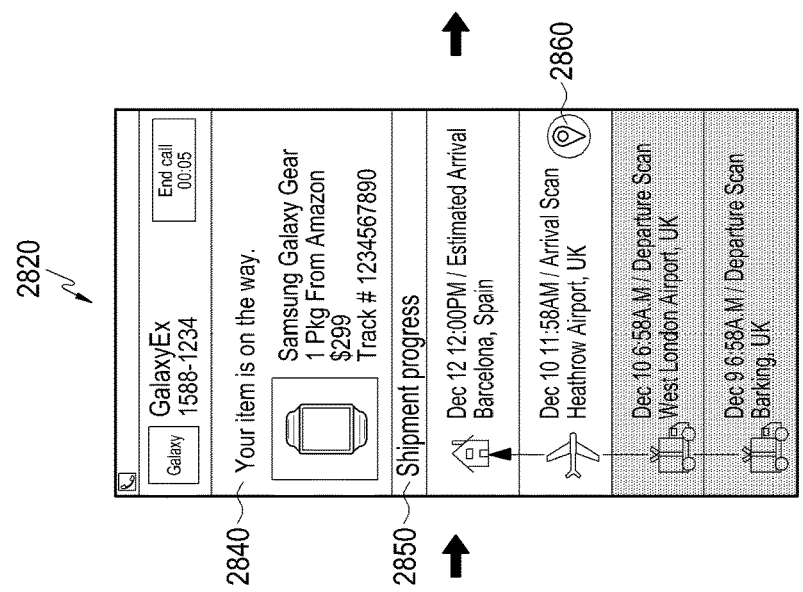
Figure 28A:
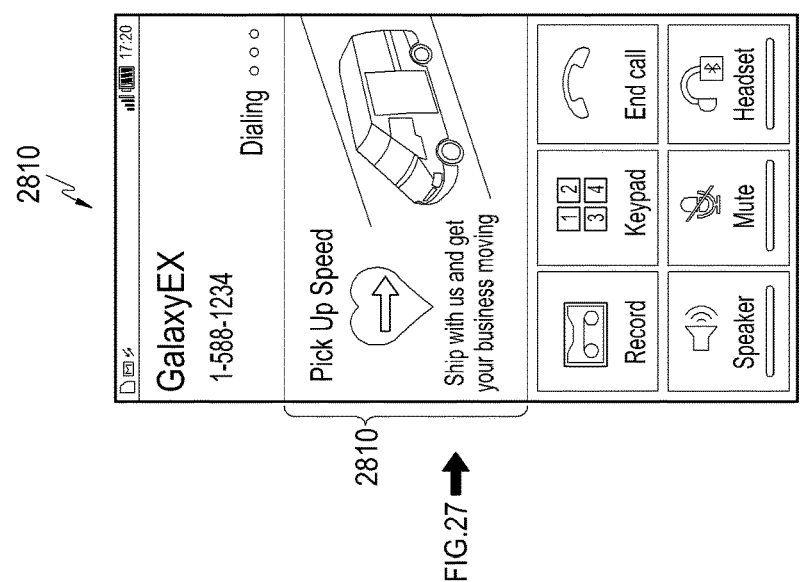

Next, in operation 2624, the WCS 2550 may invoke content of the operator corresponding to the called number. The WCS 2550 may store the content of the operator corresponding to the called number in a database. Therefore, the WCS 2550 may invoke the content of the operator based on the called number. As for the content of the operator, the WCS 2550 may have the content registered in advance by the operator, and store the registered content in the database. For example, the content may be an advertising image of the operator, or an item or menu provided by the ARS. As shown in the example of FIGS. 28A to 28C, if the operator provides a delivery service, the content may be an advertising image for the delivery service, or an item or menu that is related to the delivery service and provided by the ARS. The item or menu provided by the ARS may be, for example, a menu for viewing delivery goods information, an item for goods information, or an item for the delivery process.

Therefore, in accordance with an exemplary embodiment of the present disclosure, there is no need to sign up for a separate service procedure or undergo an authentication process, to receive the content of the operator. In other words, in accordance with an exemplary embodiment of the present disclosure, it is possible to directly invoke the content of the operator based on the called number.

Next, in operation 2626, the electronic device 2500 may receive the content from the WCS 2550. The WCS 2550 may transmit the invoked content to the electronic device 2500. In other words, the electronic device 2500 according to an exemplary embodiment of the present disclosure may receive the content to be shared from the WCS 2550.

For example, the content may be an advertising image of the operator, or an item or menu provided by the ARS. As shown in the example of FIGS. 27A and 27B, if the operator provides a delivery service, the content may be an advertising image for the delivery service, or an item or menu that is related to the delivery service and provided by the ARS. The content may be an image, an icon, an item or a menu, in addition to the voice.

Therefore, in accordance with an exemplary embodiment of the present disclosure, the electronic device 2500 may receive content other than the voice from the WCS 2550 in the ARS, and share the received content. In other words, in accordance with an exemplary embodiment of the present disclosure, the electronic device 2500 may receive the content from the WCS 2550, and visually provide images, icons, items or menus together with the voice to the user who uses the ARS.

Next, in operation 2628, the electronic device 2500 may display the content received from the WCS 2550 on its display. In other words, the processor of the electronic device 2500 may display the content received from the WCS 2550 on its display.

For example, as shown in FIG. 28A, if the content received from the WCS 2550 is an advertising image 2810 to be displayed on a Call Send Standby screen, the processor of the electronic device 2500 may display the advertising image 2810 on the Call Send Standby screen. Therefore, the electronic device 2500 may provide the content such as the advertising image together with the voice to the user who uses the ARS.

In addition, as shown in FIG. 28B, the processor of the electronic device 2500 may display an icon, an item or a menu 2820 to 2860 provided by the ARS on the display. For example, the processor of the electronic device 2500 may display an item or menu that is related to the delivery service and provided by the ARS. In other words, the processor may display a menu 2820 for viewing information regarding the delivery of goods, an item regarding a name (e.g., 'GalaxyEx') of the operator providing the delivery service, an item 2840 for goods information such as 'Samsung Galaxy Gear 1 Pkg From Amazon $299 Track #1234567890', an item 2850 for indicating the delivery process such as 'Dec 10 11:58 AM/Arrival Scan Heathrow Airport, UK', and a Map icon 2860 for showing the delivery process.

Therefore, in accordance with an exemplary embodiment of the present disclosure, the electronic device 2500 may receive the content such as an advertising image, an item or a menu, other than the voice from the ARS or an Interactive Voice Response (IVR) system, and display the received content. The content such as an advertising image, an item or a menu may correspond to the data that the operator has registered in a database in advance. Therefore, the operator providing the ARS or IVR service may register the content such as an advertising image, an item or a menu in the WCS 2550 in advance, to display the content on the electronic device 2500.

Next, in operation 2630, the ARS may be connected between the electronic device 2500 and the MS 2560. The MS 2560 may mean a server that provides the ARS service to the electronic device 2500. In response to the ARS drive request 2614, the MS 2560 may connect a voice call to the electronic device 2500 and provide the ARS service thereto using the voice call. The MS 2560 may mean a server that provides an WR voice after connecting the voice call to the electronic device 2500. The IVR may mean a service for sharing interactive data between the electronic device 2500 and the MS 2560. For example, the IVR may provide a Dual Tone Multiple Frequency (DTMF) service. The DTMF means a signal having two frequency components, may mean a dial tone (or voice) that is generated when a dial button is pressed. In other words, the DTMF service may mean a service in which a server decodes the generated dial tone (or voice) to provide the ARS service.

For example, as shown in FIGS. 27A and 27B, if the operator corresponding to the called number '15881234' is 'GalaxyEX', the ARS may be connected between the electronic device 2500 and the MS 2560 for 'GalaxyEX'.

Although operation 2630 is performed after operations 2620 to 2628 as shown in FIG. 26A, operation 2630 may be performed before operations 2620 to 2628. Therefore, operation 2630 is not limited to the order described in FIGS. 26A and 26B.

Therefore, in accordance with an exemplary embodiment of the present disclosure, the electronic device 2500 may provide the content other than voice from the WCS 2550, while providing the ARS voice using, for example, the DTMF service from the MS 2560.

Next, in operation 2640, the electronic device 2500 may receive an input for a selection of an item. The processor of the electronic device 2500 may receive an input for a selection of an item. For example, the display of the electronic device 2500 may be formed as a touch screen, and may receive an input for a selection of an item from the touch screen. In other words, as shown in FIG. 28B, the processor of the electronic device 2500 may receive an input for a selection of an item, such as the Map icon 2860 for showing the delivery process.

Next, in operation 2642, the electronic device 2500 may transmit the selected item to the WCS 2550. In other words, the processor of the electronic device 2500 may transmit the selected item to the WCS 2550 over the mobile network. For example, as shown in FIG. 28B, the processor of the electronic device 2500 may transmit the selected item such as the Map icon 2860 for showing the delivery process, to the WCS 2550.

Therefore, in accordance with an exemplary embodiment of the present disclosure, the electronic device 2500 may transmit the selected item to the ARS system corresponding to the WCS 2550. In other words, the electronic device 2500 may perform two-way mutual data transmission/reception with the ARS system corresponding to the WCS 2550. Therefore, in accordance with an exemplary embodiment of the present disclosure, the electronic device 2500 may perform two-way mutual data transmission/reception, instead of unilaterally receiving data from the ARS system or the IVR system.

Next, in operation 2644, the WCS 2550 may reflect the received selected item. In other words, the WCS 2550 may extract the content in which the WCS 2550 reflected the item that was selected in the electronic device 2500. For example, as shown in FIG. 28B, if the selected item corresponds to the Map icon 2860 which shows the delivery process, the WCS 2550 may extract the reflected content such as the Map image in which a closer image of the delivery process is shown.

Next, in operation 2646, the electronic device 2500 may receive the reflected content from the WCS 2550. In other words, the processor of the electronic device 2500 may receive the reflected content from the WCS 2550 over the mobile network. For example, the electronic device 2500 may receive the reflected content such as a Map image in which the delivery process is shown, from the WCS 2550.

Next, in operation 2648, the electronic device 2500 may display the reflected content received from the WCS 2550, on its display. In other words, the processor of the electronic device 2500 may display the reflected content received from the WCS 2550, on its display.

For example, as shown in FIG. 28C, the electronic device 2500 may display the reflected content such as the Map image in which the delivery process is shown, on its display. The electronic device 2500 may display a Map image 2870 showing the delivery process from 'Heathrow Airport, UK' to 'Barcelona, Spain'.

Therefore, in accordance with an exemplary embodiment of the present disclosure, the electronic device 2500 may receive the reflected control from the WCS 2550 in the ARS or IVR service. In other words, in accordance with an exemplary embodiment of the present disclosure, during the ARS service, the electronic device 2500 may not only receive the content other than the voice content, but also continuously receive the reflected content from the WCS 2550. Therefore, in accordance with an exemplary embodiment of the present disclosure, the ARS system may not only just provide the voice content of the users, but may also provide the visual content to the user, so the user may receive the ARS service, while viewing the visual content such as an image, an item or a menu.

Next, in operation 2650, the electronic device 2500 may receive the voice corresponding to the situation or the displayed content from the MS 2560 in real time. The MS 2560 may transmit the data pertaining to the voice corresponding to the displayed content to the electronic device 2500 in real time. In other words, the MS 2560 may transmit the data regarding the voice needed for the ARS service to the electronic device 2500 in real time. The MS 2560 may transmit the data regarding the voice corresponding to the displayed content to the electronic device 2500 in real time. The displayed content may be changed in real time in the ARS service. The situation may correspond to the content transmitted by the WCS 2550. The situation may correspond to the content that is reflected in the WCS 2550.

For example, referring to FIG. 28A, the situation may correspond to the advertising image 2810 on the Call Send Standby screen corresponding to the content transmitted by the WCS 2550. The MS 2560 may transmit the voice content corresponding to the displayed content (e.g., the voice advertising GalaxyEx) to the electronic device 2500. Therefore, the electronic device 2500 may provide the voice advertising GalaxyEx to the user, in response to the process of displaying the advertising image 2810 on the Call Send Standby screen.

As shown in FIG. 28B, the situation may correspond to the icon, item or menu 2820 to 2860 provided by the ARS system regarding the delivery service corresponding to the content transmitted by the WCS 2550. In this case, the MS 2560 may transmit, to the electronic device 2500, the voice content related to the displayed content (e.g., "This is Galaxy Express. You can check the delivery status of the goods you have ordered, on the screen") corresponding to the situation. Therefore, the electronic device 2500 may provide the voice explaining the icon, item or menu 2820 to 2860 to the user, in response to the process of displaying the icon, item or menu 2820 to 2860 provided by the ARS system regarding the delivery service.

As shown in FIG. 28C, the situation may correspond to the Map image 2870 in which the delivery process corresponding to the content that is reflected in the WCS 2550 is shown. The MS 2560 may transmit, to the electronic device 2500, a voice message (e.g., "You have entered the Delivery Details screen. Please check the location and expected arrival time of the goods on the map provided on the screen") corresponding to the displayed situation. Therefore, the electronic device 2500 may provide, to the user, the voice corresponding to the content that is reflected in the WCS 2550.

Therefore, in accordance with an exemplary embodiment of the present disclosure, the electronic device 2500 may receive in real time the data regarding the voice needed for the ARS service from the MS 2560. In particular, in accordance with an exemplary embodiment of the present disclosure, the electronic device 2500 may receive, from the MS 2560, the voice corresponding to the content transmitted from the WCS 2550 or the content reflected in the WCS 2550.

Therefore, in accordance with an exemplary embodiment of the present disclosure, the electronic device 2500 may receive not only the voice in the ARS system but also the content from the WCS 2550, and may receive the voice corresponding to the content from the MS 2560. In other words, in accordance with an exemplary embodiment of the present disclosure, the electronic device 2500 may implement the ARS system that can provide the visual content and the voice at the same time.

Therefore, in accordance with an exemplary embodiment of the present disclosure, when providing the ARS service, the electronic device 2500 does not need to run a separate application or use a video call operation which requires an excessive amount of data transmission/reception, to receive the content.

Next, in operation 2660, the electronic device 2500 may receive confirmed service data from the WCS 2550. The WCS 2550 may confirm the service data. The WCS 2550 may transmit the confirmed service data to the electronic device 2500. The confirmed service data may be the service that is finally confirmed in the ARS service. In particular, the confirmed service data may include the content that is reflected in operations 2640 to 2646.

For example, in FIGS. 27A to 28C, the ARS service regarding the delivery service is provided. The WCS 2550 may confirm the final delivery schedule as the confirmed service data. For example, the final delivery schedule may be 'Estimated Arrival: Dec. 12, 2013 12:00 PM'. Therefore, the WCS 2550 may confirm the final delivery schedule such as 'Estimated Arrival: Dec. 12, 2013 12:00 PM' as the confirmed service data. The WCS 2550 may transmit the confirmed service data such as 'Estimated Arrival: Dec. 12, 2013 12:00 PM' to the electronic device 2500.

Next, in operation 2662, the electronic device 2500 may display the confirmed service data received from the WCS 2550 on its display. The electronic device 2500 may display the confirmed service data on a Call Ended screen. The electronic device 2500 may display the confirmed service data on a preset application. For example, the preset application may be a log application (or a Recent Log View application).

Figures 29A, 29B:
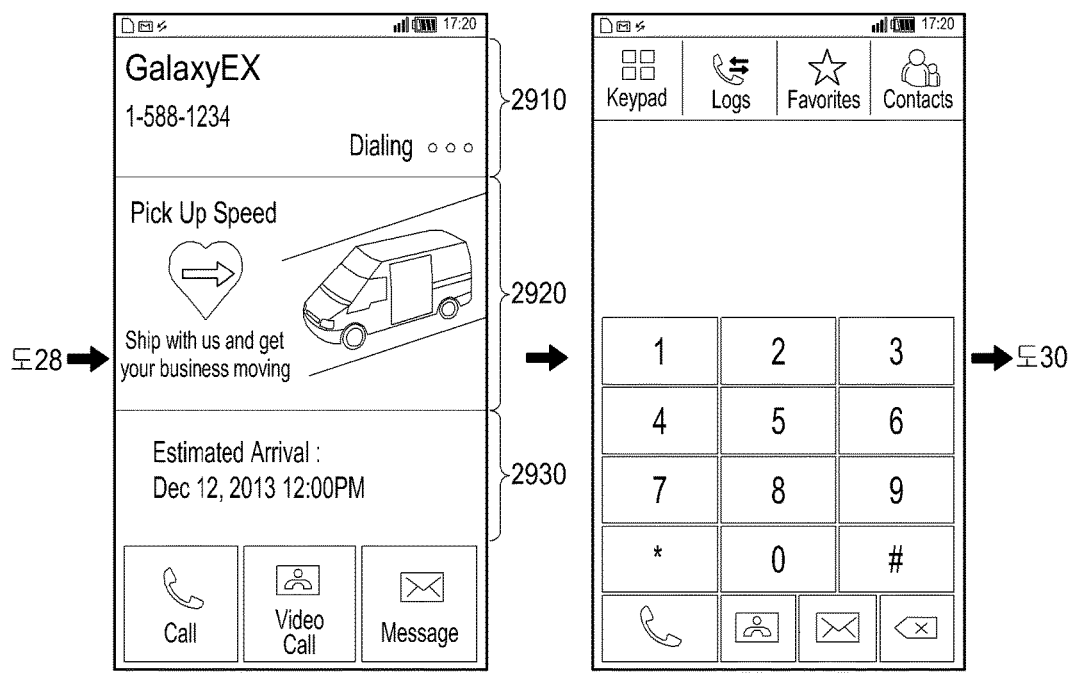

For example, in the ARS service regarding the delivery service, the confirmed service data may be the final delivery schedule. The confirmed service data corresponding to the final delivery schedule may be 'Estimated Arrival: Dec. 12, 2013 12:00 PM'. Therefore, as shown in FIG. 29A, the processor of the electronic device 2500 may display 'Estimated Arrival: Dec. 12, 2013 12:00 PM' 2930 corresponding to the confirmed service data on the Call Ended screen 2910. In addition, the processor may display even an advertising image 2920 of the operator on the Call Ended screen 2910. As shown in FIG. 29B, the Call Ended screen may be terminated after a lapse of a preset time, and an initial screen of the phone application may then be displayed.

As another example, as shown in FIG. 30A, the processor of the electronic device 2500 may display 'Estimated Arrival: Dec. 12, 2013 12:00 PM' corresponding to the confirmed service data, on the preset application. For example, the preset application may be a log application. Therefore, as shown in FIG. 30A, if the log application 3000 is executed, then the processor of the electronic device 2500 may display a call log 3010 for the terminated ARS service call. As shown in FIG. 30B, if the call log 3010 is selected, the processor may display 'Estimated Arrival: Dec. 12, 2013 12:00 PM' 3030 corresponding to the confirmed service data.

Therefore, in accordance with an exemplary embodiment of the present disclosure, the electronic device 2500 may display the confirmed service data received from the WCS 2550 on its display. In accordance with an exemplary embodiment of the present disclosure, even after the ARS service call is terminated, the electronic device 2500 may display the confirmed service data even on the Call End screen or the preset application such as the log application, so the user can check again the confirmed service data. In addition, in accordance with an exemplary embodiment of the present disclosure, before and during the call, the electronic device 2500 may receive content from the WCS 2550, transmit the selected item to the WCS 2550, and receive the reflected content from the WCS 2550, so the ARS system can organically operate with each other.

FIG. 26B is a flowchart which illustrates a control method of an electronic device having a function of sharing content during voice communication according to an exemplary embodiment of the present disclosure. In one exemplary embodiment, the content sharing may be performed between the electronic device 2500 and a small business electronic device 2504. The small business electronic device 2504 may be, for example, a Media Server (MS).

In operation 2671, the electronic device 2500 may run the phone application. In operation 2672, the electronic device 2500 may send a service subscription and authentication request to a subscriber server 2502. In operation 2673, the subscriber server 2502 may send a subscription confirmation response (or authentication) to the electronic device 2500.

In operation 2674, the electronic device 2500 may perform a dialing operation. In operation 2675, the electronic device 2500 may send a voice call connection request to an IP Multimedia Subsystem (IMS) network 2501. In operation 2676, the IMS network 2501 may send the voice call connection request to the small business electronic device 2504. Accordingly, in operation 2677, the electronic device 2500 may connect a voice call to the small business electronic device 2504.

In operation 2678, the small business electronic device 2504 may run a phone application. In operation 2679, the small business electronic device 2504 may send a service subscription and authentication request to the subscriber server 2502. In operation 2680, the small business electronic device 2504 may receive a subscription confirmation response (or authentication) from the subscriber server 2502. In operation 2681, the small business electronic device 2504 may send a data session request to a relay server 2503. In operation 2682, the relay server 2503 may generate a receiving-side data session to the small business electronic device 2504. In operation 2683, the relay server 2503 may transmit screen configuration information to the small business electronic device 2504. In operation 2684, the small business electronic device 2504 may configure a menu screen based on the received screen configuration information. In operation 2685, the small business electronic device 2504 may select a Sync button. In operation 2686, the small business electronic device 2504 may send a data session request to the IMS network 2501. In operation 2689, the relay server 2503 may generate a user-side data session to the electronic device 2500. Accordingly, the electronic device 2500 and the small business electronic device 2504 may establish a data session with each other. If the small business electronic device 2504 performs menu manipulation in operation 2691, the small business electronic device 2504 may transmit the data to the relay server 2503 in operation 2692. The relay server 2503 may transmit the received data to the electronic device 2500 in operation 2693.

Figure 31:
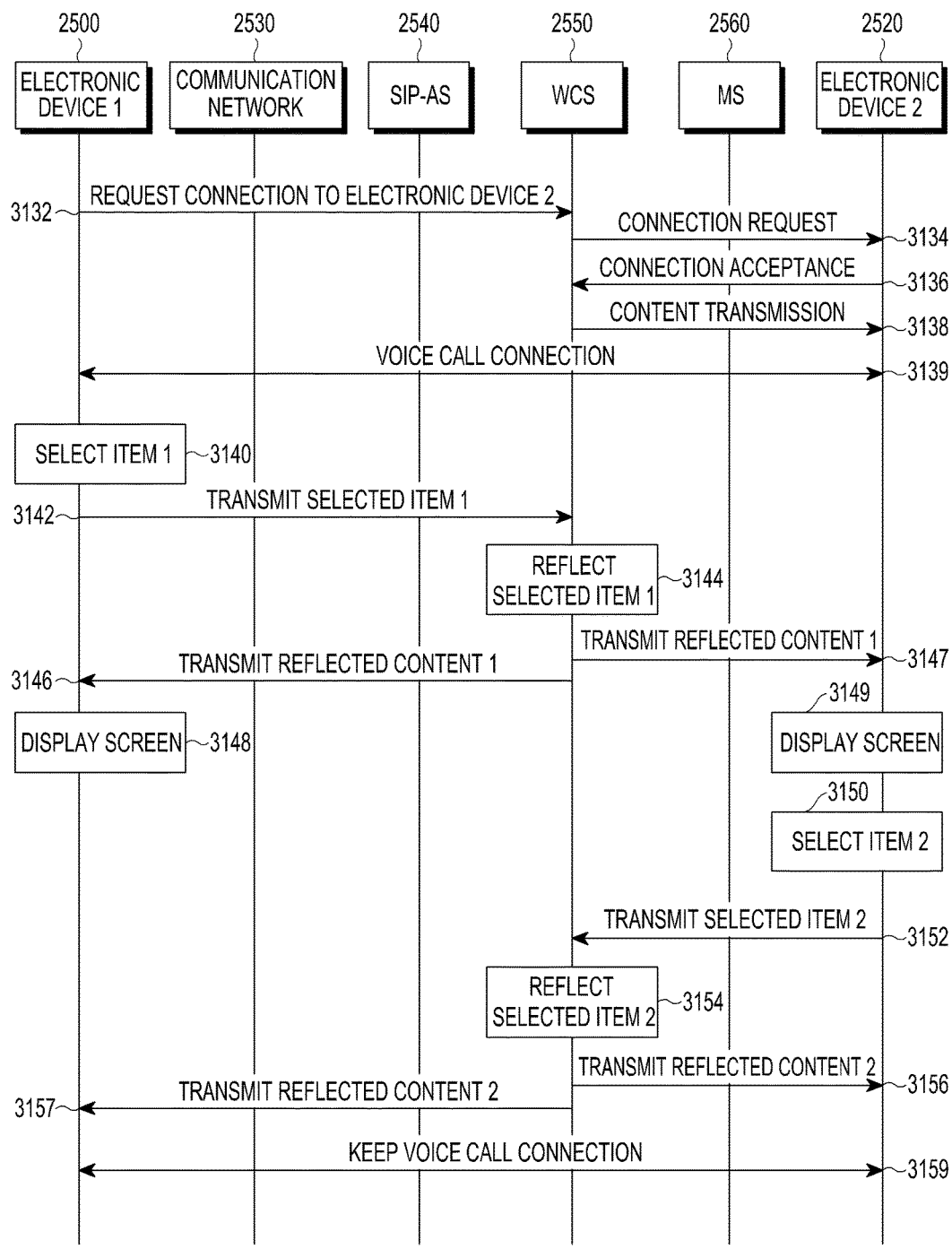
FIG. 31 is a flowchart for a control method of electronic devices having a function of sharing content in voice communication according to another exemplary embodiment.

FIG. 31 is a flowchart illustrating a control method of electronic devices having a function of sharing content during voice communication according to another exemplary embodiment of the present disclosure. FIGS. 32 to 35 illustrate execution screens of electronic devices having a function of sharing content during voice communication according to another exemplary embodiment of the present disclosure. Reference will be made to FIGS. 31 to 35 to describe another exemplary embodiment of the present disclosure.

Referring to FIG. 31, an electronic device 2500 having a function of sharing content in voice communication according to another exemplary embodiment of the present disclosure may first perform operations 2610 to 2630 described in FIG. 26A in the same way. Therefore, in another exemplary embodiment of the present disclosure, a description of operations 2610 to 2630 will be omitted. In addition, the electronic device 2500 described in FIGS. 26A and 26B will be referred to as a first electronic device.

An example of execution screens for operations 2610 to 2630 in FIG. 26A, which are repeated in another exemplary embodiment of the present disclosure, will be first described with reference to FIGS. 32A to 32C. For example, referring to FIG. 32A, a processor of the first electronic device 2500 may run a phone application. The processor may receive a phone number by detecting touches on dial numbers (or digits) 3210 on the touch screen. For example, as shown in FIG. 32A, the processor may receive a phone number 3220 such as '15886789'. The processor may display, as TizzaARS' 3230, a name of the contact corresponding to the phone number 3220 such as '15886789'. The processor may receive an input for a selection of a Send Call icon 3240 and send a call (in operation 2610 in FIG. 26A). The operator communication network 2530 may send an ARS access request to the SIP-AS 2540 (in operation 2612 in FIG. 26A). The SIP-AS 2540 may send an ARS drive request to the MS 2560 (in operation 2614 in FIG. 26A). If the operator corresponding to the phone number '15885678' is TizzaARS', the SIP-AS 2540 may send an ARS drive request to the MS 2560 for TizzaARS'. The first electronic device 2500 may transmit a called number to the WCS 2550 (in operation 2620 in FIG. 26A). The WCS 2550 may query the called number (in operation 2622 in FIG. 26A). The WCS 2550 may query, as TizzaARS', the operator corresponding to the called number '15885678' from the database. The WCS 2550 may invoke content of the operator corresponding to the called number (in operation 2624 in FIG. 26A). If the operator provides a pizza delivery service, the content may be an advertising image for the pizza delivery service, or an item or menu provided by the ARS system regarding the pizza delivery service. The first electronic device 2500 may receive the content from the WCS 2550 (in operation 2626 in FIG. 26A). The first electronic device 2500 may display the content received from the WCS 2550 on its display (in operation 2628 in FIG. 26A). As shown in FIG. 32B, if the content received from the WCS 2550 is an advertising image to be displayed on the Call Send Standby screen, the processor of the first electronic device 2500 may display the advertising image 3250 on the Call Send Standby screen. The ARS may be connected between the first electronic device 2500 and the MS 2560 (in operation 2630 in FIG. 26A). For example, as shown in FIG. 32A, if the operator corresponding to the phone number '15885678' is TizzaARS', the ARS may be connected between the first electronic device 2500 and the MS 2560 for TizzaARS'.

Next, in operation 3132, the first electronic device 2500 may send a request for a voice call connection to the second electronic device 2520 to the WCS 2550. In other words, the first electronic device 2500 may send a request for a voice call connection to the second electronic device 2520 through the WCS 2550 during the ARS. The second electronic device 2520 may mean an electronic device of the operator providing the ARS. Therefore, the first electronic device 2500 may directly execute a voice call with the operator providing the ARS.

Figure 34:
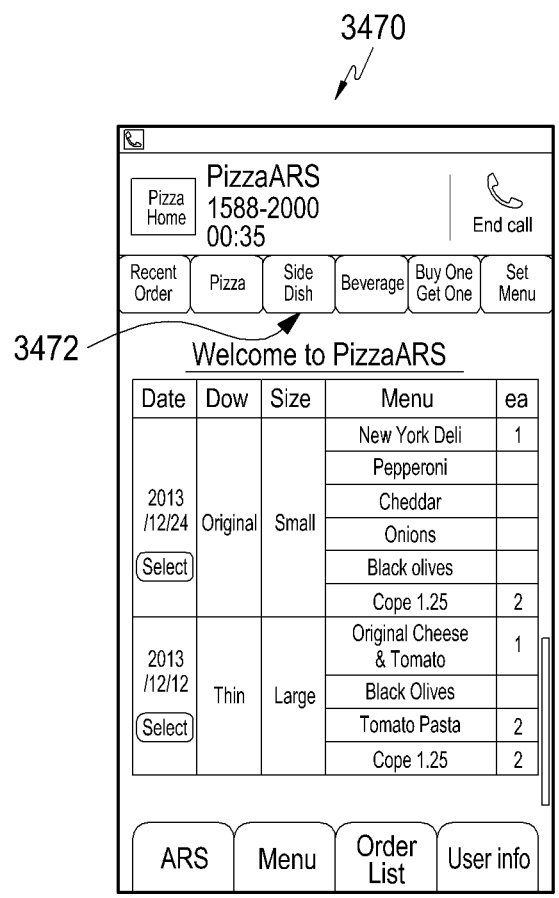

For example, as shown in FIG. 32C, the processor of the first electronic device 2500 may display an ARS Entry screen on its display. The processor may display an icon 3262 for entering a simple ARS order, an icon 3264 for entering an interactive order to receive the content while performing a voice call with the operator, and an icon 3266 for making a reference to the existing order. In this case, if the icon for entering an interactive order is selected, the processor may perform operations 3134 to 3139. For example, if the icon 3264 for entering an interactive order is selected in FIG. 32C, the processor may perform operations 3134 to 3139. In this case, the first electronic device 2500 may repeat operation 2628 in FIG. 26A to display the content received from the WCS 2550 on the display. For example, as shown in FIG. 34, the first electronic device 2500 may display the content such as an item or menu 3470 provided to the pizza delivery service, on its display.

Figures 33A, 33B:
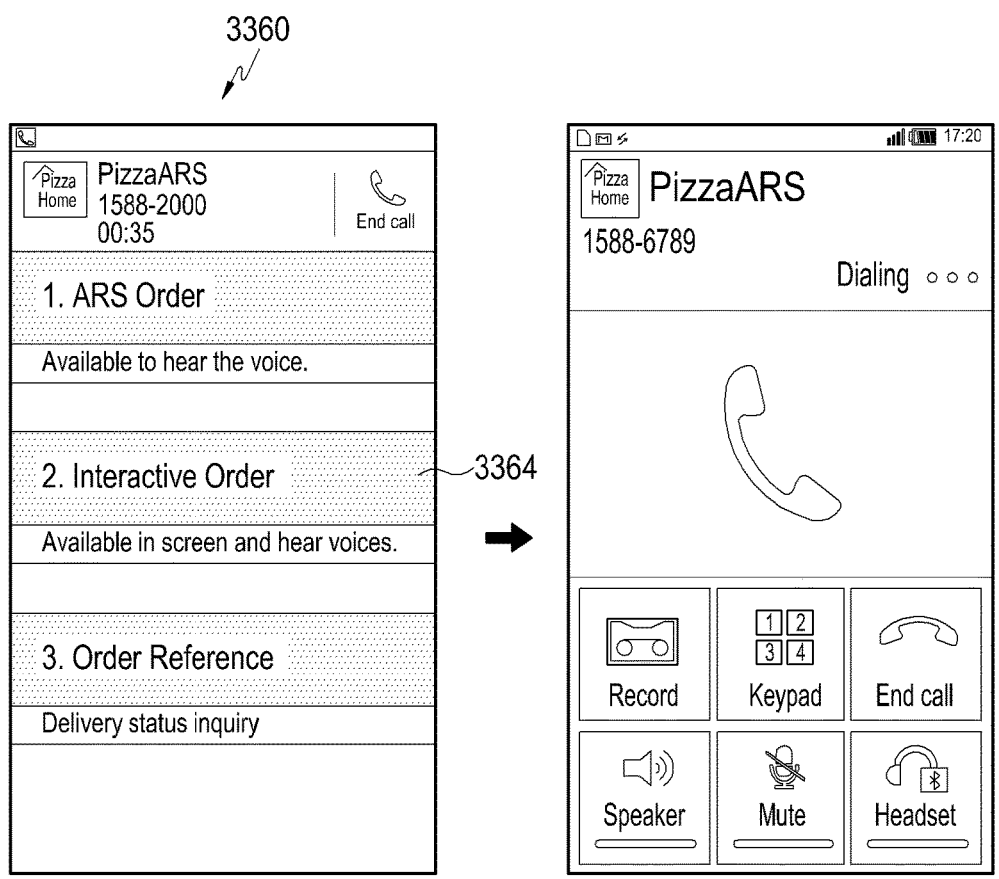

However, if the icon 3262 for entering a simple ARS order is selected, the processor may run only the ARS system. For example, if the icon 3262 for entering a simple ARS order is selected in FIG. 33A, the processor may run only the ARS system to send a call to the ARS system as shown in FIG. 33B.

Figures 35A, 35B:
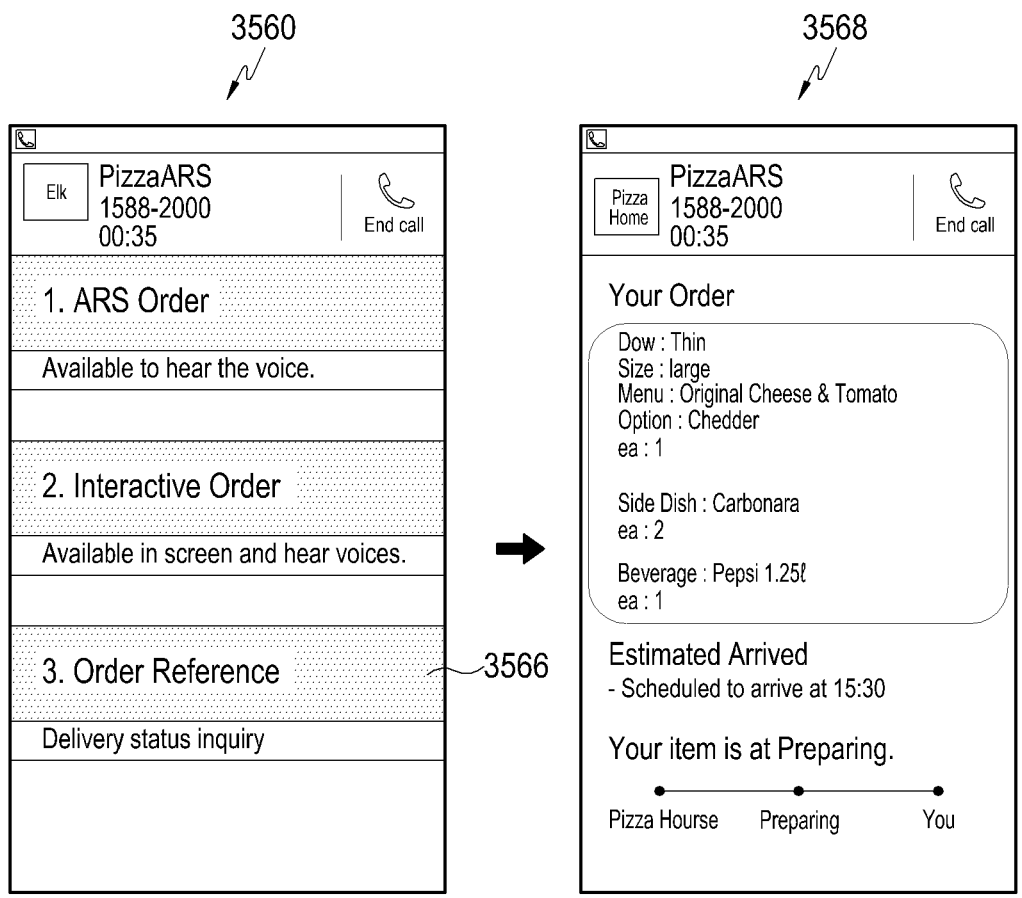

However, if the icon 3266 for making a reference to the existing order is selected, the processor may display details of the existing order. For example, if an icon 3566 for making a reference to the existing order is selected as shown in FIG. 35A, the processor may display details 3568 of the existing order as shown in FIG. 35B.

Next, in operation 3134, the WCS 2550 may send a connection request for a voice call to the second electronic device 2520. In other words, the WCS 2550 may send a connection request for a voice call to the second electronic device 2520, in response to the voice call connection request from the first electronic device 2500.

Next, in operation 3136, if the second electronic device 2520 accepts the connection of a voice call with the first electronic device 2500 in response to the request from the WCS 2550, the second electronic device 2520 may proceed to operation 3138 and its succeeding operations. However, if the second electronic device 2520 does not accept the connection of a voice call with the first electronic device 2500, the second electronic device 2520 may terminate the call connection process.

Next, in operation 3138, the WCS 2550 may transmit the content, which was invoked in operation 2624, to the second electronic device 2520. In other words, the WCS 2550 has transmitted the content invoked in operation 2624 to the first electronic device 2500 in operation 2626. In this case, the WCS 2550 may transmit the content invoked in operation 2624 even to the second electronic device 2520 in the same way. Therefore, the first electronic device 2500 and the second electronic device 2520 may receive the same content from the WCS 2550, sharing the content.

For example, as shown in FIG. 34, the first electronic device 2500 may receive the content such as the item or menu 3470 provided to the pizza delivery service from the WCS 2550. The second electronic device 2520 may also receive the content such as the item or menu 3470 provided to the pizza delivery service from the WCS 2550 in the same way. Therefore, the first electronic device 2500 and the second electronic device 2520 may share the same content such as the item or menu 3470 provided to the pizza delivery service.

Therefore, in accordance with another exemplary embodiment of the present disclosure, the first electronic device 2500 and the second electronic device 2520 may share the image content other than the voice content in the ARS system. In this case, in accordance with another exemplary embodiment of the present disclosure, there is no need to run a separate application or undergo an authentication procedure to share the content.

Next, in operation 3139, the voice call may be connected between the first electronic device 2500 and the second electronic device 2520. If the second electronic device 2520 accepted the connection request that was made by the WCS 2550 in operation 3134, the voice call may be connected between the first electronic device 2500 and the second electronic device 2520.

Therefore, in accordance with another exemplary embodiment of the present disclosure, the first electronic device 2500 may share the image content other than the voice content while performing a voice call with the operator corresponding to the second electronic device 2520, in the ARS service. For example, as shown in the example of FIG. 34, a customer using the first electronic device 2500 may visually see the item or menu 3470 provided to the pizza delivery service, which is shown in FIG. 34, while performing a voice call with a counseling staff of the pizza delivery service operator corresponding to the second electronic device 2520, in the ARS system providing the pizza delivery service. Therefore, in accordance with another exemplary embodiment of the present disclosure, the customer may proceed with counseling (or make an order), viewing the content provided from the WCS 2550, while performing a voice call with the counseling staff of the operator providing the ARS.

Next, in operation 3142, the first electronic device 2500 may transmit a first selected item 3140 to the WCS 2550. In other words, the first selected item 3140 that is selected in the first electronic device 2500 may be transmitted to the WCS 2550.

For example, as shown in FIG. 34, an item such as 'Side Dish' may be selected. If the user wants to order a side dish, the item such as 'Side Dish' may be selected. In this case, the first electronic device 2500 may transmit 'Side Dish' corresponding to the first selected item to the WCS 2550.

Next, in operation 3144, the WCS 2550 may reflect the first selected item. For example, if the item such as 'Side Dish' is the first selected item, the WCS 2550 may reflect the menu in which 'Side Dish' is displayed, as first reflected content.

Next, in operation 3146, the WCS 2550 may transmit the first reflected content to the first electronic device 2500. In operation 3147, the WCS 2550 may transmit the first reflected content even to the second electronic device 2520. Therefore, the first reflected content may be transmitted to both of the first electronic device 2500 and the second electronic device 2520, to be shared.

Next, in operation 3148, the processor of the first electronic device 2500 may drive a screen for displaying the first reflected content on the display. For example, the first electronic device 2500 may display, on its display, the first reflected content such as the menu in which 'Side Dish' is displayed in operation 3146. In addition, in operation 3149, the processor of the second electronic device 2520 may also drive a screen for displaying the first reflected content on the display of the second electronic device 2520.

Next, in operation 3157, the first electronic device 2500 may receive, from the WCS 2550, second reflected content in which a second selected item that is selected in the second electronic device 2520 is reflected.

Next, in operation 3152, the second electronic device 2520 may transmit a second selected item 3150 to the WCS 2550. In other words, the second selected item 3150 that is selected in the second electronic device 2520 may be transmitted to the WCS 2550. Next, in operation 3154, the WCS 2550 may reflect the second selected item 3150. Next, in operation 3156, the WCS 2550 may transmit the second reflected content to the second electronic device 2520. In operation 3157, the WCS 2550 may transmit the second reflected content even to the first electronic device 2500. Therefore, the second reflected content may be transmitted to both of the first electronic device 2500 and the second electronic device 2520, to be shared.

Next, the electronic device 2500 having a function of sharing content in voice communication according to another exemplary embodiment of the present disclosure may perform operations 2640 to 2662 described in FIG. 26A in the same way. Therefore, in another exemplary embodiment of the present disclosure, a description of operations 2640 to 2662 will be omitted.

Therefore, in accordance with another exemplary embodiment of the present disclosure, the user of the first electronic device 2500 may perform a voice call with a counseling staff of the operator corresponding to the second electronic device 2520, even while using the ARS system. In addition, since the first electronic device 2500 and the second electronic device 2520 can share the content from the WCS 2550, the user (or customer) of the first electronic device 2500 may share the item selected by the user himself/herself, with the user (or counseling staff) of the second electronic device 2520. Therefore, in accordance with another exemplary embodiment of the present disclosure, the user may receive counseling, while sharing the visually displayed content with the counseling staff in the ARS system.

Figure 36:
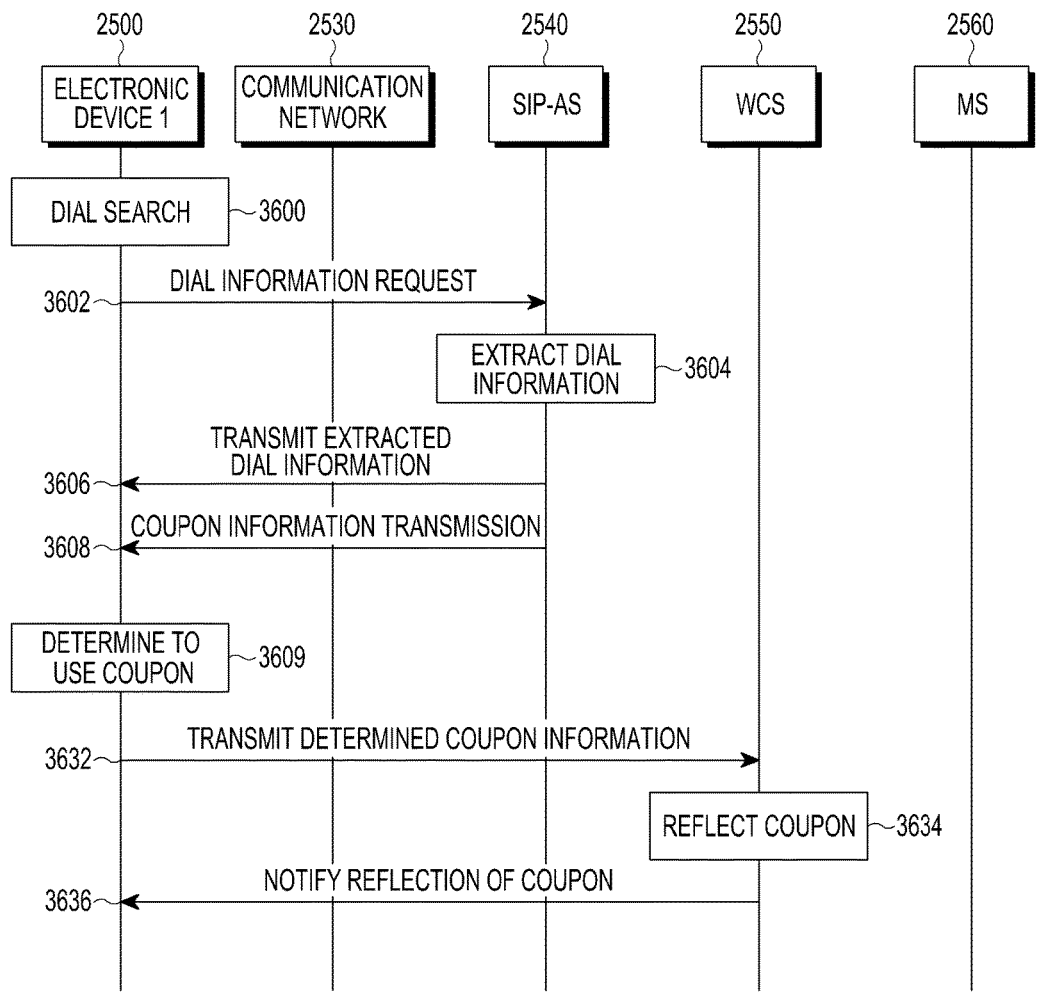
FIG. 36 is a flowchart for a control method of an electronic device having a function of sharing content in voice communication according to further another exemplary embodiment.

FIG. 36 is a flowchart for a control method of an electronic device having a function of sharing content in voice communication according to further another exemplary embodiment of the present disclosure. FIGS. 37 to 42 illustrate execution screens of an electronic device having a function of sharing content in voice communication according to further another exemplary embodiment of the present disclosure. Reference will be made to FIGS. 36 to 42 to describe further another exemplary embodiment of the present disclosure.

Referring to FIG. 36, in the control method of an electronic device having a function of sharing content in voice communication according to further another exemplary embodiment of the present disclosure, the electronic device 2500 may first search for a dialed number in operation 3600. A processor of the electronic device 2500 may search for the dialed from a database stored in the memory.

For example, referring to FIG. 37A, the processor may receive an input for a command to start a dialed search. For example, the command to start a dialed search may be a dialed number which is input to access a specific service name. In other words, the dialed inputted number may be '74992', digits of which correspond to the dial numbers corresponding to alphabetical characters for 'pizza'. Therefore, the processor may search for a telephone number pertaining to a pizza delivery company from a database stored in the memory, in response to the numbers '74992' corresponding to the dialed numbers. In this case, the processor may display the telephone number associated with the searched dialed number such as '15886789' on the display, as shown in FIG. 37A.

Next, in operation 3602, the electronic device 2500 may send a request for dial information to the SIP-AS 2540. The processor of the electronic device 2500 may receive an input for a command to request the dial information from the SIP-AS 2540. For example, as shown in FIG. 37A, the processor may receive an input for the command by detecting a selection of an icon 3730 for executing the command. In other words, if a selection of the icon 3730 is detected, the processor may request dial information from the SIP-AS 2540.

Next, in operation 3604, the SIP-AS 2540 may extract dial information. The SIP-AS 2540 may extract dial information from the database stored in the memory. The memory embedded in the SIP-AS 2540 may store the database having the dial information. The database may store dial information that is stored in advance by each of a plurality of operators providing the ARS. For example, as shown in FIG. 37B, dial information such as Pizzahome (15886789), Pizzahouse (12136567), Housepizza (12136568), Streetpizza (12136569) and Bestpizza (12136572), may be stored in advance in the database that is stored in the memory of the SIP-AS 2540. Therefore, the SIP-AS 2540 may extract the dial information from the database stored in its memory.

Next, in operation 3606, the electronic device 2500 may receive the extracted dial information from the SIP-AS 2540. The SIP-AS 2540 may transmit the dial information extracted from the database stored its memory, to the electronic device 2500. The processor of the electronic device 2500 may display the received dial information 3740 on the display as shown in FIG. 37B.

Next, in operation 3608, the electronic device 2500 may receive coupon information from the SIP-AS 2540. The SIP-AS 2540 may extract the coupon information from the database stored in its memory. The memory embedded in the SIP-AS 2540 may store the database having the coupon information. The database may store coupon information that is stored in advance by each of a plurality of operators providing the ARS. The SIP-AS 2540 may transmit the coupon information extracted from the database to the electronic device 2500. The processor of the electronic device 2500 may display the received coupon information 3770 as shown in FIG. 37C. FIG. 37C shows a coupon 3770 provided by an operator 'Housepizza'.

Next, in operation 3609, the electronic device 2500 may receive a selection of a decision to use the coupon. The electronic device 2500 may receive an input for a command to determine use of the coupon. For example, the command may be a selection of an icon for determining use of the coupon. Referring to FIG. 37C, if a selection of an icon 3780 for determining use of the coupon is entered, the electronic device 2500 may receive a selection of a decision to use the coupon.

Next, the electronic device 2500 having a function of sharing content in voice communication according to further another exemplary embodiment of the present disclosure may perform operations 2610 to 2630 described in FIG. 26A in the same way. Therefore, in another exemplary embodiment of the present disclosure, a description of operations 2610 to 2630 will be omitted. An example of execution screens for operations 2610 to 2630 in FIG. 26A, which are repeated in another exemplary embodiment of the present disclosure, will be described with reference to FIGS. 38A to 38C. For example, referring to FIG. 38A, the electronic device 2500 may send a call with a phone number '15886789' corresponding to 'Housepizza'. The electronic device 2500 may be connected to the ARS system corresponding to 'Housepizza' through the MS 2560. The electronic device 2500 may receive content corresponding to 'Housepizza' from the WCS 2550. The electronic device 2500 may transmit a selection 3800 of an item for ordering 'Hawaiian pizza' to the WCS 2550.

Next, in operation 3632, the electronic device 2500 may transmit information about the determined coupon to the WCS 2550. For example, as shown in FIG. 37C, the electronic device 2500 may transmit, to the WCS 2550, information about the coupon determined as 'Hawaiian pizza 15% Discount Coupon' 3770 of 'Housepizza'.

Next, in operation 3634, the WCS 2550 may reflect the coupon. In other words, the WCS 2550 may calculate the final settlement price that is determined by reflecting the coupon with respect to the order price. For example, as shown in FIG. 38C, the WCS 2550 may calculate the final settlement price 3820 by reflecting the coupon 3810 with respect to the ordered pizza 'Hawaiian pizza'.

Next, in operation 3636, the electronic device 2500 may receive a notification regarding the reflection of the coupon from the WCS 2550. For example, as shown in FIG. 38C, the electronic device 2500 may receive, from the WCS 2550, a notification such as an image in which the final settlement price 3820 is displayed by reflecting the coupon 3810 with respect to the ordered pizza 'Hawaiian pizza'.

Figures 39A, 39B:
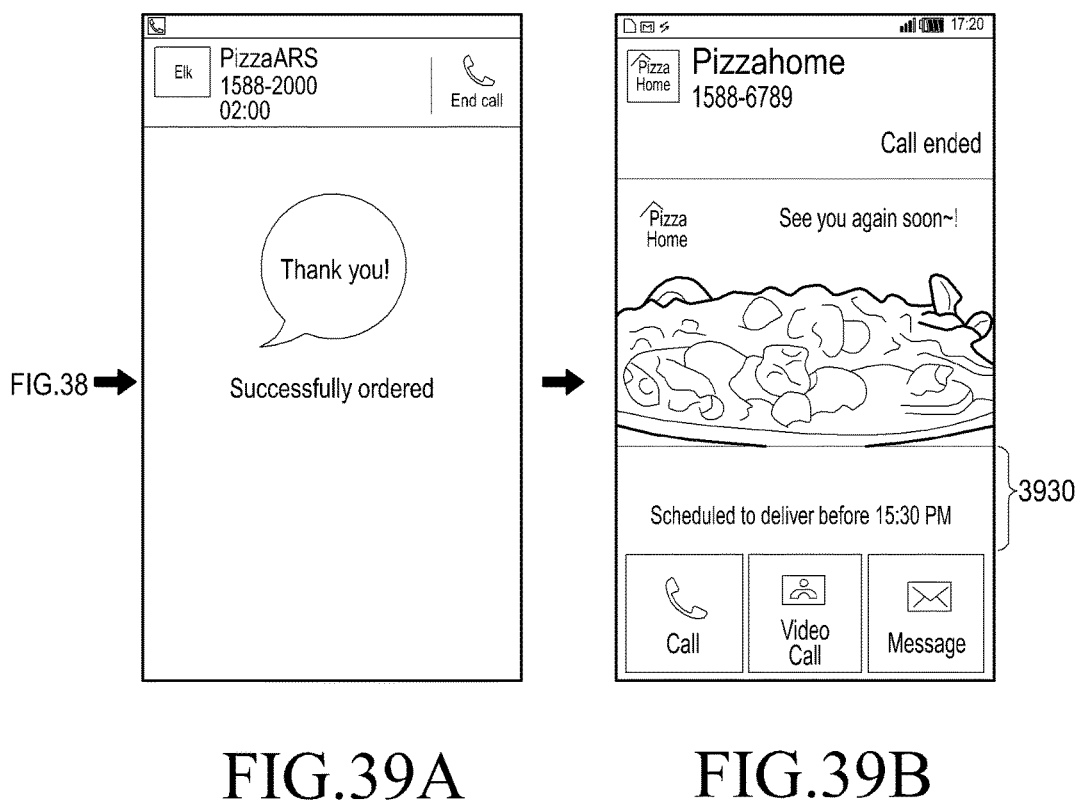

Next, the electronic device 2500 having a function of sharing content in voice communication according to another exemplary embodiment of the present disclosure may perform operations 2640 to 2662 described in FIG. 26A in the same way. Therefore, in yet another exemplary embodiment of the present disclosure, a description of operations 2640 to 2662 will be omitted. An example of execution screens for operations 2640 to 2662 in FIG. 26A, which are repeated in another exemplary embodiment of the present disclosure, will be described with reference to FIGS. 39A and 39B. For example, referring to FIG. 39A, if the order is completed, the call may be terminated. The electronic device 2500 may receive confirmed service data from the WCS 2550 (in operation 2660 in FIG. 26A). For example, as shown in FIG. 39B, the confirmed service data from the WCS 2550 may be a delivery schedule. In this case, the electronic device 2500 may display the delivery schedule 3930 on the Call End screen as shown in FIG. 39B.

Therefore, in accordance with another exemplary embodiment of the present disclosure, the electronic device 2500 may receive the dialed information of the operator providing the service that the electronic device 2500 desires to use, from the SIP-AS 2540. In addition, in accordance with another exemplary embodiment of the present disclosure, the electronic device 2500 may receive the coupon information for the service from the WCS 2550 and use the coupon in the ARS system.

Figures 40A, 40B, 40C:
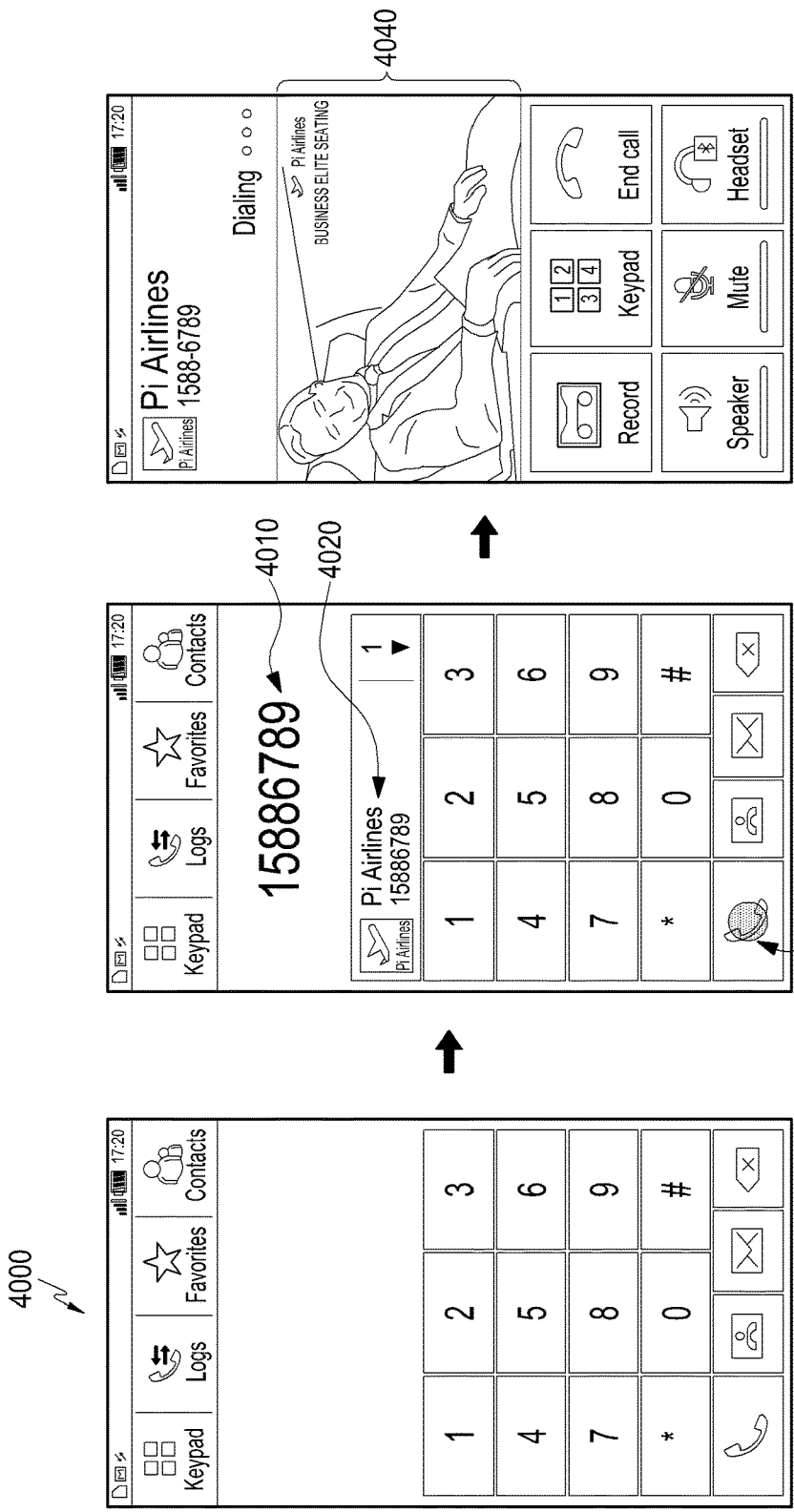

FIGS. 40 to 42 illustrate execution screens of an electronic device having a function of sharing content in voice communication according to another exemplary embodiment of the present disclosure. Reference will be made to FIGS. 26 and 40A to 42B to describe another exemplary embodiment of the present disclosure.

Referring to FIG. 26A, first, in operations 2610 to 2614, the electronic device 2500 having a function of sharing content during voice communications according to another exemplary embodiment of the present disclosure may transmit a call over the mobile network. The processor of the electronic device 2500 may connect a request for driving the ARS to the MS 2560 by transmitting a call over the mobile network. In this case, the processor may transmit a call by running a phone application. For example, as shown in FIG. 40A, the processor may transmit a call by running a phone application 4000. For example, as shown in FIG. 40B, the processor may receive a phone number 4010 such as '15886789'. The processor may extract a name of a contact corresponding to the phone number 4010 such as '15886789', from the memory, and display the extracted name. The memory may include a database having a name and a phone number associated with the contact. For example, as shown in FIG. 40B, the processor may display, as 'Pi Airlines' 4020, a name of the contact corresponding to the phone number 4010 such as '15886789'. The processor may send a call upon receiving an input for a selection of a Send Call icon 4030.

Next, in operation 2612, the operator communication network 2530 may send an access request for the ARS to the SIP-AS 2540.

Next, in operation 2614, the SIP-AS 2540 may send a request for driving the ARS to the MS 2560. For example, as shown in FIG. 40B, the SIP-AS 2540 may extract information about the MS 2560 of the operator corresponding to the phone number such as '15886789', from the database. If the operator corresponding to the phone number '15886789' is 'Pi Airlines', the SIP-AS 2540 may send a request for driving the ARS to the MS 2560 for 'Pi Airlines'.

Next, in operation 2620, the electronic device 2500 may transmit the called number to the WCS 2550.

Next, in operation 2622, the WCS 2550 may query the called number. For example, as shown in FIG. 40B, if the called number that the WCS 2550 has received from the electronic device 2500 is '15886789', the WCS 2550 may query, as 'Pi Airlines', the operator corresponding to the called number '15886789' from the database.

Next, in operation 2624, the WCS 2550 may invoke content of the operator corresponding to the called number. For example, the content may be an advertising image of the operator, or an item or menu provided by the ARS.

Next, in operation 2626, the electronic device 2500 may receive the content from the WCS 2550.

Next, in operation 2628, the electronic device 2500 may display the content received from the WCS 2550 on its display. For example, as shown in FIG. 40C, if the content received from the WCS 2550 is an advertising image to be displayed on the Call Send Standby screen, the processor of the electronic device 2500 may display the advertising image 4040 on the Call Send Standby screen. In addition, as shown in FIG. 41A, the processor may display an item or menu 4150 provided by the ARS regarding an air ticket booking service.

Next, in operation 2630, the ARS may be connected between the electronic device 2500 and the MS 2560. For example, if the operator corresponding to the phone number '15885678' is 'Pi Airlines', the ARS may be connected between the electronic device 2500 and the MS 2560 for 'Pi Airlines'.

Next, in operation 2640, the electronic device 2500 may receive an input for a selection of an item. For example, as shown in FIG. 41A, the processor of the electronic device 2500 may receive an input for a selection 4160 (e.g., for selecting Barcelona at Departure) of a detailed item for air ticket booking.

Next, in operation 2642, the electronic device 2500 may transmit the selected item to the WCS 2550.

Next, in operation 2644, the WCS 2550 may reflect the received selected item. For example, the WCS 2550 may reflect a booking schedule in which the detailed item for air ticket booking is reflected.

Next, in operation 2646, the electronic device 2500 may receive the reflected content from the WCS 2550. For example, the electronic device 2520 may receive the booking schedule in which the detailed item for air ticket booking is reflected, from the WCS 2550.

Next, in operation 2648, the electronic device 2500 may display the reflected content received from the WCS 2550, on its display. For example, as shown in FIG. 41B, the processor of the electronic device 2500 may display, on the display, the booking schedule 4170, which is from the WCS 2550 and in which the detailed item for air ticket booking is reflected.

Next, in operation 2650, the electronic device 2500 may receive the voice content corresponding to the displayed content from the MS 2560 in real time.

Next, in operation 2660, the electronic device 2500 may receive the confirmed service data from the WCS 2550. For example, the WCS 2550 may confirm the booking schedule in which the detailed item for air ticket booking is reflected, and transmit the confirmed booking schedule to the electronic device 2500.

Next, in operation 2662, the electronic device 2500 may display the confirmed service data received from the WCS 2550 on its display. For example, as shown in FIG. 41C, the electronic device 2500 may display the confirmed air ticket 4180 corresponding to the confirmed data service received from the WCS 2550 on the Call Ended screen. In addition, as shown in FIG. 42B, the electronic device 2500 may display the confirmed air tickets 4295 included in the schedule in a Planner application 4290 that is executed in FIG. 42A.

Figure 43A:
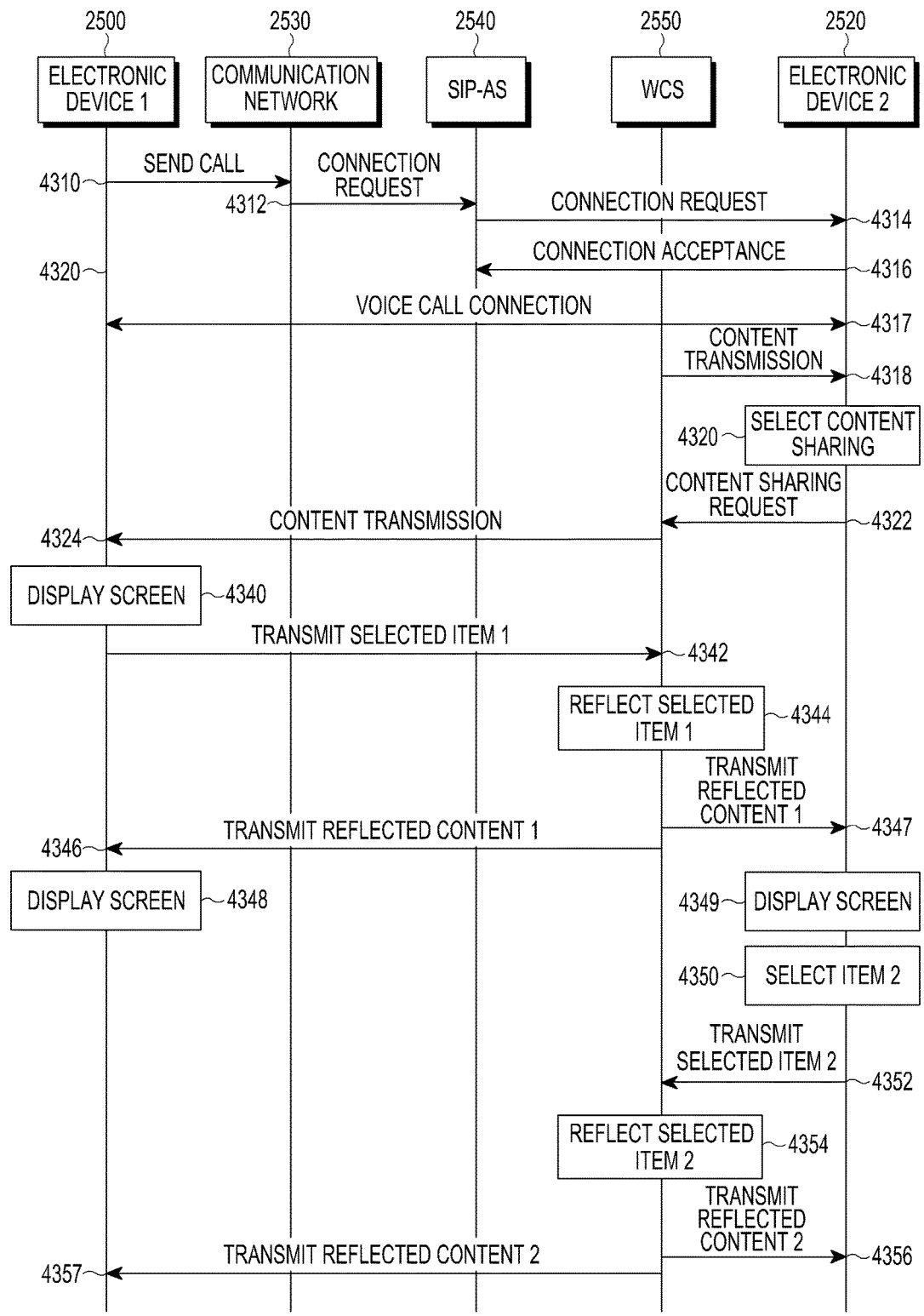
FIGS. 43A and 43B are flowcharts for a control method of electronic devices having a function of sharing content in voice communication according to another exemplary embodiment.
Figure 43B:
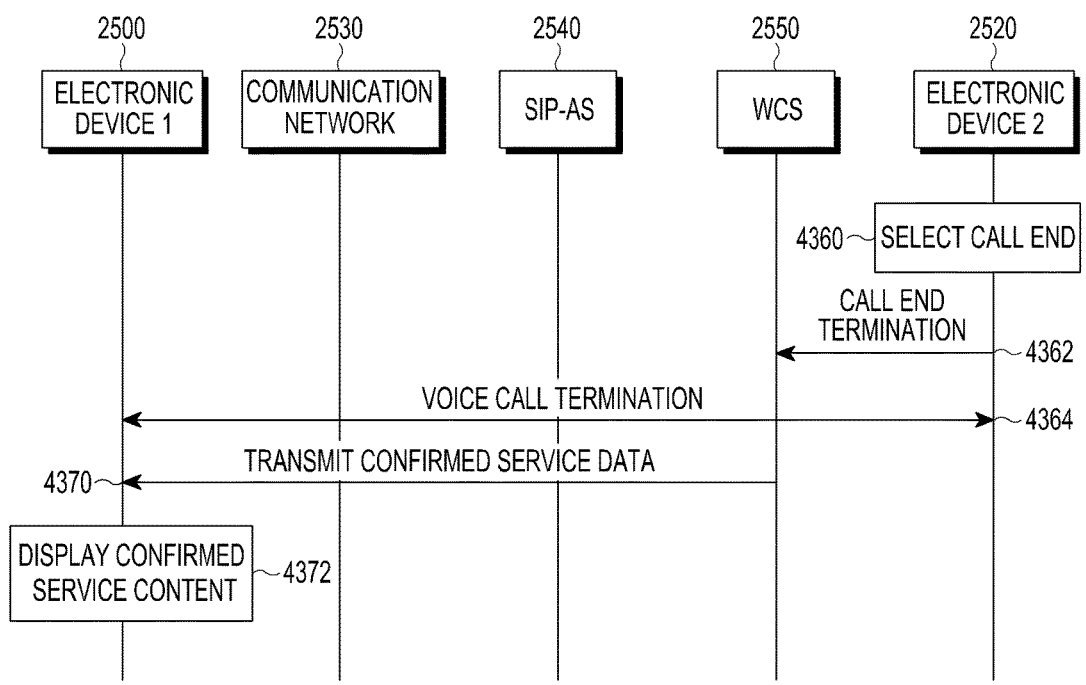

FIGS. 43A and 43B are flowcharts illustrating a control method of electronic devices having a function of sharing content during voice communications according to another exemplary embodiment of the present disclosure. FIGS. 44 to 48 illustrate execution screens of electronic devices having a function of sharing content during voice communications according to another exemplary embodiment of the present disclosure. In accordance with another exemplary embodiment of the present disclosure, a voice call requested by a first electronic device may be connected to a second electronic device. During execution of the voice call, data communication may be performed with the first electronic device in response to a communication request for data transmission by the second electronic device. The second electronic device may request the WCS to provide some of the content received from the WCS through the data communication, on a screen of the first electronic device.

Figure 44A:
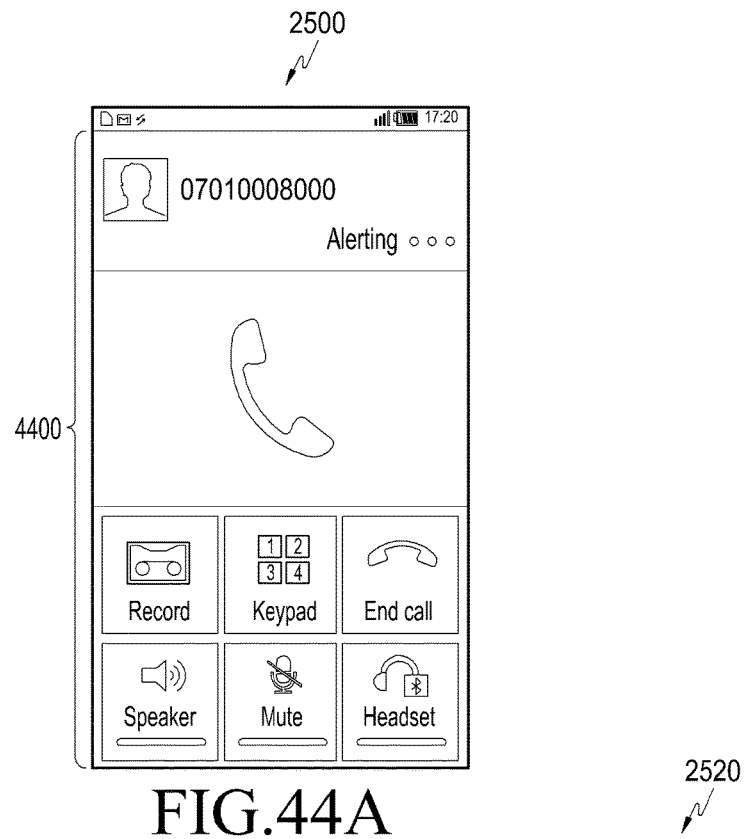
FIGS. 44A, 44B, 45A, 45B, 46A-46C, 47A-47C, 48A, and 48B illustrate execution screens of electronic devices having a function of sharing content in voice communication according to another exemplary embodiment.

Referring to FIG. 43, in operation 4310, the first electronic device 2500 having a function of sharing content during voice communications according to another exemplary embodiment of the present disclosure may send a connection request for connecting a voice call with the second electronic device 2520 to the operator communication network 2530. The second electronic device 2520 may be an electronic device of an operator providing a service. Therefore, the first electronic device 2500 may request a direct voice call connection with the operator providing the service. For example, as shown in FIG. 44A, the processor of the first electronic device 2500 may request a connection of the voice call by running a phone application 4400.

Next, in operation 4312, the operator communication network 2530 may send a connection request for the voice call to the SIP-AS 2540. Next, in operation 4314, the SIP-AS 2540 may send the connection request for the voice call to the second electronic device 2520.

Figure 44B:
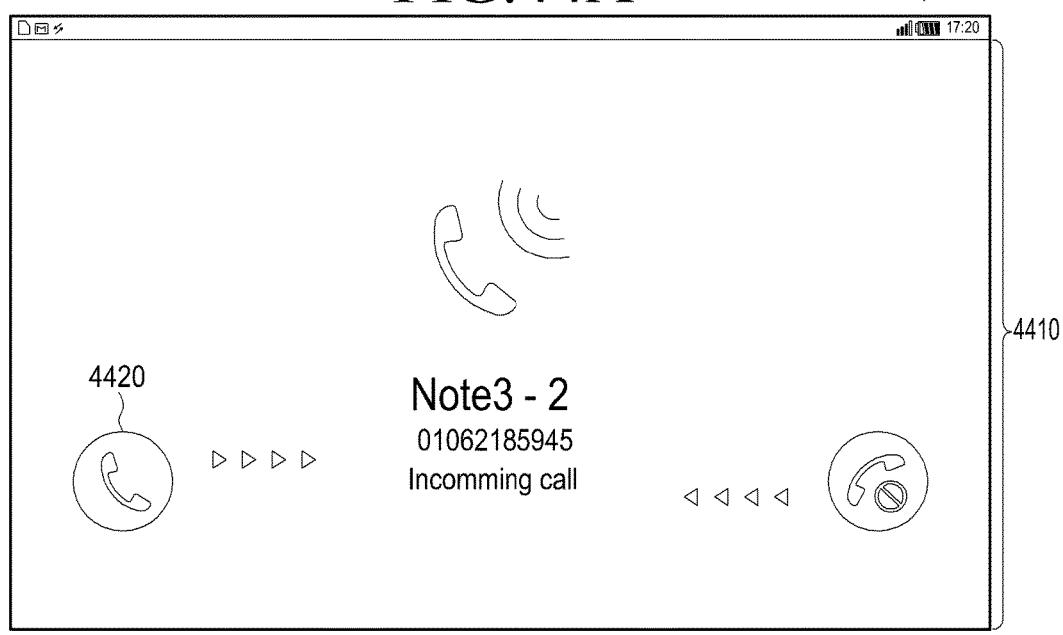

Next, in operation 4316, the second electronic device 2520 may accept the connection in response to the connection request for the voice call. For example, as shown in FIG. 44B, the second electronic device 2520 may run a phone application 4410 to detect a selection of a Connect Call icon 4420, and accept the connection. Therefore, in operation 4317, the voice call may be connected between the first electronic device 2500 and the second electronic device 2520, in response to the connection acceptance by the second electronic device 2520.

Figure 45A:
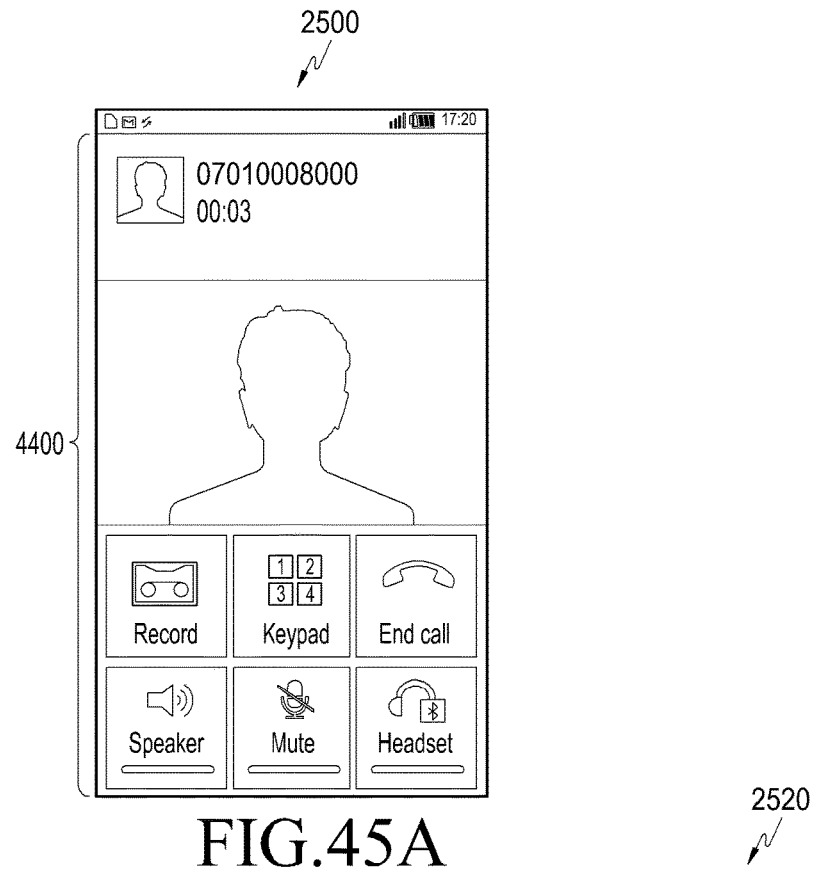
Figure 45B:
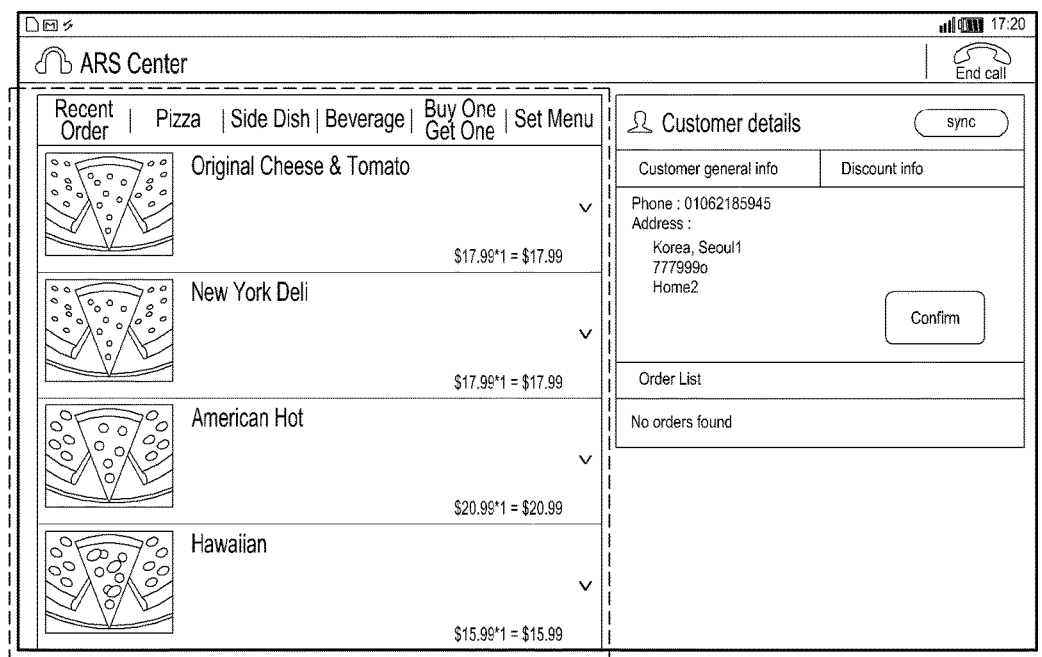

Next, in operation 4318, the second electronic device 2520 may receive content of the operator from the WCS 2550. The WCS 2550 may store the content of the operator in its database. For example, the content may be an item or menu provided in the ARS system of the operator. For example, if the operator provides a pizza delivery service, the content may be a pizza delivery menu. For example, as shown in FIG. 45B, the second electronic device 2520 may receive the content such as a pizza delivery menu 4520 from the WCS 2550, and display the received content on its display. In this case, the first electronic device 2500 may display a Phone Conversation screen on its display, as shown in FIG. 45A.

Next, in operation 4320, the second electronic device 2520 may receive an input for a selection of content sharing. The selection of content sharing may mean that the second electronic device 2520 shares the content received from the WCS 2550 with the first electronic device 2500. For example, the selection of content sharing may mean that the second electronic device 2520 shares the received content such as the pizza delivery menu 4520, with the first electronic device 2500.

Figure 46A:
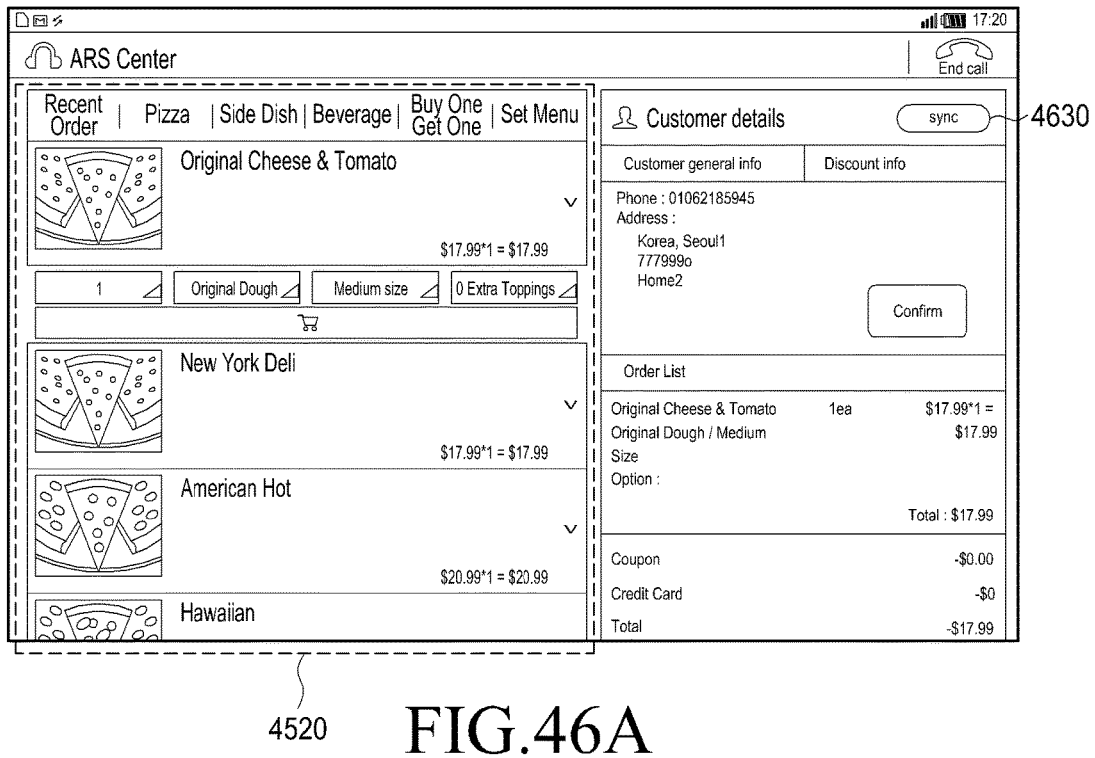

In this case, the second electronic device 2520 may receive the input for a selection of content sharing by detecting a selection of a Share Content icon. For example, the second electronic device 2520 may receive the input for a selection of content sharing by detecting a selection of a Share Content icon such as 'Sync' 4630, as shown in FIG. 46A.

Figure 46B:
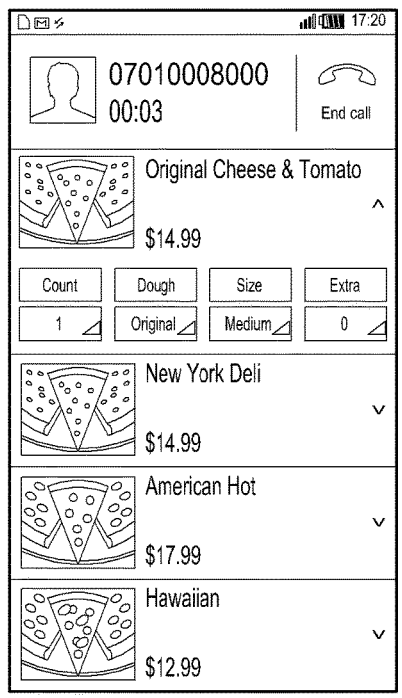
Figure 46C:
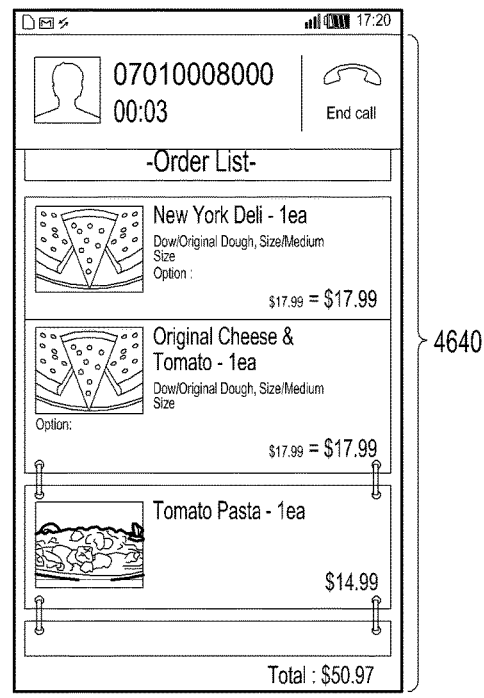

Next, in operation 4322, upon receiving the input for a selection of content sharing, the second electronic device 2520 may send a content sharing request to the WCS 2550. Next, in operation 4324, the WCS 2550 may transmit the content to the first electronic device 2500 in response to the content sharing request. For example, the WCS 2550 may transmit the content such as a pizza delivery menu 4620 to the first electronic device 2500 in response to the content sharing request. In operation 4340, the first electronic device 2500 may display the content such as the pizza delivery menu 4620 on its display, as shown in FIG. 46B. As another example, the second electronic device 2520 may share edited content with the first electronic device 2500. The edited content may mean the content that is important to the user of the first electronic device 2500, who is a user of the service. The edited content may be edited by the second electronic device 2520. For example, as shown in FIG. 46C, the second electronic device 2520 may share the edited content such as a pizza list (or a user's completed order list) 4640 with the first electronic device 2500.

Therefore, in accordance with another exemplary embodiment of the present disclosure, while a user of a service performs a voice call with an operator providing the service, if the operator selects an icon to share content related to the service, the user may immediately recognize the content on the screen. In other words, in accordance with another exemplary embodiment of the present disclosure, if the user has any questions about the service while performing a voice call with the operator, the operator may share the content related to the service with the user, solving the questions, so the user may correctly recognize details of the service. In addition, in accordance with another exemplary embodiment of the present disclosure, since the operator requests content sharing, the operator may pay a fee for data transmission related to the content sharing.

Next, in operation 4342, the first electronic device 2500 may transmit a first selected item 4340 to the WCS 2550. In other words, the first selected item 4340 selected in the first electronic device 2500 may be transmitted to the WCS 2550. For example, as shown in FIG. 47A, the first selected item may be a pizza delivery payment item 4550.

Next, in operation 4344, the WCS 2550 may reflect the first selected item.

Figure 47A:
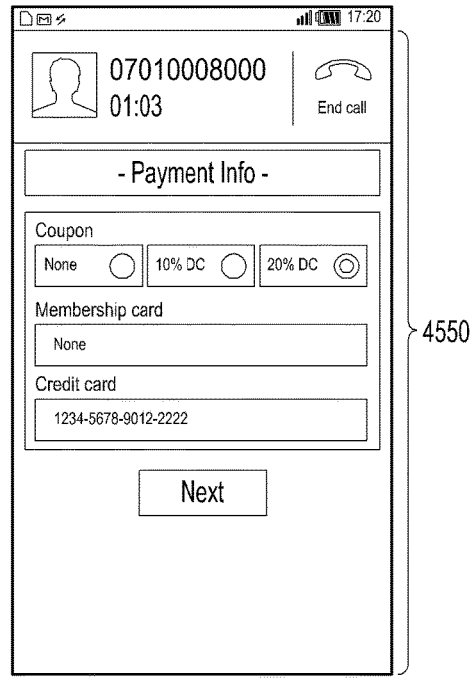

For example, as shown in FIG. 47A, the WCS 2550 may reflect the first selected item such as the pizza delivery payment item 4550, completing the payment for the pizza delivery.

Next, in operation 4346, the WCS 2550 may transmit the first reflected content to the first electronic device 2500. For example, the WCS 2550 may transmit the first reflected content such as the pizza delivery payment completion to the first electronic device 2500. In operation 4347, the WCS 2550 may transmit the first reflected content even to the second electronic device 2520. Therefore, the first reflected content may be transmitted to both of the first electronic device 2500 and the second electronic device 2520, to be shared. For example, the first reflected content such as the pizza delivery payment completion may be transmitted to both of the first electronic device 2500 and the second electronic device 2520, to be shared.

Figure 47B:
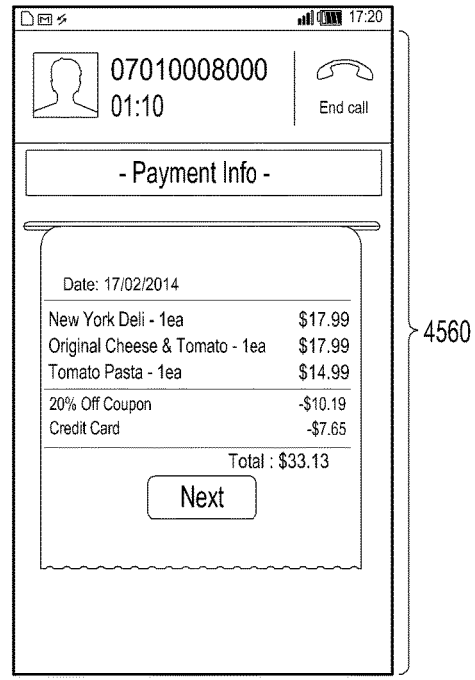
Figure 47C:
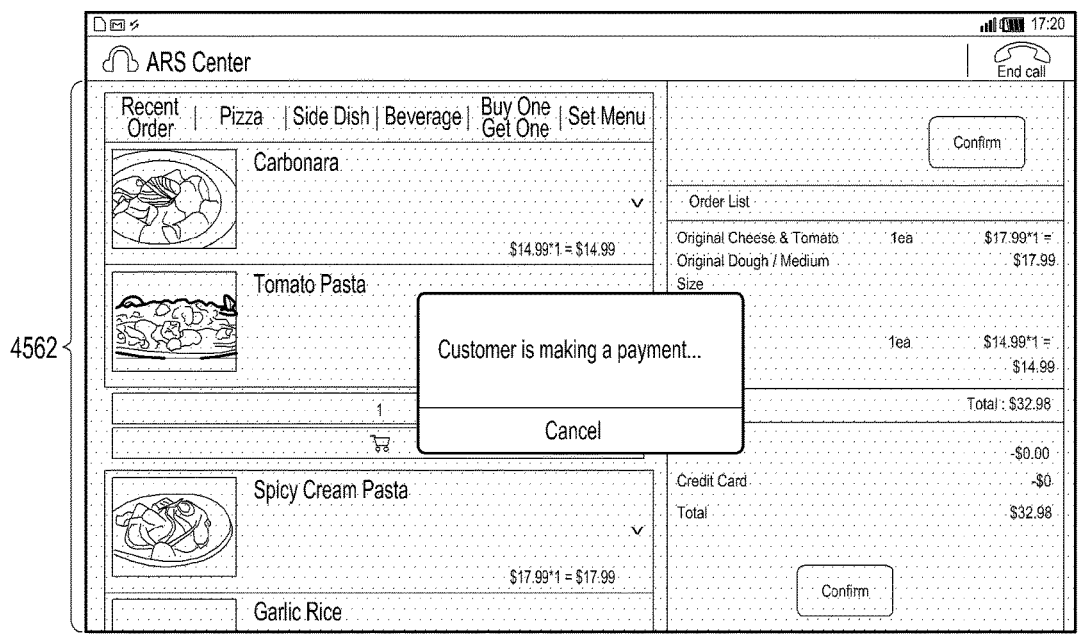

Next, in operation 4348, the processor of the first electronic device 2500 may drive a screen for displaying the first reflected content on the display. For example, as shown in FIG. 47B, the processor of the first electronic device 2500 may display the first reflected content 4560 such as the pizza delivery payment completion, on its display. In addition, in operation 4349, the processor of the second electronic device 2520 may also drive a screen for displaying the first reflected content on the display of the second electronic device 2520. For example, as shown in FIG. 47C, the processor of the second electronic device 2520 may display the first reflected content 4562 such as the pizza delivery payment completion, on its display.

Next, in operation 4352, the second electronic device 2520 may transmit a second selected item 4350 to the WCS 2550. In other words, the second selected item 4350 selected in the second electronic device 2520 may be transmitted to the WCS 2550. Next, in operation 4354, the WCS 2550 may reflect the second selected item. Next, in operation 4356, the WCS 2550 may transmit the second reflected content to the second electronic device 2520. In operation 4357, the WCS 2550 may transmit the second reflected content even to the first electronic device 2500. Therefore, the second reflected content may be transmitted to both of the first electronic device 2500 and the second electronic device 2520, to be shared. Next, in operation 4357, the first electronic device 2500 may receive, from the WCS 2550, the second reflected content in which the second selected item selected in the second electronic device 2520 is reflected.

Next, in operation 4360, the second electronic device 2520 may receive an input for a selection of call termination. If the call termination is selected, the second electronic device 2520 may send a call termination request to the WCS 2550 in operation 4362. In operation 4364, the voice call between the first electronic device 2500 and the second electronic device 2520 may be terminated in response to the call termination request.

Next, in operation 4370, the first electronic device 2500 may receive confirmed service data from the WCS 2550. For example, the WCS 2550 may transmit the confirmed service data such as the pizza delivery payment completion to the first electronic device 2500.

Figure 48A:
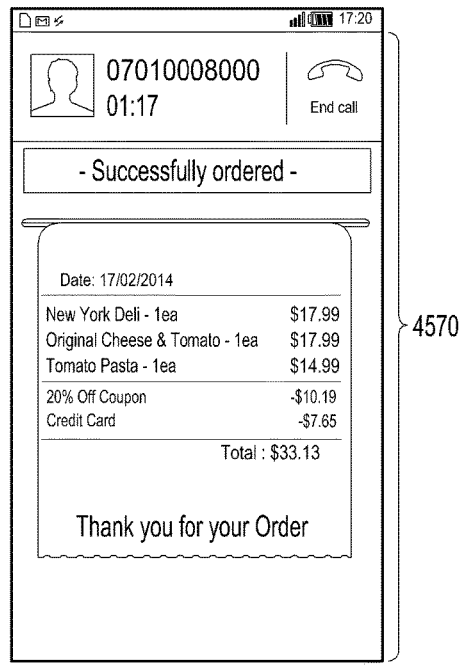
Figure 48B:
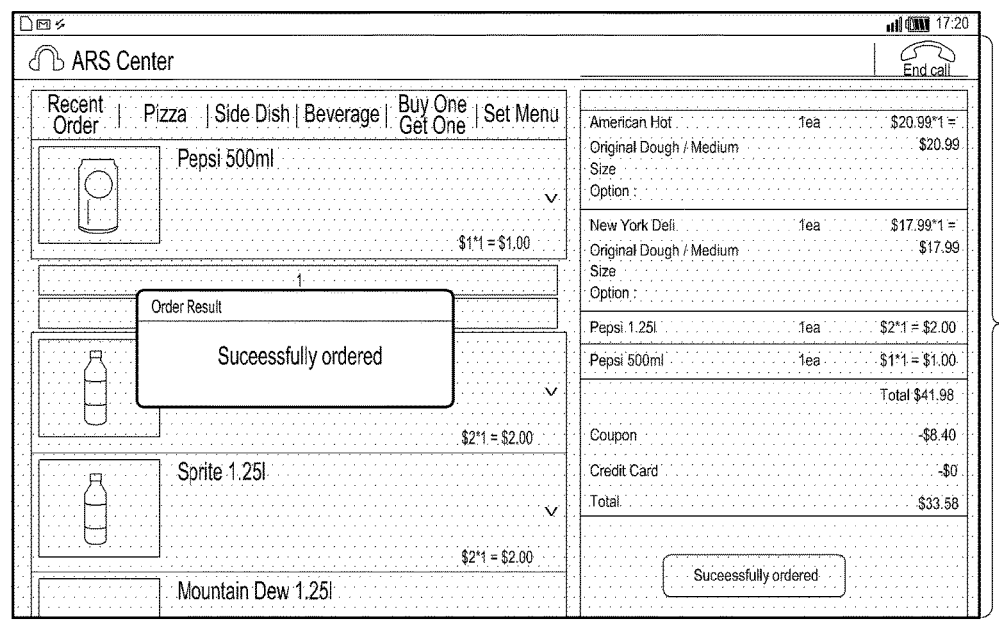

Next, in operation 4372, the first electronic device 2500 may display the confirmed service data received from the WCS 2550 on its display. For example, as shown in FIG. 48A, the first electronic device 2500 displays the confirmed service data 4570 such as the pizza delivery payment completion, received from the WCS 2550, on its display. In addition, as shown in FIG. 48B, the second electronic device 2520 may also receive the confirmed service data 4580 such as the pizza delivery payment completion from the WCS 2550, and display the received data on its display.

In accordance with another exemplary embodiment of the present disclosure, the data sharing method may include an operation of connecting a voice channel with a phone number invoked from a first electronic device to perform a voice call with a second electronic device; and an operation of, during the voice call, performing data communication with the first electronic device in response to a data channel establishment request from the second electronic device. The second electronic device may request the server to provide some or all of the content received from the server over the data channel to the first electronic device.

Figure 49:
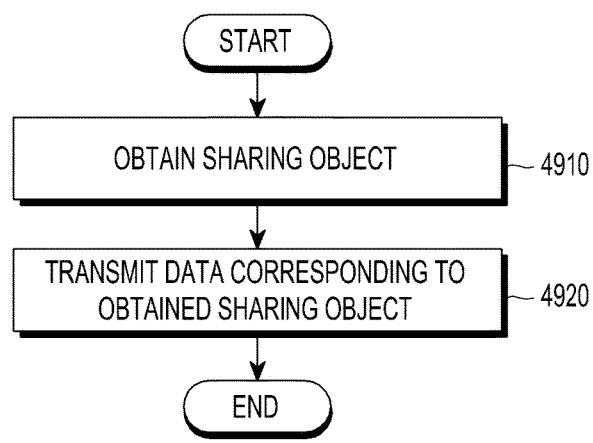
FIG. 49 is a flowchart of a data sharing method according to various exemplary embodiments.

FIG. 49 is a flowchart of a data sharing method according to various exemplary embodiments of the present disclosure.

In operation 4910, a transmitting-side electronic device may obtain a sharing object. More specifically, the transmitting-side electronic device may display a graphic user interface including at least one object. In particular, the transmitting-side electronic device may connect a voice call with a receiving-side electronic device. The transmitting-side electronic device may display a graphic user interface that includes a voice call connection screen and at least one object. The transmitting-side electronic device may obtain a sharing object based on an input through the graphic user interface.

In operation 4920, the transmitting-side electronic device may transmit data corresponding to the obtained sharing object to the receiving-side electronic device. The transmitting-side electronic device may run a sharing application corresponding to the sharing object. The sharing application may output data. The data may be based on a first format. The sharing application may be set to output data of the first format. The first format may be a format that is defined in common to both of the transmitting-side electronic device and the receiving-side electronic device. More specifically, an application stored in the receiving-side electronic device may also process data of the first format. For example, if the sharing application is a map application, the data output from the map application may be coordinate information. The receiving-side electronic device may receive the coordinate information, and process and display the received coordinate information. An example of the first format may include user information (e.g., address book information), image information, URL, public transport information, movie, time, text, alarm, application information, goods information, bank information, price, weather, barcode, Wi-Fi, control, sketch, touch, coordinate information, and the like.

The transmitting-side electronic device may transmit the data to the receiving-side electronic device through a data session. The transmitting-side electronic device may generate a data session based on the information related to the connected voice call. For example, the transmitting-side electronic device may generate a data session based on at least one of a called number and callee information, and a detailed description thereof will be given below. In addition, the receiving-side electronic device may also generate a data session based on the information related to the connected voice call. For example, the receiving-side electronic device may generate a data session based on at least one of a caller number and caller information, and a detailed description thereof will be given below.

Figure 50:
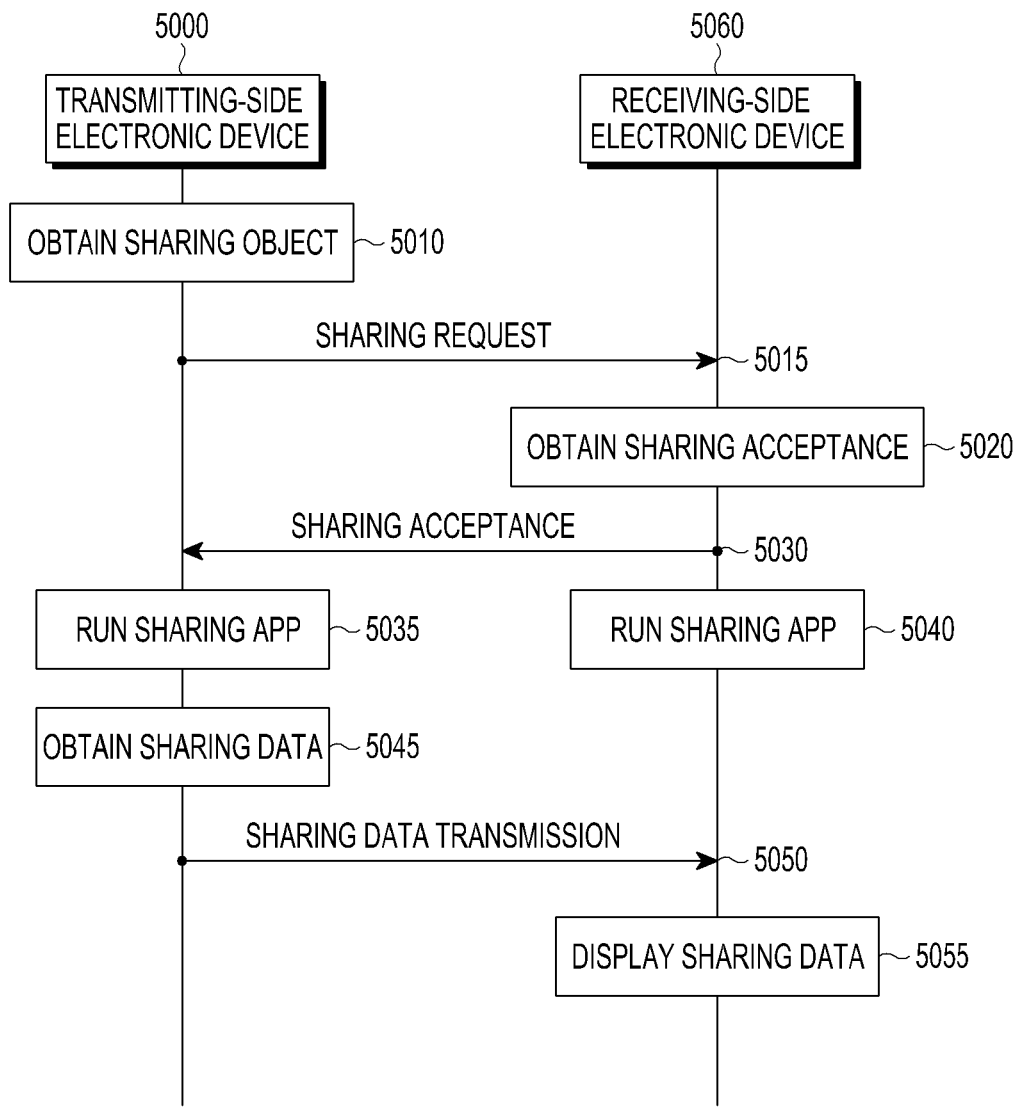
FIG. 50 is a flowchart of a data sharing method according to various exemplary embodiments.

FIG. 50 is a flowchart of a data sharing method according to various exemplary embodiments of the present disclosure. The data sharing method in FIG. 50 will be described in more detail with reference to FIGS. 51A to 60. FIGS. 51A to 60 illustrate screens displayed by a transmitting-side electronic device and a receiving-side electronic device according to various exemplary embodiments of the present disclosure.

Figure 51A:
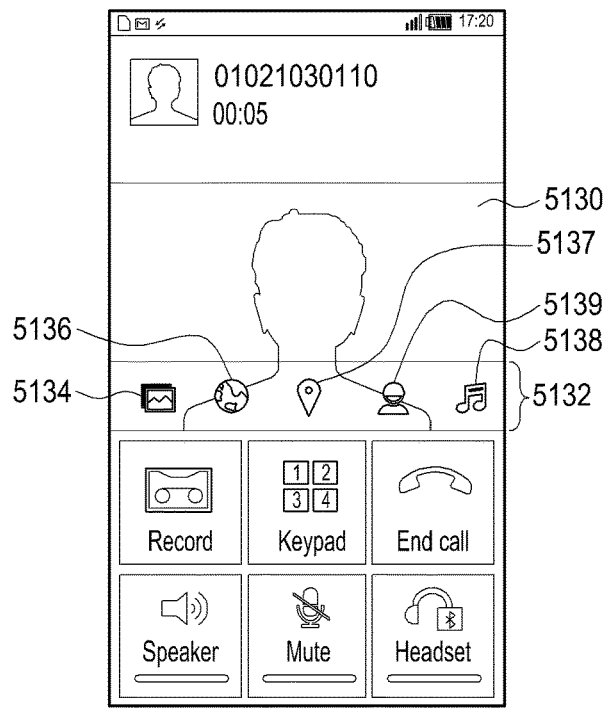
FIGS. 51A, 51B, 52A, 52B, 53A, 53B, 54A, 54B, 55A, 55B, 56A, 56B, 57A, 57B, 58A, 58B, 59A, 59B and 60 illustrate screens displayed by a transmitting-side electronic device and a receiving-side electronic device according to various exemplary embodiments.
Figure 51B:
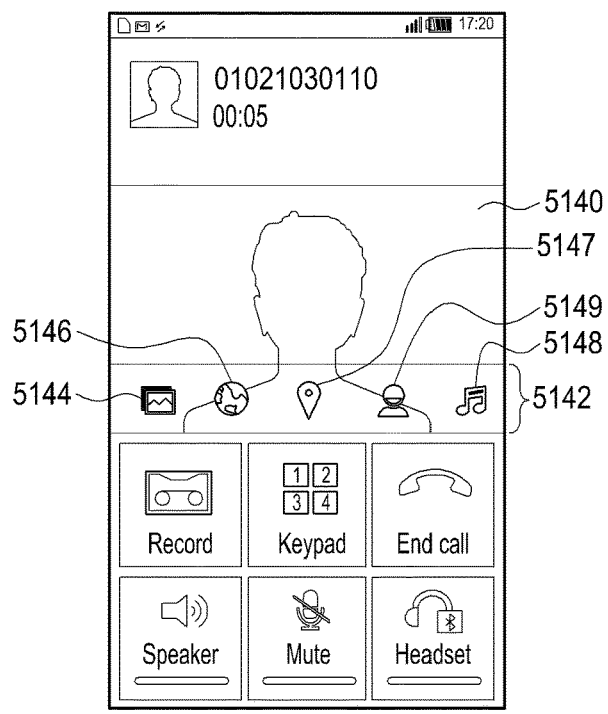

In operation 5010, a transmitting-side electronic device 5000 may obtain an object to be shared. FIG. 51A illustrates a screen displayed by the transmitting-side electronic device 5000 according to an exemplary embodiment of the present disclosure. As shown in FIG. 51A, the transmitting-side electronic device 5000 may display a phone application execution screen 5130 including at least one of a called number and callee information. The transmitting-side electronic device 5000 may further display an object panel 5132. A plurality of sharing objects 5134, 5136, 5137, 5138 and 5139 may be arranged on the object panel 5132. As described above, the transmitting-side electronic device 5000 may connect a voice call to a receiving-side electronic device 5060. Accordingly, as shown in FIG. 51B, the receiving-side electronic device 5060 may also display a phone application execution screen 5140. The receiving-side electronic device 5060 may further display an object panel 5142. A plurality of sharing objects 5144, 5146, 5147, 5148 and 5149 may be arranged on the object panel 5142.

Figure 52A:
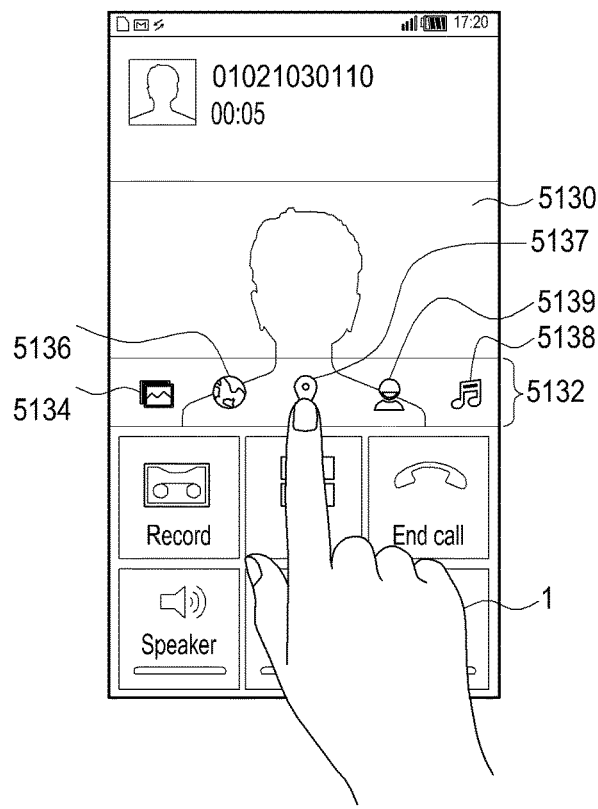

As shown in FIG. 52A, a user 1 of the transmitting-side electronic device 5000 may enter a command to designate the sharing object 5137 that the user 1 desires to share. The transmitting-side electronic device 5000 may obtain a sharing object based on the entered command. In the example of FIG. 52A, it will be assumed that the transmitting-side electronic device 5000 has obtained a map-related sharing object 5137.

Referring back to FIG. 50, in operation 5015, the transmitting-side electronic device 5000 may send a sharing request to the receiving-side electronic device 5060 based on the obtained sharing object.

Figure 52B:
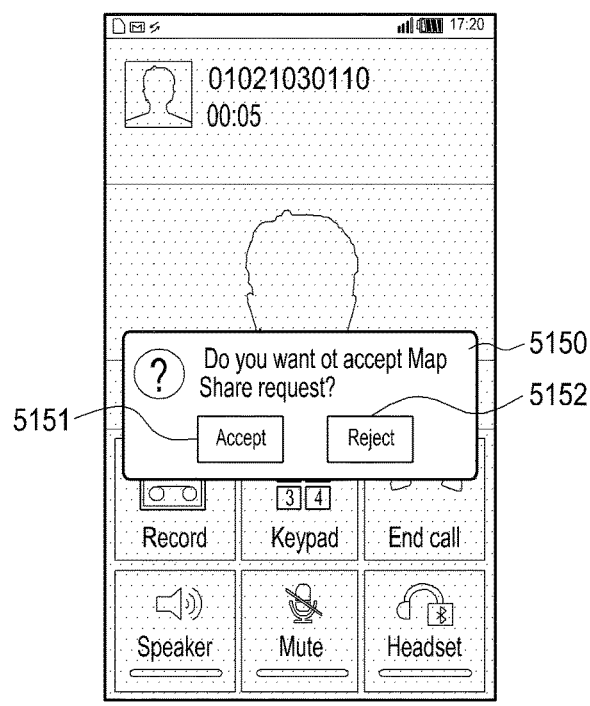

In operation 5020, the receiving-side electronic device 5060 may obtain a sharing acceptance in response to the received sharing request. More specifically, as shown in FIG. 52B, the receiving-side electronic device 5060 may display a graphic user interface 5150 for querying whether to accept sharing. The graphic user interface 5150 for querying whether to accept sharing may include a region 5151 corresponding to 'Accept' and a region 5152 corresponding to 'Reject'. The user of the receiving-side electronic device 5060 may designate, for example, the region 5151 corresponding to 'Accept', and the receiving-side electronic device 5060 may obtain a sharing acceptance in response to the entered designation.

In operation 5030, the receiving-side electronic device 5060 may send the obtained sharing acceptance to the transmitting-side electronic device 5000.

Figure 53A:
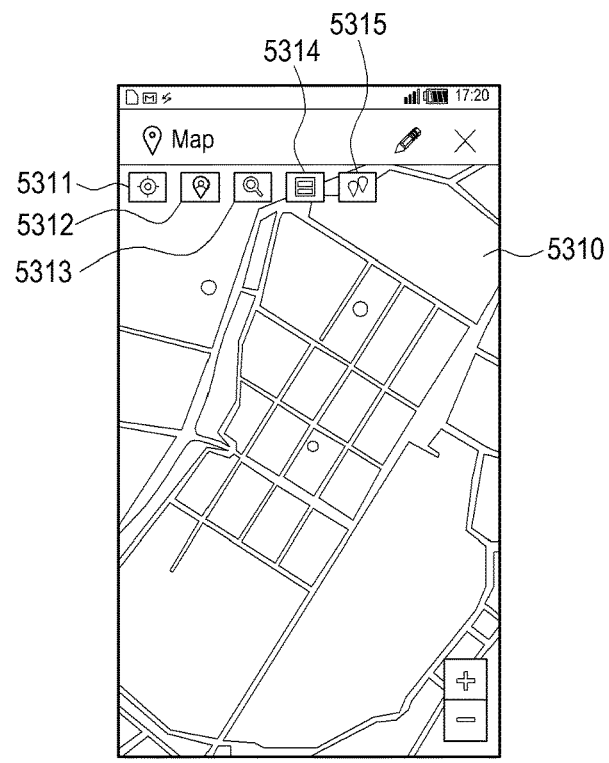

In operation 5035, the transmitting-side electronic device 5000 may execute a sharing application. The sharing application may be an application corresponding to the sharing object. As described above, in one embodiment, the sharing object may be a map-related sharing object, and the transmitting-side electronic device 5000 may display a map application as shown in FIG. 53A. In FIG. 53A, a map application execution screen 5310 may include one or more function keys 5311 to 5315 and a map.

Figure 53B:
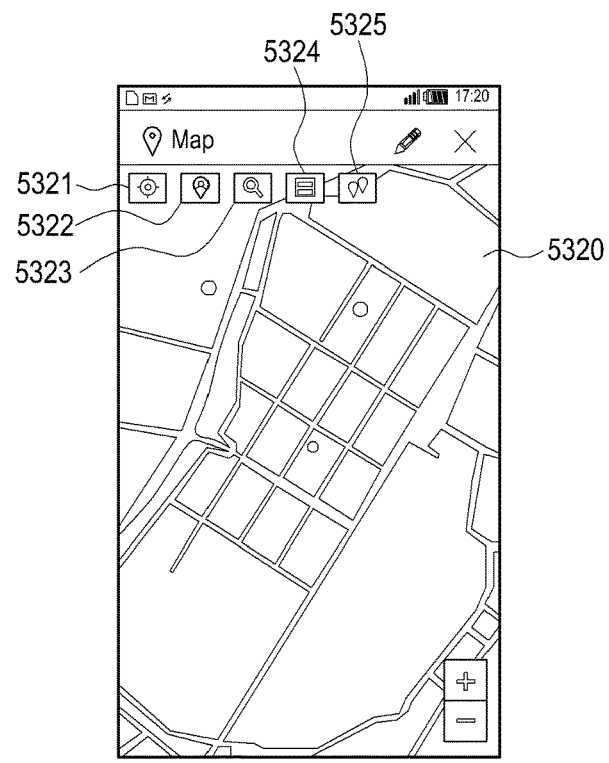

In operation 5040, the receiving-side electronic device 5060 may execute a sharing application. The sharing application may be an application corresponding to the sharing object. As described above, in one exemplary embodiment, the sharing object may be a map-related sharing object, and the receiving-side electronic device 5060 may display a map application as shown in FIG. 53B. In FIG. 53B, a map application execution screen 5320 may include one or more function keys 5321 to 5325 and a map.

In one exemplary embodiment, the map application executed by the transmitting-side electronic device 5000 may be the same as the map application executed by the receiving-side electronic device 5060. In another exemplary embodiment, the map application executed by the transmitting-side electronic device 5000 may be different from the map application executed by the receiving-side electronic device 5060. More specifically, the map application executed by the transmitting-side electronic device 5000 and the map application executed by the receiving-side electronic device 5060 may be produced by different manufacturers. Even if the map application executed by the transmitting-side electronic device 5000 is different from the map application executed by the receiving-side electronic device 5060, the map application executed by the transmitting-side electronic device 5000 and the map application executed by the receiving-side electronic device 5060 may be produced based on the data sharing platform according to an exemplary embodiment of the present disclosure. Accordingly, the data output from the map application executed by the transmitting-side electronic device 5000 and the data output from the map application executed by the receiving-side electronic device 5060 may be based on the same format (e.g., the first format). For example, the data output from the map application executed by the transmitting-side electronic device 5000 may be coordinate information, and the data output from the map application executed by the receiving-side electronic device 5060 may also be coordinate information. Accordingly, even if the map application executed by the transmitting-side electronic device 5000 is different from the map application executed by the receiving-side electronic device 5060, the map application executed by the receiving-side electronic device 5060 may process the coordinate information or the data output from the map application executed by the transmitting-side electronic device 5000.

Figure 54A:
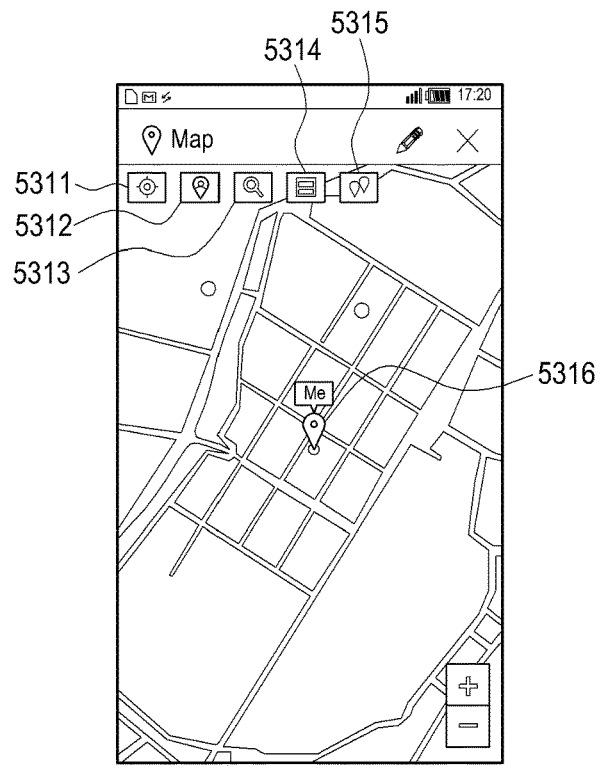

In operation 5045, the transmitting-side electronic device 5000 may obtain data to be shared. For example, as shown in FIG. 54A, the transmitting-side electronic device 5000 may receive an input to designate the current location indication function key 5311 from the user 1. The transmitting-side electronic device 5000 may display the current location 5316 of the transmitting-side electronic device 5000 on the map in response to the received input to designate the current location indication function key 5311. The transmitting-side electronic device 5000 may obtain the current location of the transmitting-side electronic device 5000, as sharing data. The transmitting-side electronic device 5000 may directly obtain the data output from the sharing application (e.g., the map application), as sharing data, or may obtain sharing data based on an additional sharing data designation command.

In operation 5050, the transmitting-side electronic device 5000 may transmit the obtained sharing data to the receiving-side electronic device 5060. For example, the transmitting-side electronic device 5000 may transmit the coordinate information for the current location of the transmitting-side electronic device 5000 to the receiving-side electronic device 5060, as sharing data. As described above, the sharing data transmitted from the transmitting-side electronic device 5000 may be based on the first format by the data sharing platform according to an exemplary embodiment of the present disclosure. In this exemplary embodiment, the first format may be coordinate information, and the transmitting-side electronic device 5000 may transmit the coordinate information for the current location of the transmitting-side electronic device 5000, instead of the entirety of a map application execution screen 5330, to the receiving-side electronic device 5060.

Figure 54B:
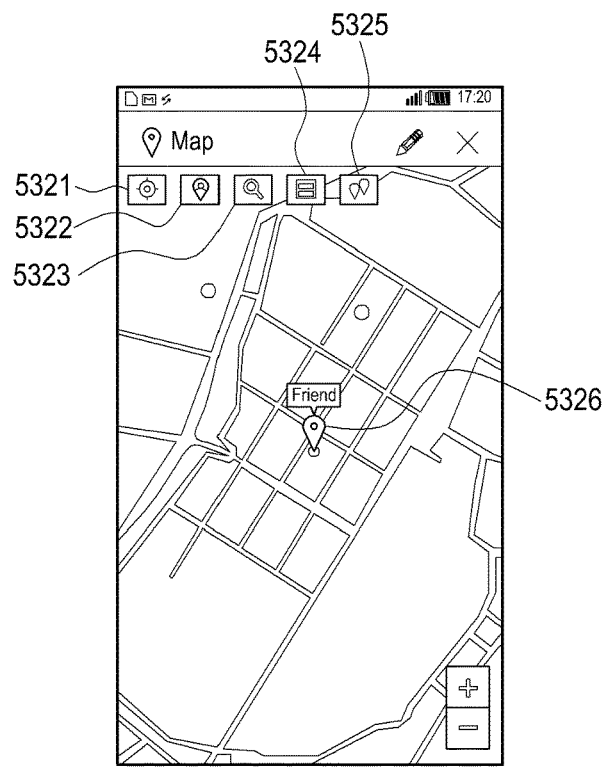

In operation 5055, the receiving-side electronic device 5060 may process and display the received sharing data. For example, as shown in FIG. 54B, the receiving-side electronic device 5060 may process the coordinates of the current location of the transmitting-side electronic device 5000, and display the current location 5326 of the transmitting-side electronic device 5000 on the map. As described above, the map application executed by the receiving-side electronic device 5060 may also be based on the first format, so the receiving-side electronic device 5060 may process the received coordinates of the current location of the transmitting-side electronic device 5000. The receiving-side electronic device 5060 may display the current location 5326 of the transmitting-side electronic device 5000 on the map, or may output a variety of processing results.

Although the description has been made of a process in which after running the sharing application, the receiving-side electronic device 5060 processes and displays received sharing data, this is just illustrative. In another exemplary embodiment, the receiving-side electronic device 5060 may receive sharing data, determine the format or type of the received sharing data, execute a sharing application corresponding thereto to process the sharing data, and output the processing results.

Figure 55A:
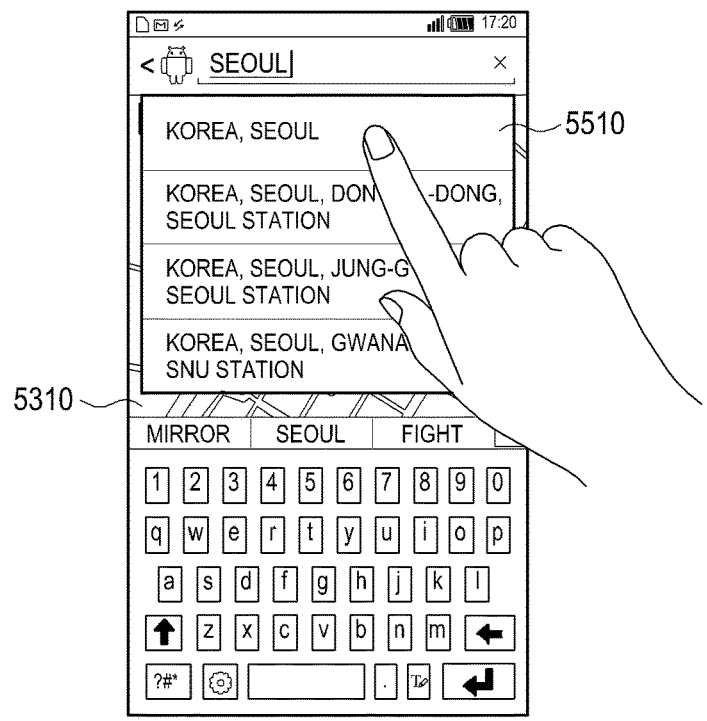
Figure 55B:
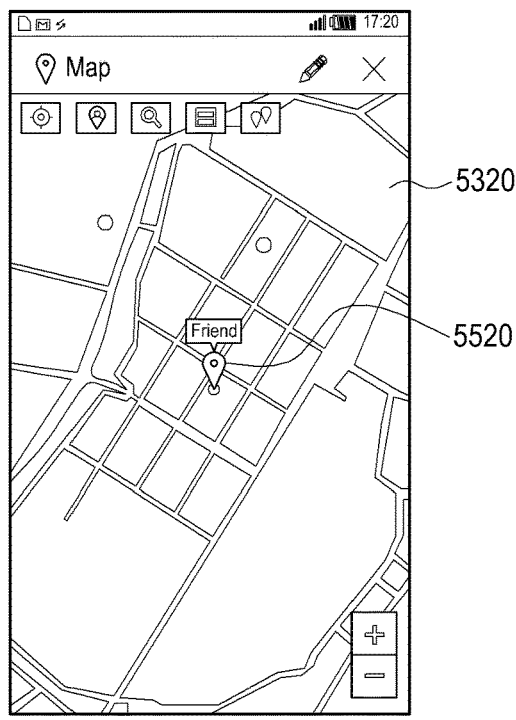

FIGS. 55A and 55B illustrate application execution screens for a data sharing method according to various exemplary embodiments of the present disclosure.

FIG. 55A illustrates the map application execution screen 5310 displayed by the transmitting-side electronic device 5000. The transmitting-side electronic device 5000 may obtain sharing data based on a text input 5510. The text input 5510 may be, for example, an address of a specific area. As described above, the output data of the map application executed in the transmitting-side electronic device 5000 may be coordinate information (e.g., the first format). Accordingly, the transmitting-side electronic device 5000 may transmit coordinate information corresponding to the address of the text input 5510 to the receiving-side electronic device 5060, as sharing data.

FIG. 55B illustrates the map application execution screen 5320 displayed by the receiving-side electronic device 5060. The receiving-side electronic device 5060 may process the received coordinate information and display the point 5520 corresponding to the address entered to the transmitting-side electronic device 5000, on the map.

Figure 56A:
Figure 56B:

FIGS. 56A and 56B illustrate application execution screens for a data sharing method according to various exemplary embodiments of the present disclosure. In the example of FIGS. 56A and 56B, the transmitting-side electronic device 5000 and the receiving-side electronic device 5060 may set an additional note 5610 that is entered on the electronic device, as sharing data. The transmitting-side electronic device 5000 may transmit at least one of the input position and input time of the entered additional note 5610 to the receiving-side electronic device 5060, as sharing data.

The receiving-side electronic device 5060 may process the received sharing data, and display the additional note 5620 on the map. The receiving-side electronic device 5060 may display the additional note 5620 on the map application execution screen 5320 based on at least one of the input position and input time of the additional note 5610. The above-described additional note may also be transmitted from the receiving-side electronic device 5060 to the transmitting-side electronic device 5000. Accordingly, at least one of two-way editing, control and manipulation is possible.

Figure 57A:
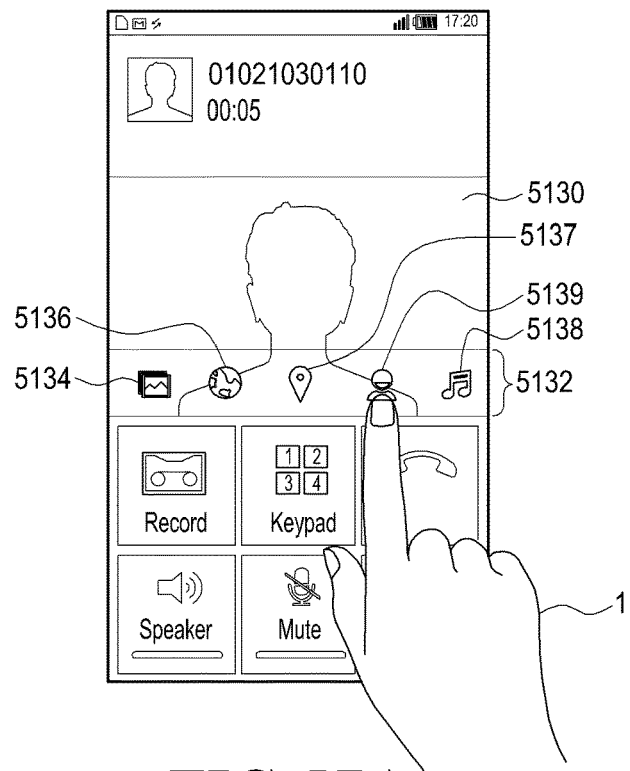
Figure 57B:
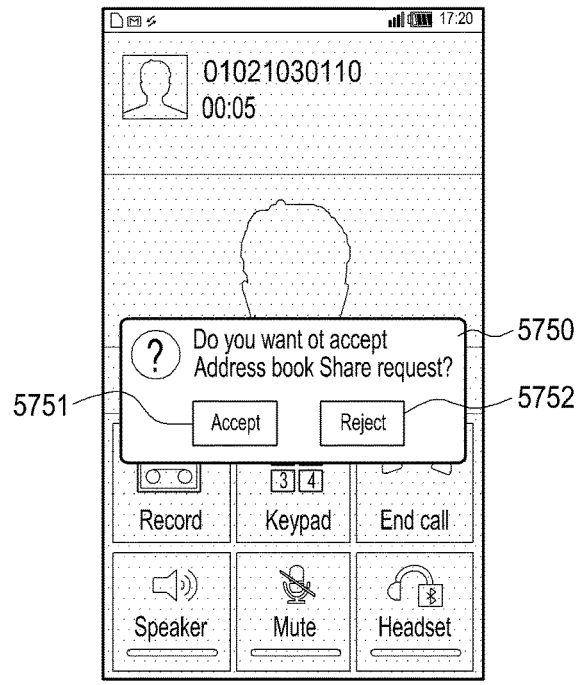

FIGS. 57A and 57B illustrate application execution screens displayed on the transmitting-side electronic device 5000 and the receiving-side electronic device 5060, respectively.

As shown in FIG. 57A, the transmitting-side electronic device 5000 may display the phone application execution screen 5130. The user 1 of the transmitting-side electronic device 5000 may enter a command to select an address book-related sharing object 5139 as a sharing object. The transmitting-side electronic device 5000 may send a sharing request to the receiving-side electronic device 5060.

The receiving-side electronic device 5060 may display a graphic user interface 5750 for querying whether to share an address book-related sharing object, based on the received sharing request. The graphic user interface 5750 for querying whether to accept sharing an address book-related sharing object may include a region 5751 corresponding to 'Accept' and a region 5752 corresponding to 'Reject'. The user of the receiving-side electronic device 5060 may designate, for example, the region 5751 corresponding to 'Accept', and the receiving-side electronic device 5060 may obtain a sharing acceptance in response to the entered designation.

Figure 58A:
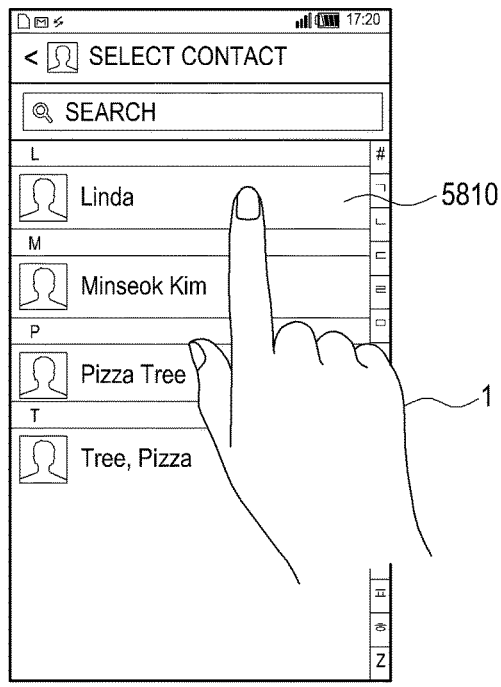

As shown in FIG. 58A, the transmitting-side electronic device 5000 may display a sharing application execution screen 5810 corresponding to the sharing object. The sharing application execution screen 5810 may include information about at least one address book. The transmitting-side electronic device 5000 may obtain address book information of, for example, "Linda", as sharing data. The transmitting-side electronic device 5000 may transmit the obtained sharing data (e.g., the address book information "Linda") to the receiving-side electronic device 5060. The sharing data may include at least one of a name, a phone number and an e-mail address.

Figure 58B:
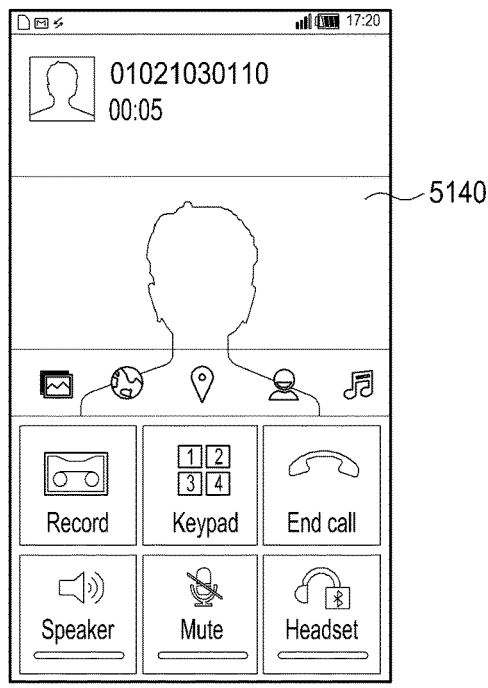

The receiving-side electronic device 5060 may receive the sharing data (e.g., the address book information "Linda") from the transmitting-side electronic device 5000. Although the receiving-side electronic device 5060 may display a sharing application execution screen corresponding to the sharing object, the receiving-side electronic device 5060 may keep the display of the phone application execution screen 5140 as shown in FIG. 58B.

Figure 59A:
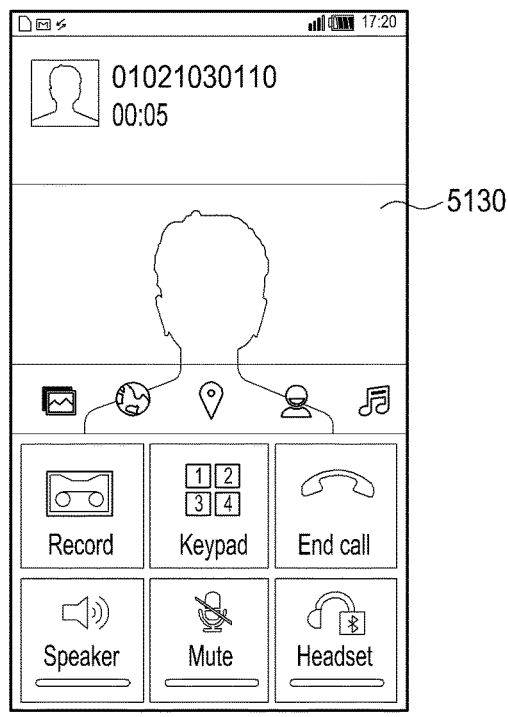
Figure 59B:
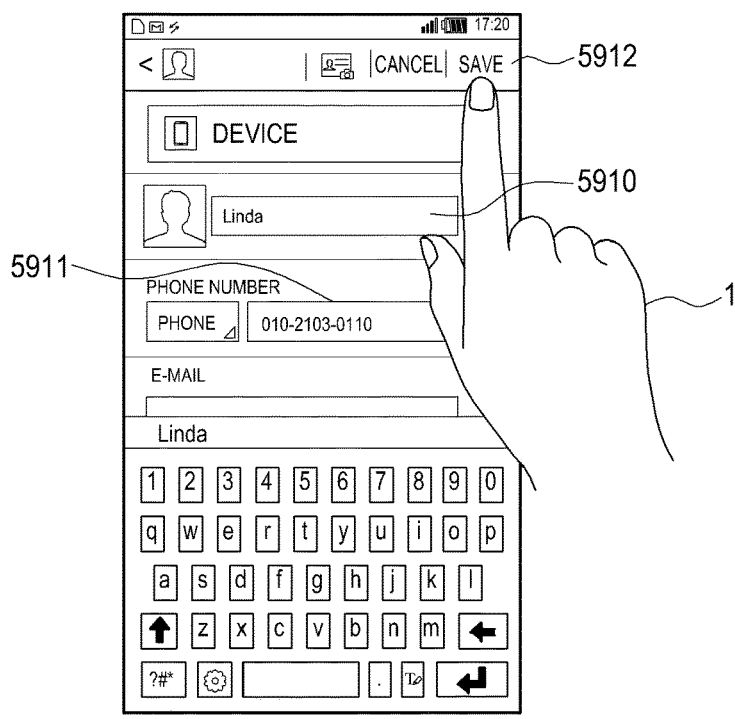
Figure 60:
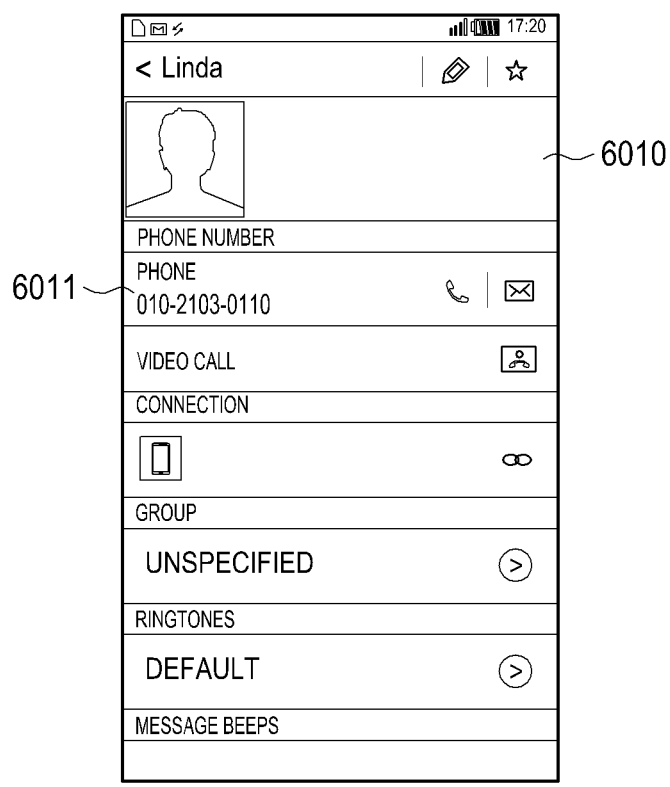

As shown in FIG. 59A, after transmitting sharing data, the transmitting-side electronic device 5000 may display again the phone application execution screen 5130. As shown in FIG. 59B, the receiving-side electronic device 5060 may run a sharing application and display the sharing application execution screen. For example, the receiving-side electronic device 5060 may run an address book application and display an execution screen corresponding thereto. The receiving-side electronic device 5060 may process sharing data, and display the processing results. For example, as shown in FIG. 59B, the receiving-side electronic device 5060 may display an execution screen on which a name 5910 and a phone number 5911, which are included in the sharing data, are entered to the phone application. The phone application may further include a save function key 5912. If the save function key 5912 is designated, the receiving-side electronic device 5060 may store the sharing data. FIG. 60 illustrates a phone application 6010 on which sharing data is stored by the receiving-side electronic device 5060. As shown in FIG. 60, the phone application 6010 may include a phone number 6011 of Linda.

Figure 61:
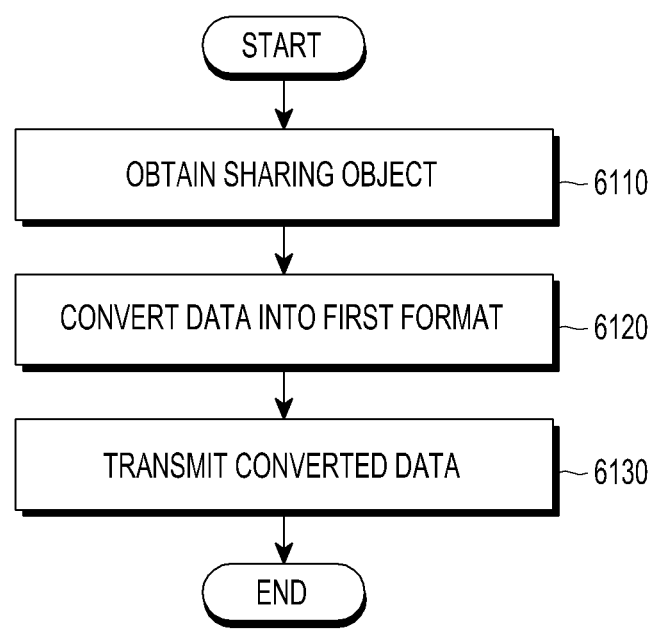
FIG. 61 is a flowchart for a data sharing method of a transmitting-side electronic device according to various exemplary embodiments.

FIG. 61 is a flowchart for a data sharing method of a transmitting-side electronic device according to various exemplary embodiments of the present disclosure.

In operation 6110, the transmitting-side electronic device may obtain a sharing object.

In operation 6120, the transmitting-side electronic device may convert the data corresponding to the sharing object into a first format. More specifically, the transmitting-side electronic device may run a sharing application corresponding to the sharing object. The data output from the sharing application may be data that is converted into the first format. The first format may be a format that is defined in common to both of the transmitting-side electronic device and the receiving-side electronic device. For example, the sharing application may be produced based on the data sharing platform. Accordingly, the transmitting-side electronic device may output the data that is converted into the first format.

In operation 6130, the transmitting-side electronic device may transmit the converted data to the receiving-side electronic device.

Figure 62:
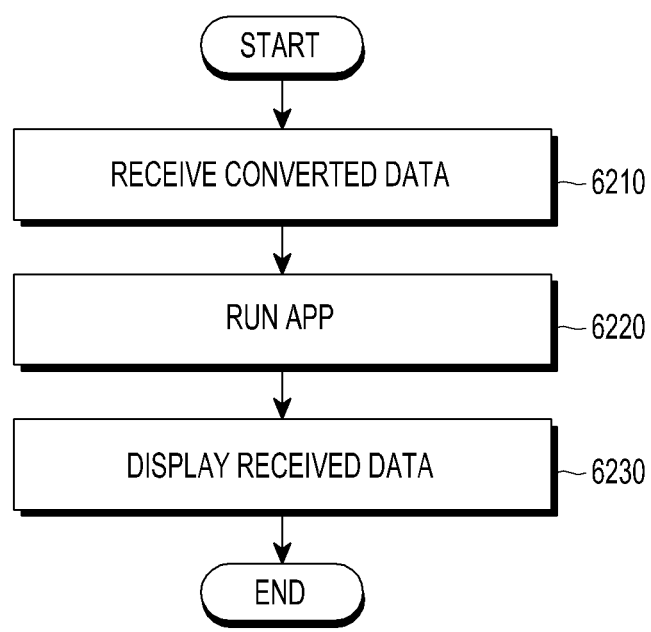
FIG. 62 is a flowchart for a data sharing method of a receiving-side electronic device according to various exemplary embodiments o.

FIG. 62 is a flowchart for a data sharing method of a receiving-side electronic device according to various exemplary embodiments of the present disclosure.

In operation 6210, the receiving-side electronic device may receive the converted data.

In operation 6220, the receiving-side electronic device may run an application corresponding to the data. The receiving-side electronic device may determine a format of the converted data, and run an application corresponding to the determined format. In one exemplary embodiment, the receiving-side electronic device may store a relationship between the data format and the application. The receiving-side electronic device may include a relationship between each application and at least one data format required for each application. For example, the receiving-side electronic device may store a relationship indicating that a map application is related to a data format of coordinate information and a data format of a text. Accordingly, upon receiving sharing data of coordinate information, the receiving-side electronic device may run a map application. As another example, the receiving-side electronic device may store a relationship indicating that a web browsing application is related to a data format of a URL. Accordingly, upon receiving sharing data of URL, the receiving-side electronic device may run a web browsing application. Accordingly, the receiving-side electronic device may run an application that is different from the application that is executed in the transmitting-side electronic device. For example, the receiving-side electronic device may store a relationship indicating that a weather application is related to a data format of coordinate information. The transmitting-side electronic device may run a map application and transmit the coordinate information to the receiving-side electronic device as sharing data. The receiving-side electronic device may run a weather application based on the received coordinate information, and display the weather of the area.

Table 1 shows relationships between applications and their required data formats according to various exemplary embodiments of the present disclosure.

TABLE 1

| Application | Data format |
| --- | --- |
| Weather Application | Weather information, coordinate information |
| Map Application | Coordinate information, text |
| Address Book Application | Address book information |

The above relationships may be defined in, for example, the data sharing platform, and each application may be produced based on the data sharing platform. Accordingly, although a map application produced by a company A is different from a map application produced by a company B, the map application produced by the company A and the map application produced by the company B can exchange and process coordinate information and text information, since they are produced based on the same data sharing platform.

In operation 6230, the receiving-side electronic device may process and display the received sharing data.

Figure 63:
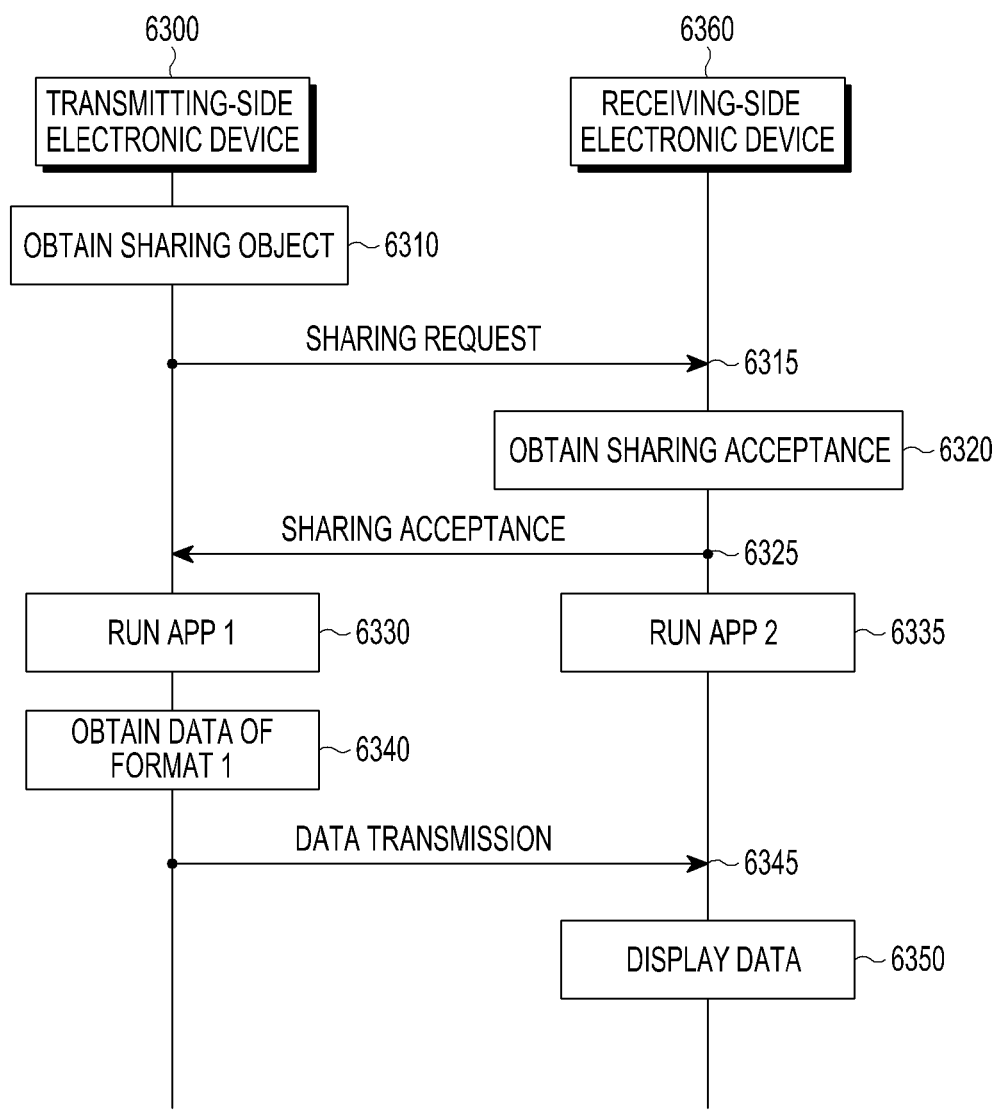
FIG. 63 is a flowchart of a data sharing method according to various exemplary embodiments.

FIG. 63 is a flowchart of a data sharing method according to various exemplary embodiments of the present disclosure.

In operation 6310, a transmitting-side electronic device 6300 may obtain a sharing object.

In operation 6315, the transmitting-side electronic device 6300 may send a sharing request to a receiving-side electronic device 6360. In operation 6320, the receiving-side electronic device 6360 may obtain a sharing acceptance response. In operation 6325, the receiving-side electronic device 6360 may send a sharing acceptance response to the transmitting-side electronic device 6300.

In operation 6330, the transmitting-side electronic device 6300 may run a first application. In operation 6335, the receiving-side electronic device 6360 may run a second application. The second application may be different from the first application.

In operation 6340, the transmitting-side electronic device 6300 may obtain data of a first format, which is output from the first application. In operation 6345, the transmitting-side electronic device 6300 may transmit the data of the first format to the receiving-side electronic device 6360. In operation 6350, the receiving-side electronic device 6360 may display the received data based on the second application.

In another exemplary embodiment, the receiving-side electronic device 6360 may determine the format of the received data to run the second application.

Figure 64A:
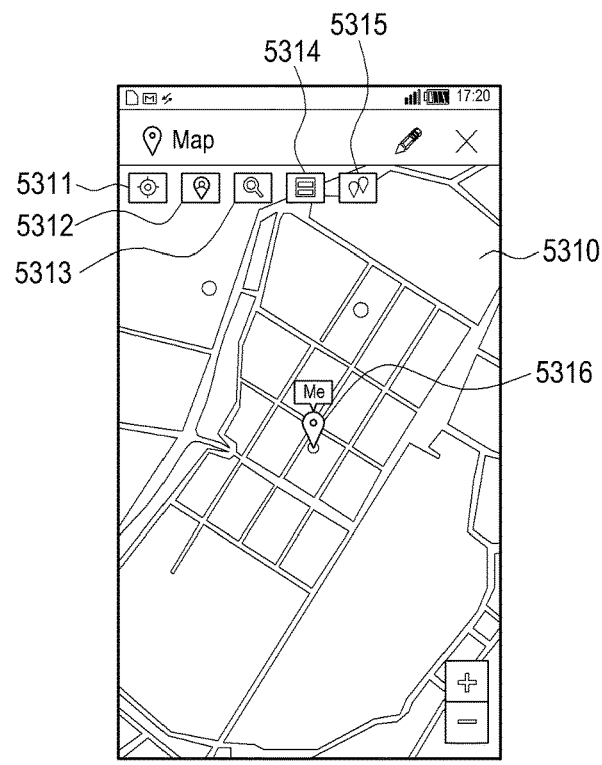
FIGS. 64A and 64B illustrate screens displayed by an electronic device according to various exemplary embodiments.
Figure 64B:
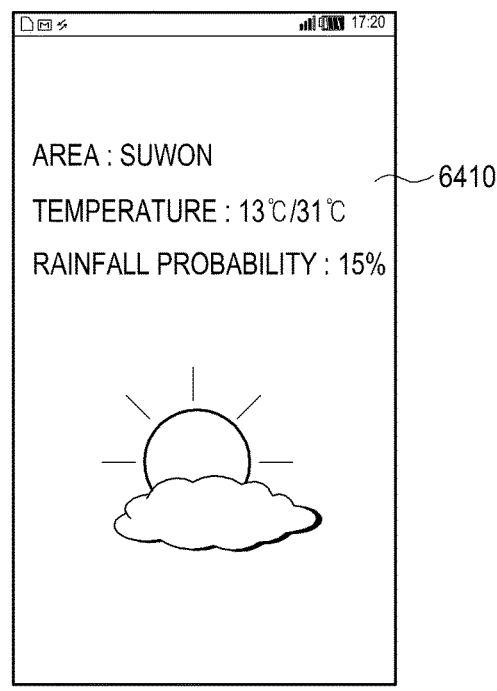
Figure 64C:
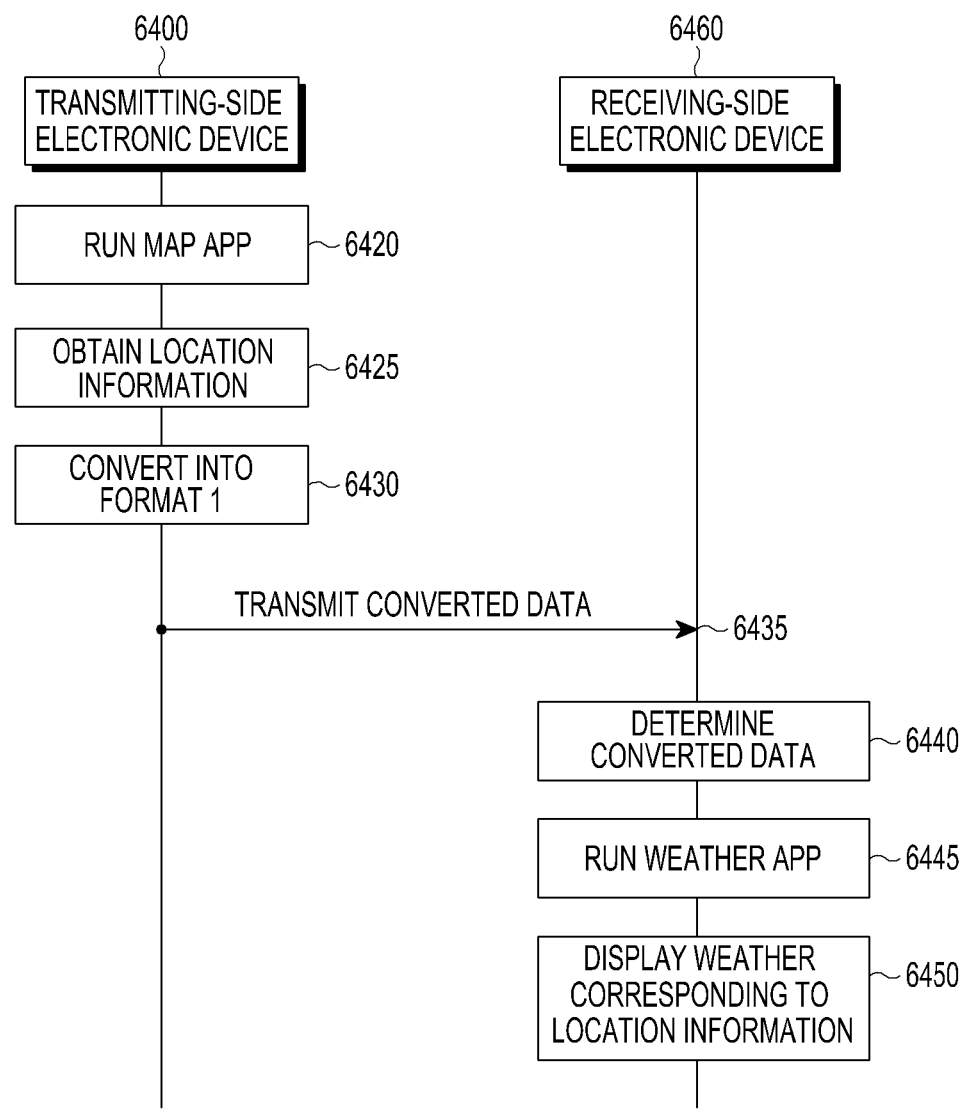
FIG. 64C is a flowchart of a data sharing method according to an exemplary embodiment.

FIGS. 64A and 64B illustrate screens displayed by an electronic device according to various exemplary embodiments of the present disclosure. An example of FIGS. 64A and 64B will be described in more detail with reference to FIG. 64C. FIG. 64C is a flowchart of a data sharing method according to an exemplary embodiment of the present disclosure.

Referring to FIG. 64C, in operation 6420, a transmitting-side electronic device 6400 may run a map application. For example, as shown in FIG. 64A, the transmitting-side electronic device 6400 may display a map application execution screen 5310.

In operation 6425, the transmitting-side electronic device 6400 may obtain location information. For example, as shown in FIG. 64A, the transmitting-side electronic device 6400 may obtain location information 5316 corresponding to one point on the map application execution screen 5310.

In operation 6430, the transmitting-side electronic device 6400 may convert the location information into coordinate information (e.g., the first format), and output the coordinate information. The map application of the transmitting-side electronic device 6400 may be produced to output coordinate information during its production. In this case, the transmitting-side electronic device 6400 may not perform separate data conversion.

In operation 6435, the transmitting-side electronic device 6400 may transmit the coordinate information of the first format to the receiving-side electronic device 6460.

In operation 6440, the receiving-side electronic device 6460 may determine the first format of the data. In other words, the receiving-side electronic device 6460 may determine that the received data is coordinate information.

In operation 6445, the receiving-side electronic device 6460 may run a weather application on the received data. For example, as shown in FIG. 64B, the receiving-side electronic device 6460 may display a weather application execution screen 6410.

In operation 6450, the receiving-side electronic device 6460 may process the coordinate information and display the weather corresponding to the location information. The receiving-side electronic device 6460 may determine that the area corresponding to the coordinate information is 'Suwon', and obtain and display the weather information for the Suwon area. The receiving-side electronic device 6460 may get the weather information for the Suwon area by querying the outside about the weather information.

Figure 65A:
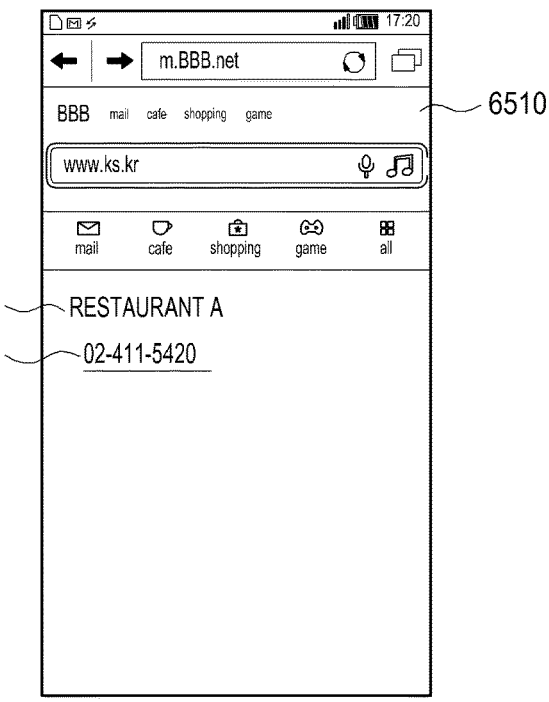
FIGS. 65A and 65B illustrate screens displayed by an electronic device according to various exemplary embodiments.
Figure 65B:
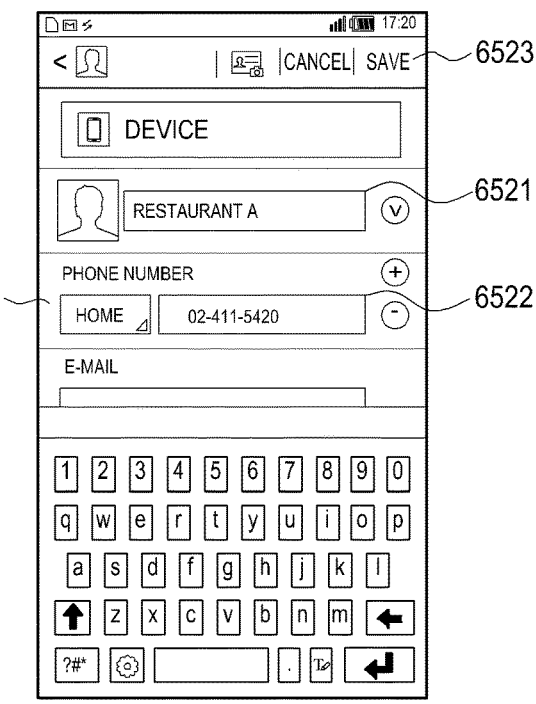

FIGS. 65A and 65B illustrate screens displayed by an electronic device according to various exemplary embodiments of the present disclosure.

FIG. 65A illustrates a web browsing application execution screen 6510 that is executed in a transmitting-side electronic device. The web browsing application execution screen 6510 may include a name 6512 and a phone number 6515. The transmitting-side electronic device may transmit the name and phone number to the receiving-side electronic device in the format of user information.

FIG. 65B illustrates an address book application execution screen 6520 that is executed in a receiving-side electronic device. The receiving-side electronic device may determine the format of the received user information, and run an address book application. The receiving-side electronic device may display the address book application execution screen 6520, and may enter and display a name 6521 and a phone number 6522, which are the received sharing data. The address book application execution screen 6520 may further include a save function key 6523. If the save function key 6523 is clicked, the receiving-side electronic device may save the received sharing data.

Figure 66:
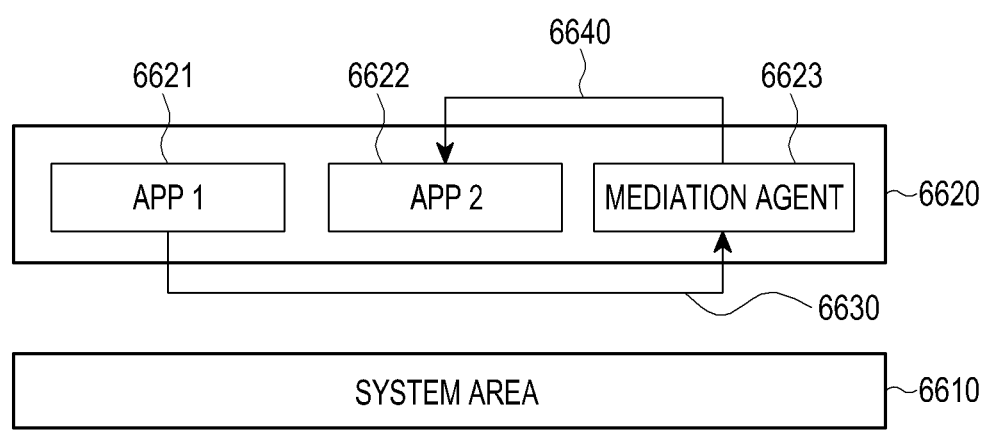
FIG. 66 is a conceptual diagram illustrating a system hierarchy according to various exemplary embodiments.
Figure 67A:
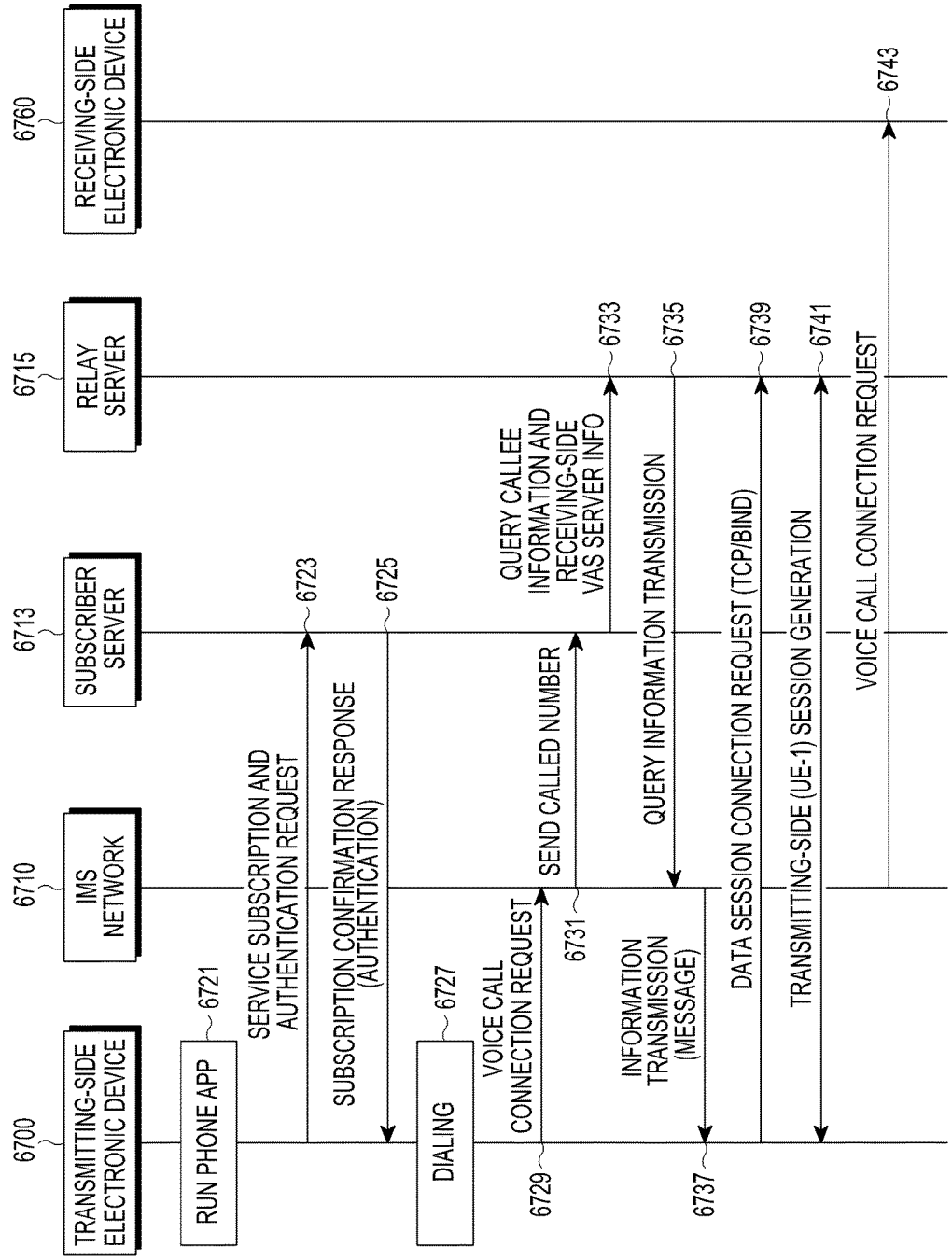
FIGS. 67A to 67D are flowcharts of a data sharing method according to various exemplary embodiments.
Figure 67B:
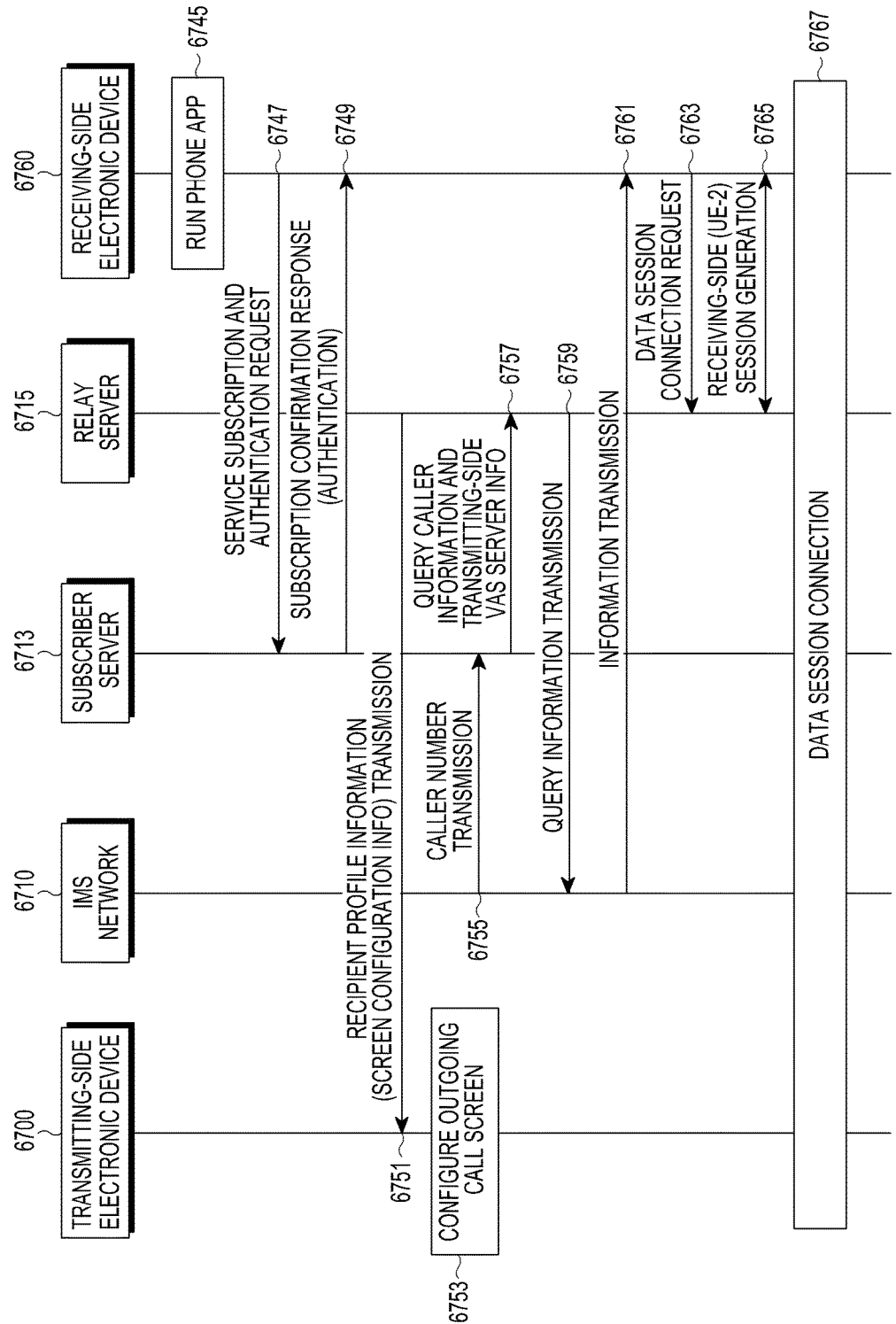
Figure 67C:
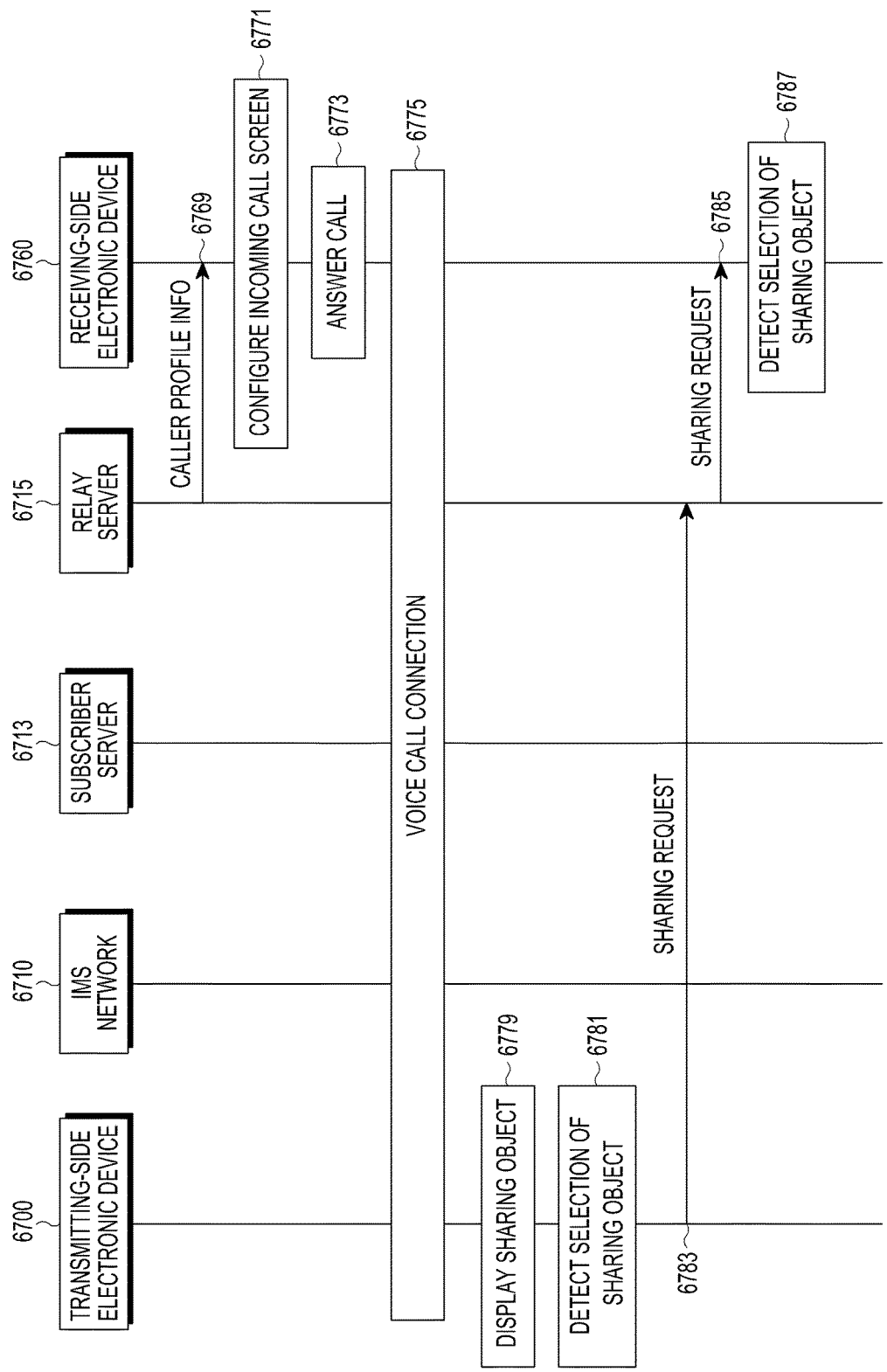
Figure 67D:
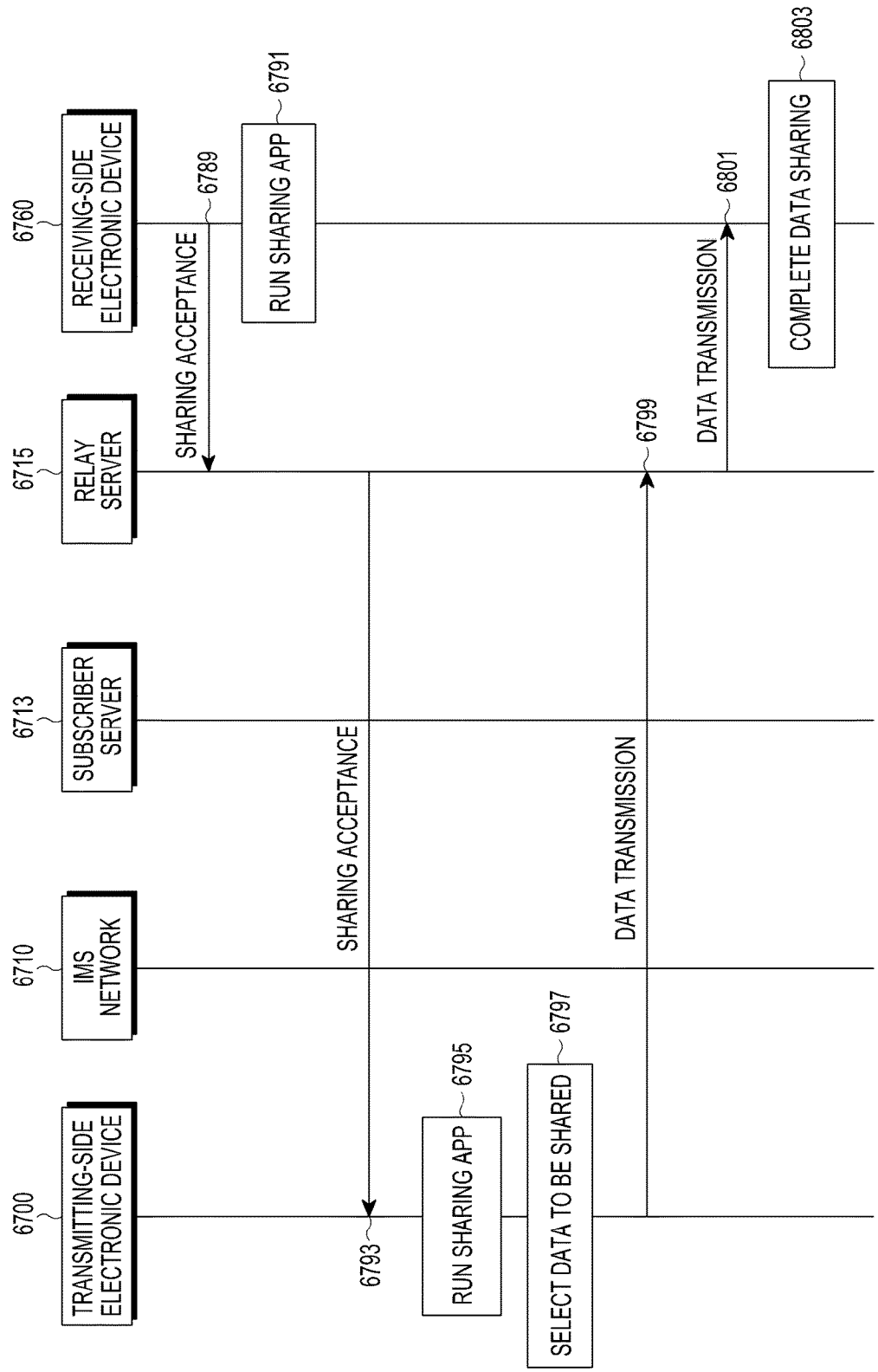

FIG. 66 is a conceptual diagram illustrating a system hierarchy according to various exemplary embodiments of the present disclosure.

As shown in FIG. 66, an application layer 6620 may be defined on the top of the system area 6610. In the application layer 6620 may be defined a first application 6621, a second application 6622 and a mediation agent 6623. The mediation agent 6623 may process data from the first application 6621 in a first format (in operation 6630), and output to the processing results to the second application 6622 (in operation 6640). Both of the first application 6621 and the second application 6622 may be produced based on the mediation agent 6623.

FIGS. 67A to 67D are flowcharts of a data sharing method according to various exemplary embodiments of the present disclosure.

In operation 6721, a transmitting-side electronic device 6700 may run a phone application.

In operation 6723, the transmitting-side electronic device 6700 may send a service subscription and authentication request to a subscriber server 6713. In operation 6725, the subscriber server 6713 may send a subscription confirmation response (authentication) to the transmitting-side electronic device 6700.

In operation 6727, the transmitting-side electronic device 6700 may perform dialing with a called number. The transmitting-side electronic device 6700 may receive a called number and a dialing command through a phone application, and perform dialing with the obtained called number.

In operation 6729, the transmitting-side electronic device 6700 may send a voice call connection request to an IMS network 6710. In operation 6731, the IMS network 6710 may forward the called number provided from the transmitting-side electronic device 6700, to the subscriber server 6713. In operation 6733, the subscriber server 6713 may send a query request for callee information and receiving-side Value-Added Service (VAS) server information to a relay server 6715. In operation 6735, the relay server 6715 may transmit the query information (e.g., at least one of the callee information and receiving-side VAS server information) to the IMS network 6710. In operation 6737, the IMS network 6710 may transmit the received query information to the transmitting-side electronic device 6700. In operation 6739, the transmitting-side electronic device 6700 may send a data session connection request to the relay server 6715 based on the received query information. The transmitting-side electronic device 6700 may send the data session connection request based on the information related to the voice call. The transmitting-side electronic device 6700 may send the data session connection request based on TCP or BIND. In operation 6741, the transmitting-side electronic device 6700 and the relay server 6715 may generate a transmitting-side (UE-1) session.

In operation 6743, the IMS network 6710 may send a voice call connection request to a receiving-side electronic device 6760. In operation 6745, the receiving-side electronic device 6760 may run a phone application. In operation 6747, the receiving-side electronic device 6760 may send a service subscription and authentication request to the subscriber server 6713. In operation 6749, the subscriber server 6713 may send a subscription confirmation response (authentication) to the receiving-side electronic device 6760.

In operation 6751, the relay server 6715 may transmit recipient profile information (e.g., screen configuration information) to the transmitting-side electronic device 6700. In operation 6753, the transmitting-side electronic device 6700 may configure and display an Outgoing Call screen.

In operation 6755, the IMS network 6710 may transmit a caller number to the subscriber server 6713. In operation 6757, the subscriber server 6713 may send a query request for caller information and transmitting-side VAS server information to the relay server 6715. In operation 6759, the relay server 6715 may transmit the query information to the IMS network 6710. In operation 6761, the IMS network 6710 may transmit the received information to the receiving-side electronic device 6760. In operation 6763, the receiving-side electronic device 6760 may send a data session connection request to the relay server 6715. The receiving-side electronic device 6760 may send the data session connection request based on TCP or BIND. In operation 6765, the receiving-side electronic device 6760 and the relay server 6715 may generate a receiving-side (UE-2) session. In operation 6767, the transmitting-side electronic device 6700 and the receiving-side electronic device 6760 may connect a data session.

In operation 6769, the relay server 6715 may transmit caller profile information to the receiving-side electronic device 6760. In operation 6771, the receiving-side electronic device 6760 may configure and display an Incoming Call screen. In operation 6773, the receiving-side electronic device 6760 may respond to the voice call connection. In operation 6775, the transmitting-side electronic device 6700 and the receiving-side electronic device 6760 may connect a voice call.

In operation 6779, the transmitting-side electronic device 6700 may display a sharing object. In operation 6781, the transmitting-side electronic device 6700 may detect a selection of the sharing object. In operation 6783, the transmitting-side electronic device 6700 may send a sharing request for the sharing object to the relay server 6715. In operation 6785, the relay server 6715 may send a sharing request for the sharing object to the receiving-side electronic device 6760. In operation 6787, the receiving-side electronic device 6760 may detect a selection of a Sharing Accept icon, so the receiving-side electronic device 6760 may obtain a sharing acceptance. In operation 6789, the receiving-side electronic device 6760 may send a sharing acceptance to the relay server 6715. In operation 6791, the receiving-side electronic device 6760 may run a sharing application corresponding to the requested sharing object. In operation 6793, the relay server 6715 may send the sharing acceptance to the transmitting-side electronic device 6700. In operation 6795, the transmitting-side electronic device 6700 may run a sharing application. In operation 6797, the transmitting-side electronic device 6700 may obtain sharing data. In operation 6799, the transmitting-side electronic device 6700 may transmit the sharing data to the relay server 6715. In operation 6801, the relay server 6715 may transmit the sharing data to the receiving-side electronic device 6760 in a relay manner. In operation 6803, the receiving-side electronic device 6760 may process and output the sharing data, completing the data sharing.

Figure 68:
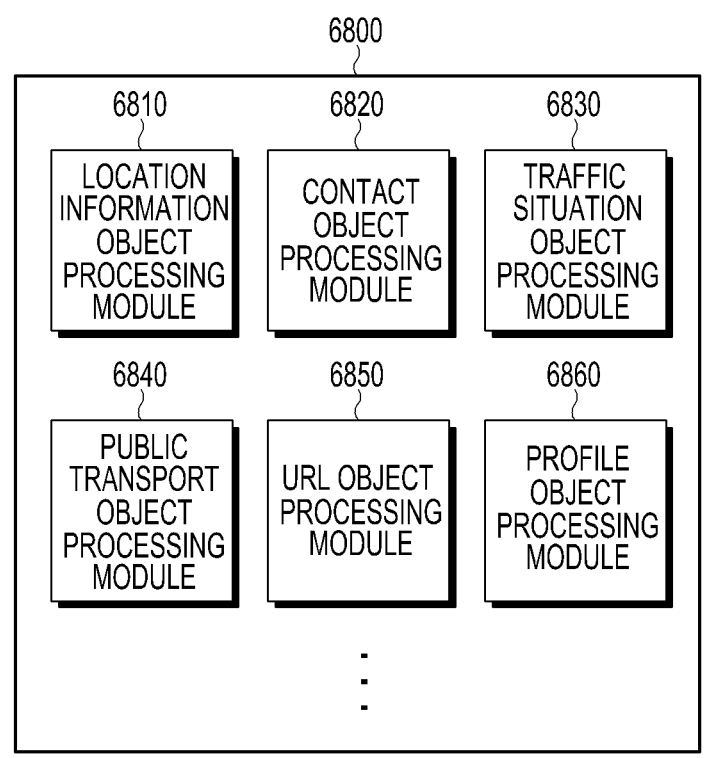
FIG. 68 is a block diagram of a heterogeneous application processing agent in view of modules according to various exemplary embodiments.

FIG. 68 is a block diagram of a heterogeneous application processing agent in view of modules according to various exemplary embodiments of the present disclosure.

A heterogeneous application processing agent 6800 may include at least one of a location information object processing module 6810, a contact object processing module 6820, a traffic situation object processing module 6830, a public transport object processing module 6840, a URL object processing module 6850, and a profile object processing module 6860.

The location information object processing module 6810 may convert the data from an application which processes location information-related data into a format used in the data sharing platform. The contact object processing module 6820 may convert the data from an application which processes contact-related data into a format used in the data sharing platform. The traffic situation object processing module 6830 may convert the data from an application which processes traffic situation-related data into a format used in the data sharing platform. The public transport object processing module 6840 may convert the data from an application which processes public transport-related data into a format used in the data sharing platform. The URL object processing module 6850 may convert the data from an application which processes URL-related data into a format used in the data sharing platform. The profile object processing module 6860 may convert the data from an application which processes profile-related data into a format used in the data sharing platform.

Table 2 below shows a table for a heterogeneous application processing agent in view of a table.

TABLE 2

| Module types | Type | Type format |
|---|---|---|
| User profile | JSON Object | {<br>'name': 'user_name',<br>'number': 'number',<br>'birthday': 'birthday',<br>'gender': ['male', 'female'],<br>... job / age / height / weight / etc.<br>} |
| URL | String | URL |
| Public transport info | JSON Object | {<br>'region': ['Seoul', 'Inchon', 'Daejeon',, ...],<br>'number': ['0', '1', '2', ...],<br>'interval': ['10', '12', '15', ...],<br>...<br>} |

Only a few modules are disclosed in Table 2, but it will be apparent to those of ordinary skill in the art that the type and type format for location information, contact, traffic situation and the like may also be additionally defined.

The term 'module' or 'unit' as used herein may refer to a unit that includes any one or a combination of, for example, hardware, software and firmware. The 'module' may be interchangeably used with a term such as, for example, unit, logic, logical block, component, or circuit. The 'module' may be the minimum unit of an integrally configured part, or a part thereof. The 'module' may be the minimum unit for performing one or more functions, or a part thereof. The 'module' may be implemented mechanically or electronically. For example, the 'module' according to various exemplary embodiments of the present disclosure may include at least one of an Application-Specific Integrated Circuit (ASIC) chip, Field-Programmable Gate Arrays (FPGAs), or a programmable-logic device, which are known or will be developed in the future, and which perform certain operations.

In various exemplary embodiments, at least a part of the apparatus (e.g., modules or functions thereof) or method (e.g., operations) according to various exemplary embodiments of the present disclosure may be implemented, for example, by an instruction(s) that is stored in computer-readable storage media in the form of a programming module. If the instruction is executed by one or more processors (e.g., the processor 120), the one or more processors may perform the function corresponding to the instruction. The computer-readable storage media may be, for example, the memory 130. At least a part of the programming module may be implemented (e.g., executed) by, for example, the processor 120. At least a part of the programming module may include, for example, a module, a program, a routine, a set of instructions, or a process, for performing one or more functions.

A computer-readable recording medium may include magnetic media (e.g., hard disks, floppy disks, and magnetic tape), optical media (e.g., Compact Disc Read Only Memory (CD-ROM), Digital Versatile Disc (DVD)), magneto-optical media (e.g., floptical disk), and hardware devices (e.g., Read Only Memory (ROM), Random Access Memory (RAM) and flash memory) specially configured to store and perform program instructions (e.g., programming modules). The program instructions may include not only the machine code produced by a compiler, but also the high-level language code that can be executed by a computer using an interpreter or the like. The above hardware device may be configured to operate as one or more software modules to perform operations according to various exemplary embodiments of the present disclosure, and vice versa.

The module or programming module according to various exemplary embodiments of the present disclosure may include at least one of the above-described components, or some of them may be omitted. Alternatively, the module or programming module may further include other additional components. Operations performed by the module, programming module or other components according to various exemplary embodiments of the present disclosure may be executed in a sequential, parallel, iterative, or heuristic manner. Some operations may be executed in a different order, or may be omitted. Alternatively, other operations may be added.

In accordance with various exemplary embodiments of the present disclosure, in a storage medium storing instructions, the instructions are set to allow at least one processor to perform at least one operation when the instructions are executed by the at least one processor. The at least one operation may include an operation of connecting a voice call with a receiving-side electronic device; an operation of obtaining a sharing object to be shared with the receiving-side electronic device; and an operation of transmitting data corresponding to the sharing object to the receiving-side electronic device through a data session formed based on the information related to the voice call.

As is apparent from the foregoing description, according to an exemplary embodiment of the present disclosure, a transmitting-side electronic device may share data corresponding to a sharing object with a receiving-side electronic device during the voice call connection.

According to an exemplary embodiment of the present disclosure, the transmitting-side electronic device may display the sharing object for sharing data on a Phone Conversation screen.

According to an exemplary embodiment of the present disclosure, the transmitting-side electronic device may share the data during the voice call connection, without the need to perform a separate connection process or run an application.

According to an exemplary embodiment of the present disclosure, the transmitting-side electronic device may share data with the receiving-side electronic device even with the transmission of less data, compared with the high-data traffic scheme such as video calls.

According to an exemplary embodiment of the present disclosure, the transmitting-side electronic device and the receiving-side electronic device may share a control command.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method performed by a transmitting-side electronic device for sharing data with a receiving-side electronic device, the method comprising:
   displaying a screen of a call application;
   transmitting a request for connecting a voice call with the receiving-side electronic device via a call application;
   receiving profile information of a user of the receiving-side electronic device from an external server while the voice call is being set up;
   displaying the profile information on the screen of the call application before the voice call is connected to the receiving-side electronic device;
   in response to the voice call being connected with the receiving-side electronic device, displaying a plurality of icons representing sharing objects on the screen of the call application;
   receiving a selection on a first icon of the plurality of icons as a sharing object to be shared with the receiving-side electronic device;
   sending a sharing request for the sharing object;
   in response to receiving a sharing acceptance message corresponding to the sharing request, displaying an execution screen of a first application corresponding to the first icon;
   obtaining data for sharing with the receiving-side electronic device while the execution screen of the first application is displayed; and
   transmitting the obtained data output from the first application to the receiving-side electronic device through a data session formed based on information related to the voice call after the voice call is initiated.

2. The method of claim 1, wherein the obtained data is based on a first format.

3. The method of claim 2, wherein the first format is a format which is common to the transmitting-side electronic device and the receiving-side electronic device.

4. The method of claim 1, further comprising executing the first application corresponding to the first icon.

5. The method of claim 1, wherein the receiving-side electronic device executes a second application of the receiving-side electronic device based on the sharing request.

6. The method of claim 5, wherein the first application is at least one of different from, or the same as the second application; and wherein each of output data of the first application and output data of the second application is based on a first format.

7. The method of claim 1, wherein the sharing objects includes at least one of user information, image information, a Uniform Resource Locator (URL), public transport information, a movie, a time, a text, an alarm, application information, goods information, bank information, a price, weather, a barcode, Wireless Fidelity (Wi-Fi), control, sketch, a touch, and coordinate information.

8. The method of claim 1, wherein the sending a sharing request for the sharing object comprises:
transmitting a called number;
receiving at least one of callee information and receiving-side Value-Added Service (VAS) server information corresponding to the called number; and
generating the data session based on at least one of the received callee information and the receiving-side VAS server information.

9. A transmitting-side electronic device communicating with a receiving-side electronic device, the transmitting-side electronic device comprising:
a display configured to display a screen of a call application;
a communication interface configured to connect a voice call with the receiving-side electronic device; and
a controller configured to:
transmit a request for connecting the voice call with the receiving-side electronic device via a call application,
receive profile information of a user of the receiving-side electronic device from an external server while the voice call is being set up,
display the profile information on the screen of the call application before the voice call is connected to the receiving-side electronic device,
in response to the voice call being connected with the receiving-side electronic device, control the display to display a plurality of icons representing sharing objects on the screen of the call application,
receive a selection on a first icon of the plurality of icons as a sharing object to be shared with the receiving-side electronic device,
send a sharing request for the sharing object,
in response to receiving a sharing acceptance message corresponding to the sharing request, control to display to display an execution screen of a first applications corresponding to the first icon,
obtain data for sharing with the receiving-side electronic device while the execution screen of the first application is displayed, and
control to transmit the obtained data output from the first application to the receiving-side electronic device through a data session formed based on information related to the voice call after the voice call is initiated.

10. The transmitting-side electronic device of claim 9, wherein the obtained data is based on a first format.

11. The transmitting-side electronic device of claim 10, wherein the first format is a format which is common to the transmitting-side electronic device and the receiving-side electronic device.

12. The transmitting-side electronic device of claim 9, wherein the controller is further configured to execute the first application corresponding to the first icon.

13. The transmitting-side electronic device of claim 9, wherein the receiving-side electronic device executes a second application of the receiving-side electronic device based on the sharing request.

14. The transmitting-side electronic device of claim 13, wherein the first application is at least one of different from, or the same as the second application; and
wherein each of output data of the first application and output data of the second application is based on a first format.

15. The transmitting-side electronic device of claim 9, wherein the sharing objects includes at least one of user information, image information, a Uniform Resource Locator (URL), public transport information, a movie, a time, a text, an alarm, application information, goods information, bank information, a price, weather, a barcode, Wireless Fidelity (Wi-Fi), control, sketch, a touch, and coordinate information.

16. The transmitting-side electronic device of claim 9, wherein the controller is further configured to:
control to transmit a called number,
receive at least one of callee information and receiving-side Value-Added Service (VAS) server information corresponding to the called number; and
generate the data session based on at least one of the received callee information and the receiving-side VAS server information.

* * * * *